(12) United States Patent
Placko et al.

(10) Patent No.: US 10,684,190 B2
(45) Date of Patent: Jun. 16, 2020

(54) DEVICE AND METHOD FOR MEASURING A PHYSICAL MAGNITUDE OF A FLUID FLOW

(71) Applicants: CENTRE NATIONAL DE LA RECHERCHE SCIENTIFIQUE, Paris (FR); ECOLE NORMALE SUPERIEURE DE CACHAN, Cachan (FR)

(72) Inventors: Dominique Placko, Creteil (FR); Alain Rivollet, Jouy en Josas (FR); Thierry Bore, Paris (FR)

(73) Assignees: CENTRE NATIONAL DE LA RECHERCHE SCIENTIFIQUE, Paris (FR); ECOLE NORMALE SUPERIEURE DE CACHAN, Cachan (FR)

( * ) Notice: Subject to any disclaimer, the term of this patent is extended or adjusted under 35 U.S.C. 154(b) by 96 days.

(21) Appl. No.: 15/313,408

(22) PCT Filed: May 22, 2015

(86) PCT No.: PCT/EP2015/061464
§ 371 (c)(1),
(2) Date: Nov. 22, 2016

(87) PCT Pub. No.: WO2015/177364
PCT Pub. Date: Nov. 26, 2015

(65) Prior Publication Data
US 2017/0199097 A1 Jul. 13, 2017

(30) Foreign Application Priority Data
May 23, 2014 (FR) .................................... 14 54675

(51) Int. Cl.
*G01M 9/06* (2006.01)

(52) U.S. Cl.
CPC .................................. *G01M 9/065* (2013.01)

(58) Field of Classification Search
CPC ...................................................... G01M 9/065
See application file for complete search history.

(56) References Cited

U.S. PATENT DOCUMENTS 5,136,881 A    8/1992   Kendall

FOREIGN PATENT DOCUMENTS

| FR | 2 895 544 A1 | 6/2007 |
| WO | 2011/092210 A1 | 8/2011 |

OTHER PUBLICATIONS

C. M. Dao et al., "Wave propagation in a fluid wedge over a solid half-space-Mesh-free analysis with experimental verification," International Journal of Solids and Structures, vol. 46, No. 11-12, Jun. 1, 2009, pp. 2486-2492.

(Continued)

*Primary Examiner* — Matthew G Marini
(74) *Attorney, Agent, or Firm* — Young & Thompson

(57) ABSTRACT

A device measures at least a first physical quantity of fluid flow in a three-dimensional space having at least one predetermined interface, between at least two media. The device comprises a computer prescribing first and second conditions at the different boundaries concerning the first physical quantity, associated respectively with a first source and a second source, different to one another, the first and second sources being point sources of mass flow of fluid and/or of force. The computer calculates, by distributed point source calculation, a first value of the first physical quantity from the first condition and from the first source and a second value of the first physical quantity from the second condition and from the second source, at at least one second point, different from the first test point, then combines the (Continued)

values to calculate for the first physical quantity respectively from the different boundary conditions and sources.

19 Claims, 57 Drawing Sheets

(56) References Cited

OTHER PUBLICATIONS

Yuji Wada et al., "Mesh-free distributed point source method for modeling viscous fluid motion between disks vibrating at ultrasonic frequency," The Journal of the Acoustical Society of America, American Institute of Physics for the Acoustical Society of America, vol. 136, No. 2, Aug. 2014, pp. 466-474.

Tamaki Yanagita et al., "Ultrasonic field modeling by distributed point source method for different transducer boundary conditions," The Journal of the Acoustical Society of America, vol. 126, No. 5, Nov. 2009, pp. 2331.

Sourav Banerjee et al., "Ultrasonic field modeling in plates immersed in fluid," International Journal of Solids and Structures, vol. 44, No. 18-19, 2007, pp. 6013-6029.

Sourav Banerjee et al., "Ultrasonic field modeling in multilayered fluid structures using the distributed point source method technique," Journal of Applied Mechanics, vol. 73, No. 4, Jul. 2006, pp. 598-609.

Tamaki Yanagita et al., "Ultrasonic field modeling by distributed point source method for different transducer boundary conditions," Journal of Acoustical Society of America, vol. 126, No. 5, Nov. 2009, pp. 2331-2339.

Sourav Banerjee et al., "Ultrasonic Field Modeling in Multilayered Fluid Structures Using the Distributed Point Source Method Technique," Journal of Applied Mechanics, Transactions of the ASME, vol. 73, Jul. 2006, pp. 598-209.

Tribikram Kundu et al., "Ultrasonic Field Modeling: A Comparison of Analytical, Semi-Analytical, and Numerical Techniques," IEEE Transactions on Ultrasonics, Ferroelectrics, and Frequency Control, vol. 57, No. 12, Dec. 2010, pp. 2795-2807.

Sourav Banerjee et al., "Ultrasonic field modeling in plates immersed in fluid," International Journal of Solids and Structures, vol. 44, 2007, pp. 6013-6029.

Cac Minh Dao et al., "Wave propagation in a fluid wedge over a solid half-space-Mesh-free analysis with experimental verification," International Journal of Solids and Structures, vol. 46, 2009, pp. 2486-2492.

Raghu Ram Tirukkavalluri et al., "Ultrasonic Field Modeling of Transient Wave Propagation in Homogenous and Non-Homogenous Fluid Media Using Distributed Point Source Method (DPSM)," Master in Engineering in CAD/CAM & ROBOTICS, Jun. 2008.

$V_y$ - $V_{wind}$ = 100 m.s$^{-1}$ $V_{ground}$ = 0 $V_{cyl}^n$ = 0 - $R_{cyl}$ = 20 m - $z_{cyl}$ = 100 m Current line - $V_{wind}$ = 100 m.s$^{-1}$ $V_{ground}$ = 0 $V_{cyl}^n$ = 0 - $R_{cyl}$ = 20 m - $z_{cyl}$ = 100 m

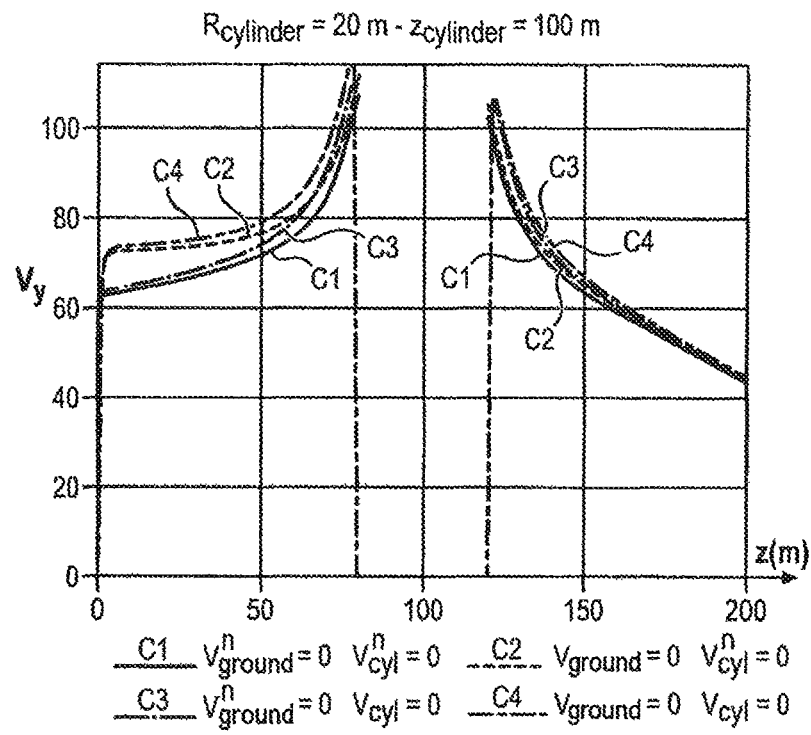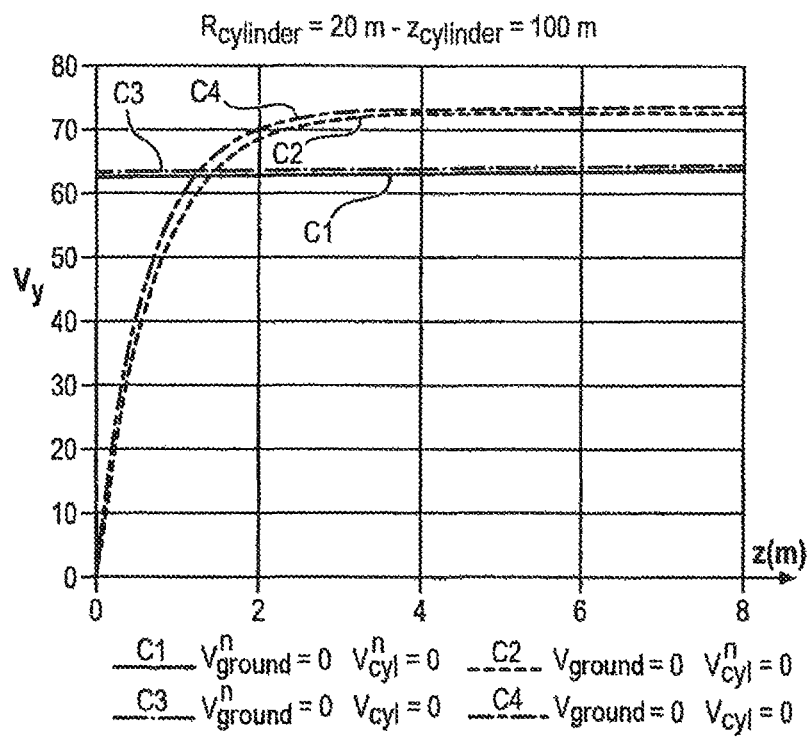

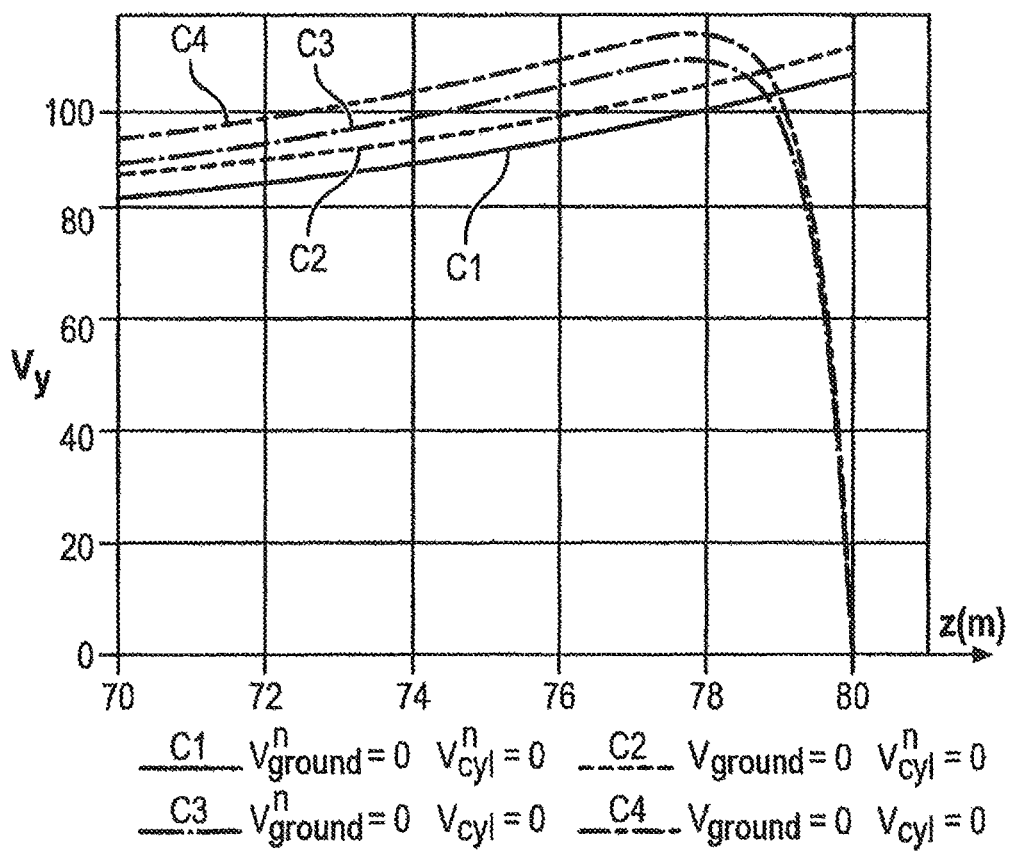

$V_y$ - $V_{wind}$ = 100 m.s$^{-1}$ $V_{ground}$ = 0 $V_{cyl}$ = 100 m.s$^{-1}$ - $R_{cyl}$ = 20 m - $z_{cyl}$ = 100 m Current line - $V_{wind}$ = 100 m.s$^{-1}$ $V_{ground}$ = 0 $V_{cyl}$ = 100 m.s$^{-1}$ - $R_{cyl}$ = 20 m - $z_{cyl}$ = 100 m $V_y$ - $V_{wind}$ = 100 m.s$^{-1}$ $V_{ground}$ = 0 $V_{cyl}$ = 100 m.s$^{-1}$ - $R_{cyl}$ = 20 m - $z_{cyl}$ = 100 m Current line - $V_{wind}$ = 100 m.s$^{-1}$ $V_{ground}$ = 0 $V_{cyl}$ = 100 m.s$^{-1}$ - $R_{cyl}$ = 20 m - $z_{cyl}$ = 100 m $V_y$ - $V_{wind}$ = 100 m.s$^{-1}$ $V_{ground}$ = 0 $V_{cyl}$ = 500 m.s$^{-1}$ - $R_{cyl}$ = 20 m - $z_{cyl}$ = 100 m Current line - $V_{wind}$ = 100 m.s$^{-1}$ $V_{ground}$ = 0 $V_{cyl}$ = 500 m.s$^{-1}$ - $R_{cyl}$ = 20 m - $z_{cyl}$ = 100 m $V_y - V_{wind} = 100 \text{ m.s}^{-1} \ V_{ground} = 0 \ V_{cyl} = 25 \text{ m.s}^{-1} - R_{cyl} = 20 \text{ m} - z_{cyl} = 100 \text{ m}$ Current line - $V_{wind} = 100 \text{ m.s}^{-1} \ V_{ground} = 0 \ V_{cyl} = 25 \text{ m.s}^{-1} - R_{cyl} = 20 \text{ m} - z_{cyl} = 100 \text{ m}$ Current line - $V_{wind} = 100$ m.s$^{-1}$ - $V_{ground} = 0$ m.s$^{-1}$ - $V_{cyl} = 0$ m.s$^{-1}$ Current line - $V_{wind} = 100$ m.s$^{-1}$ - $V_{ground} = 0$ m.s$^{-1}$ - $V_{cyl} = 0$ m.s$^{-1}$

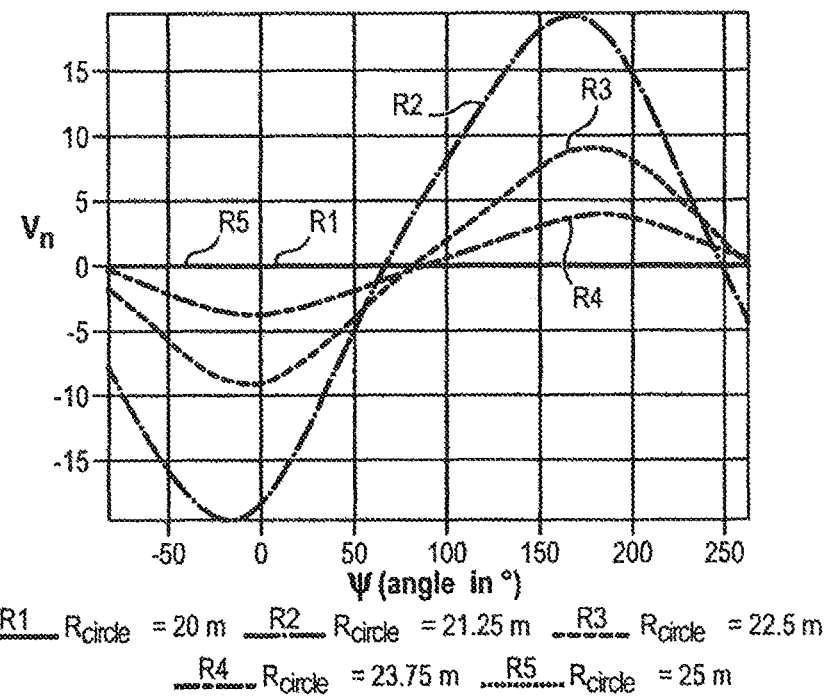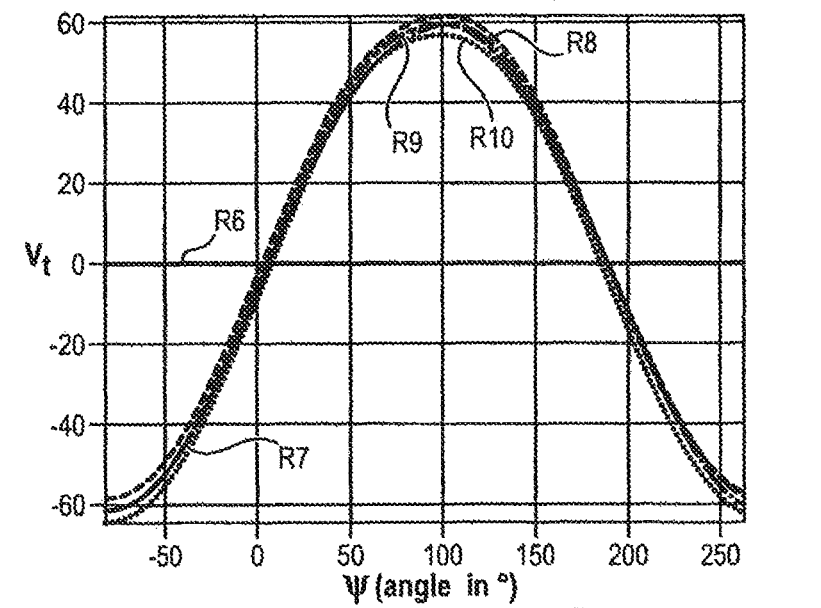

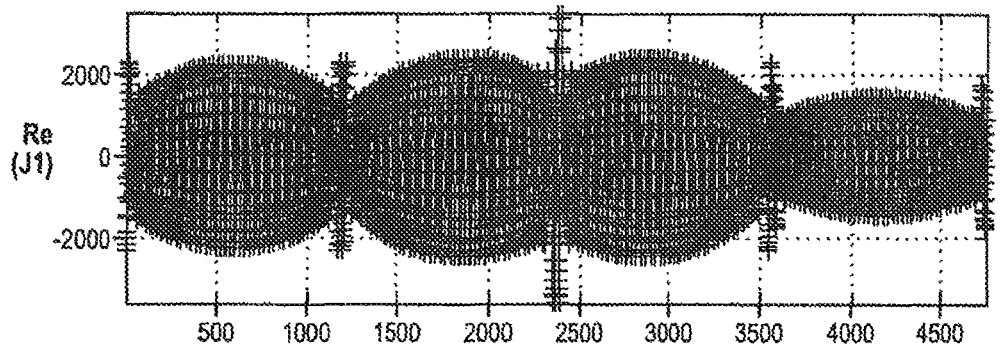
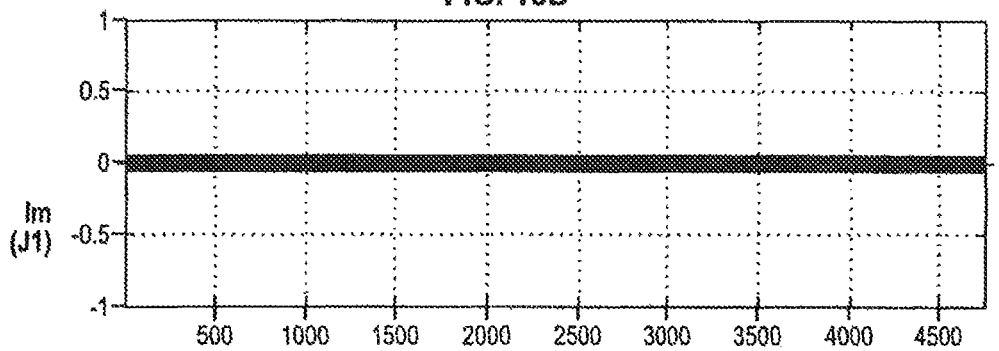
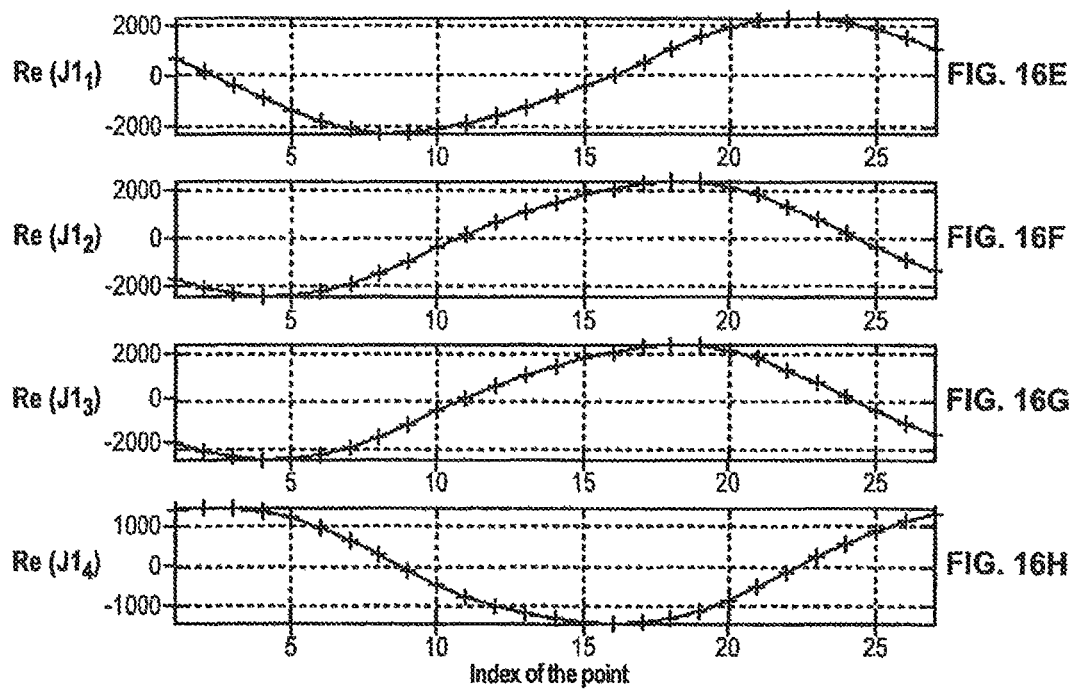

Current line - $V_{wind}$ = 100 m.s$^{-1}$ - $V_{ground}$ = 0 m.s$^{-1}$ - $V_{cyl}$ = 0 m.s$^{-1}$ Current line - $V_{wind}$ = 100 m.s$^{-1}$ - $V_{ground}$ = 0 m.s$^{-1}$ - $V_{cyl}$ = 0 m.s$^{-1}$ J1 - cylinder J1 - cylinder - slip = 0.5 dispatch = 0.5

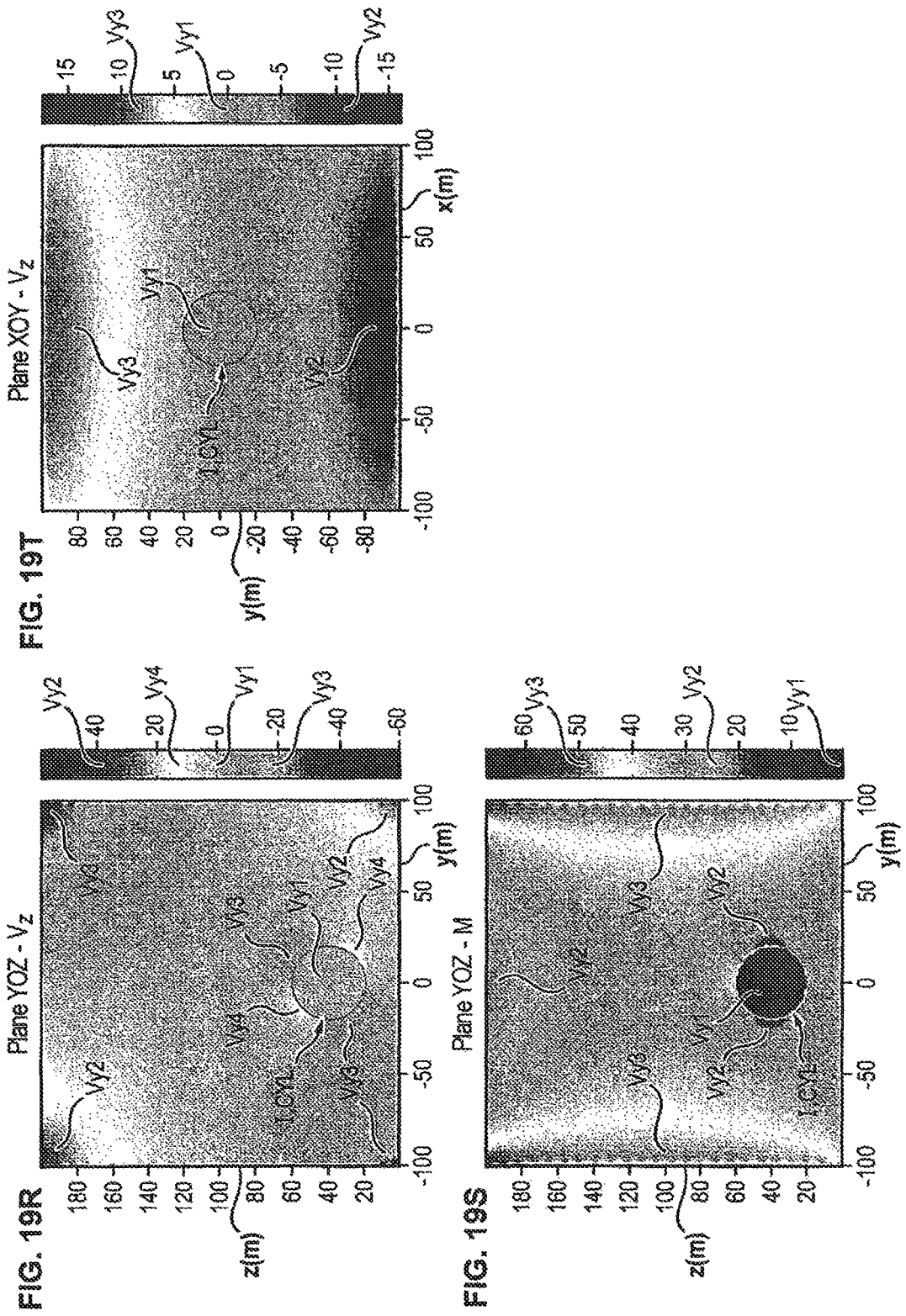

Flow diagram of the method

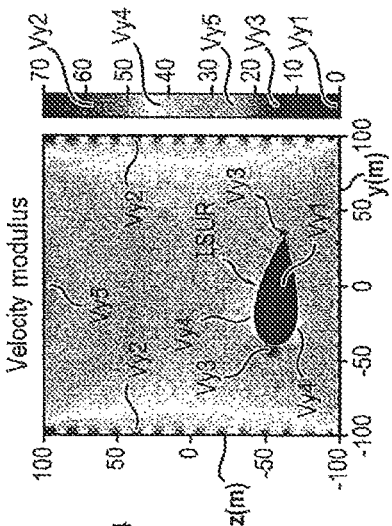
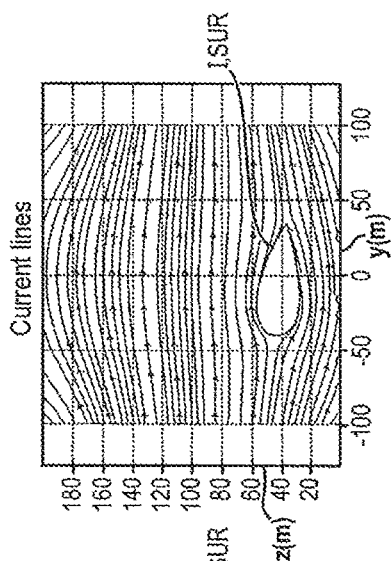
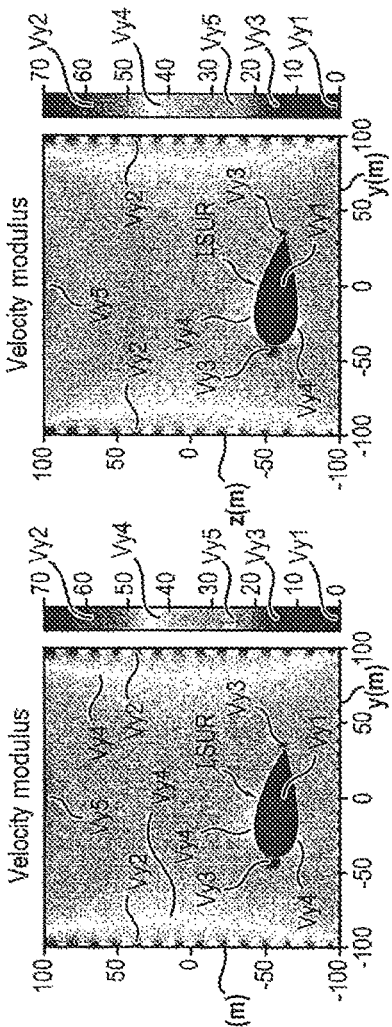
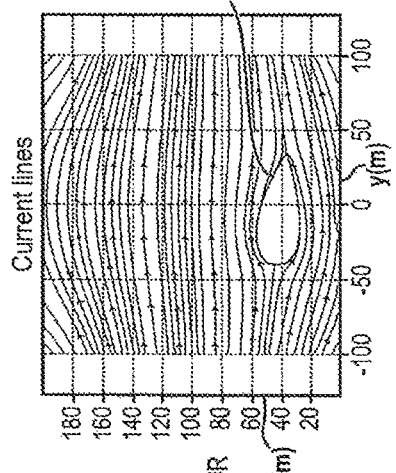
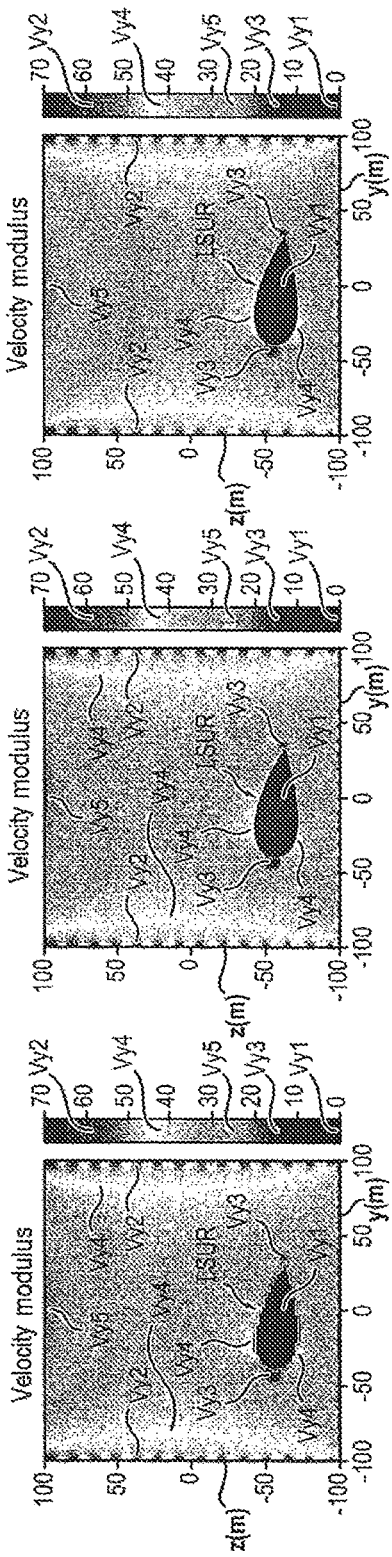
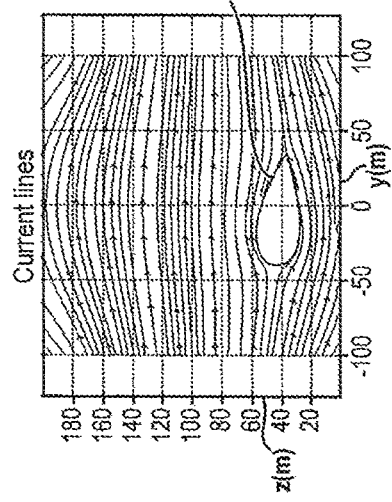

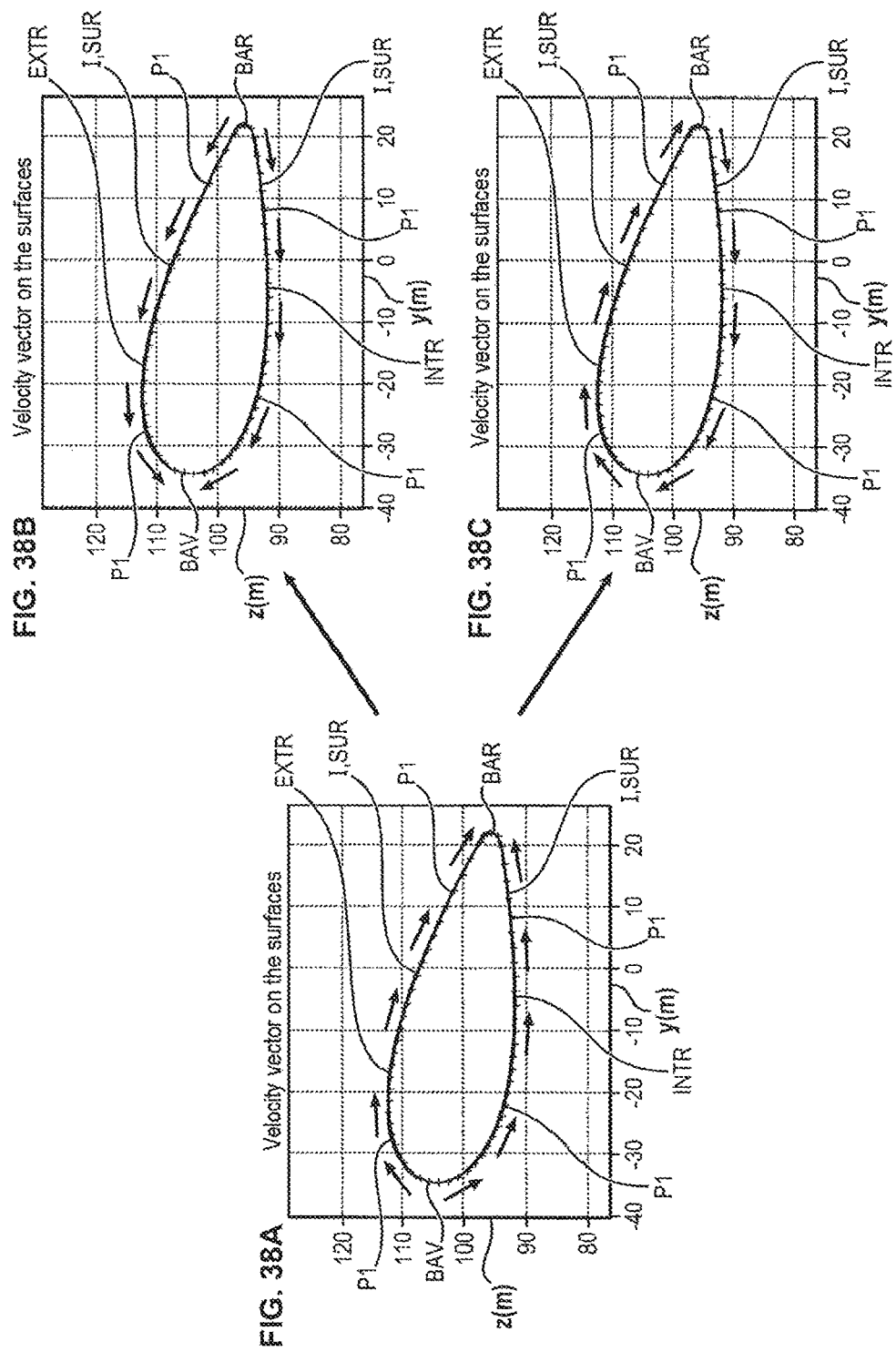

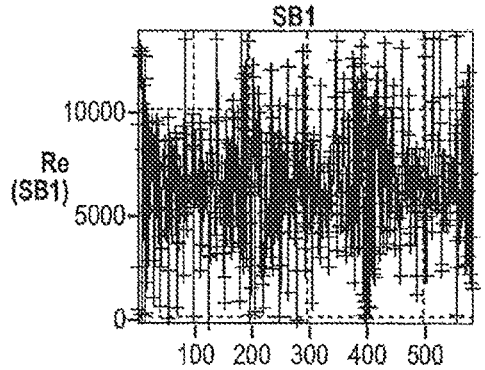
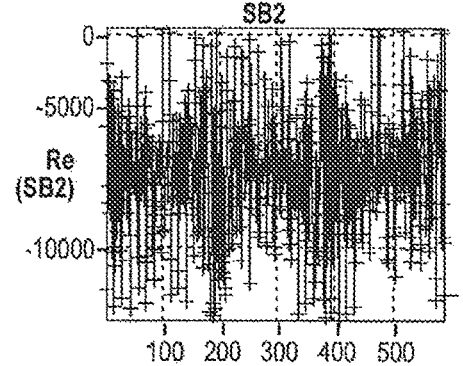
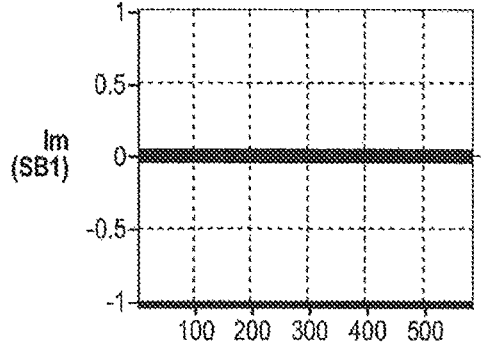
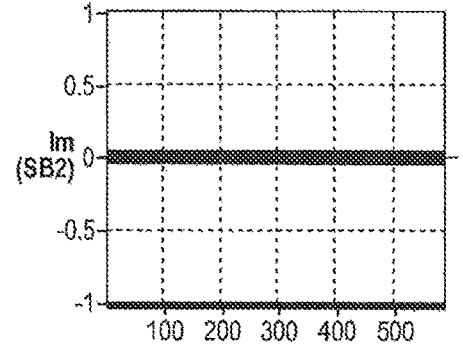
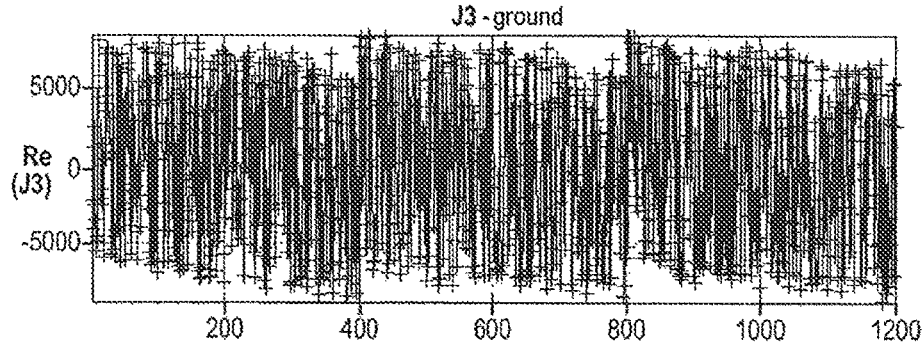
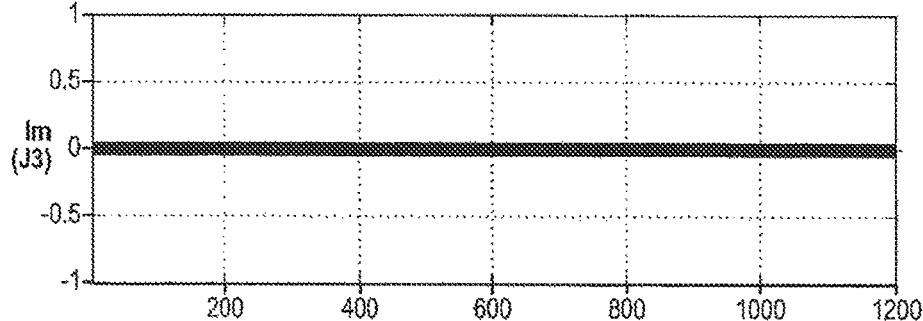

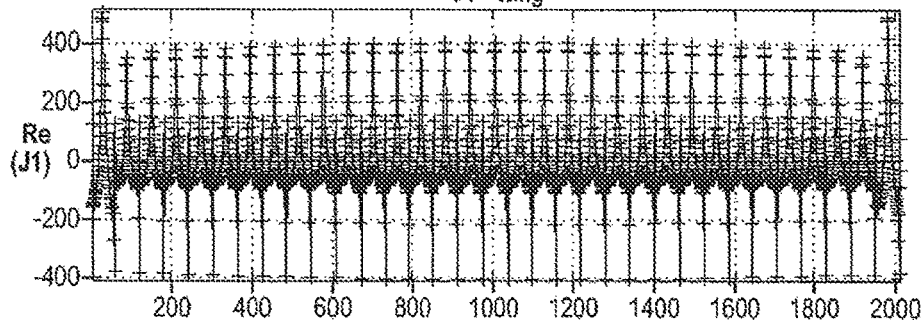
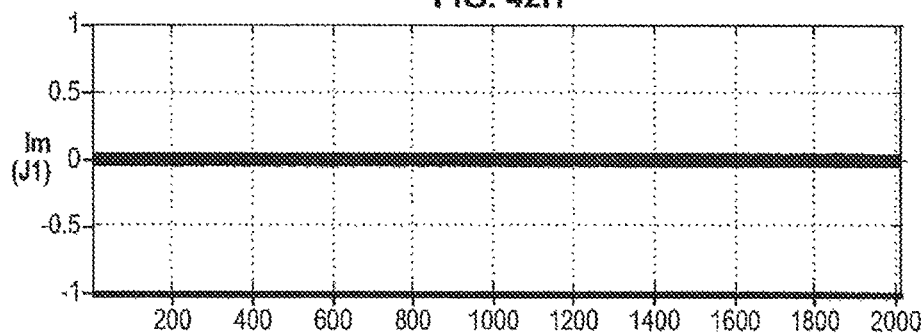
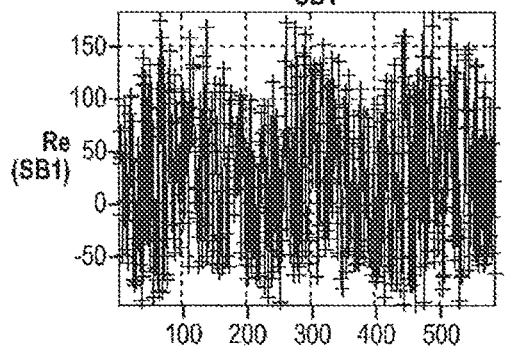
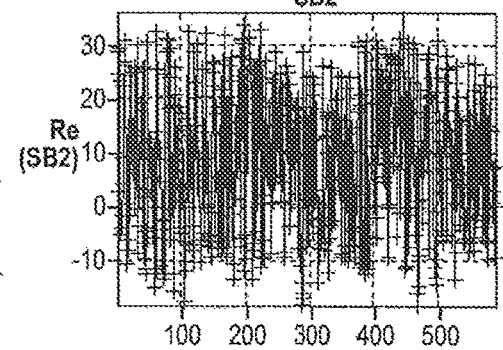
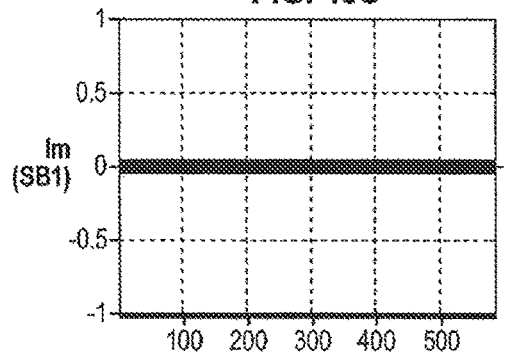
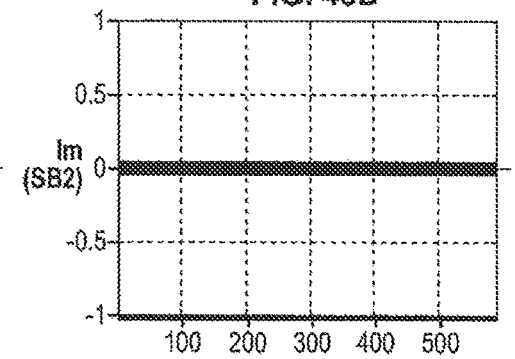

J3 - ground

J1 - wing

Current lines: 1

Current lines: 2

Current lines: 1+2

Velocity modulus

Velocity modulus

Velocity modulus

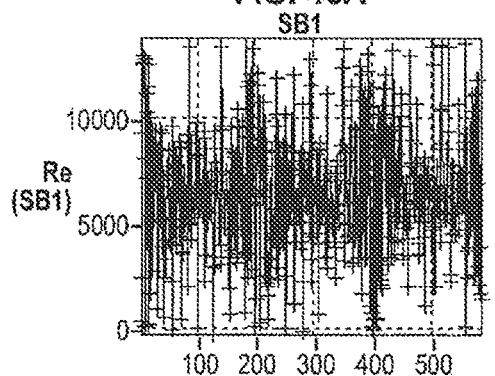
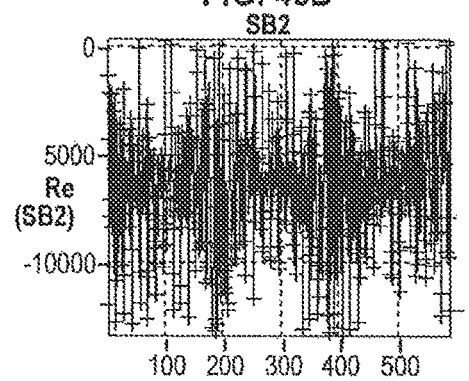
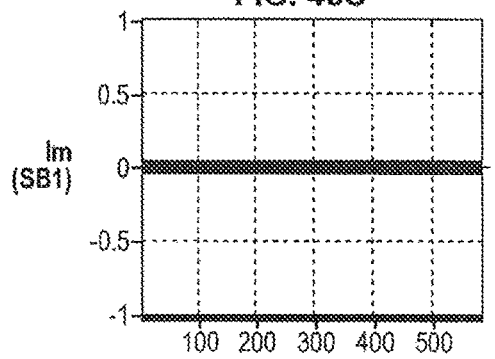
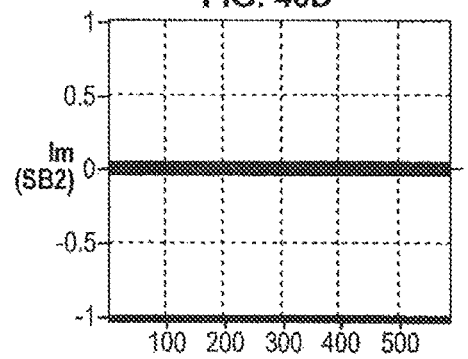
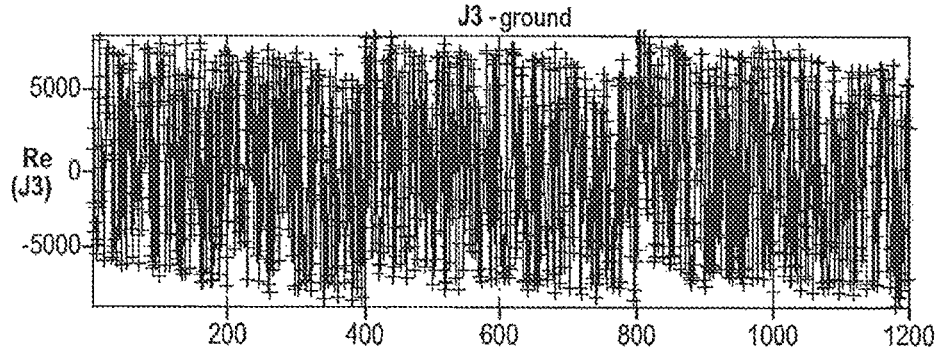
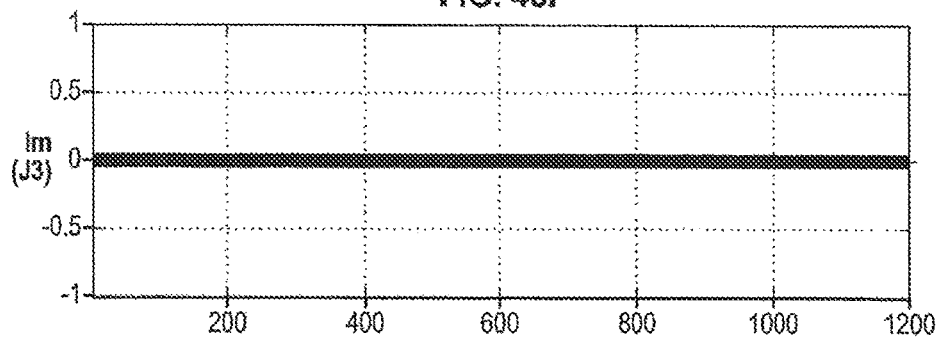

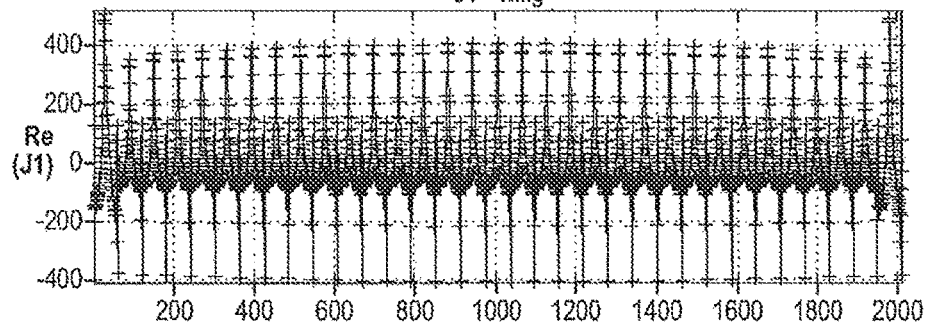
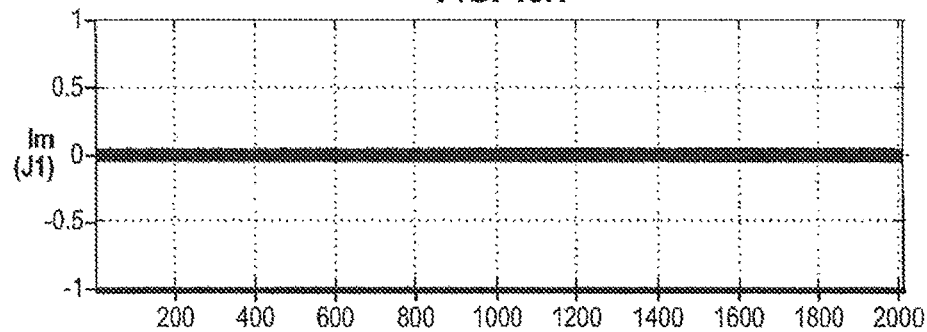
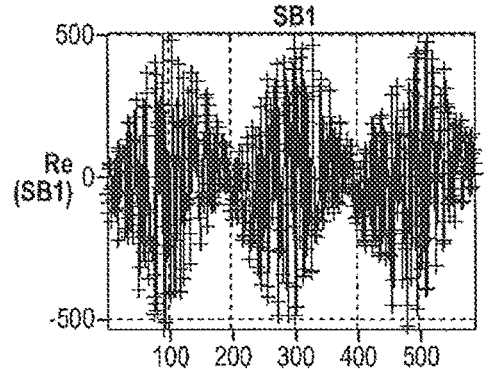
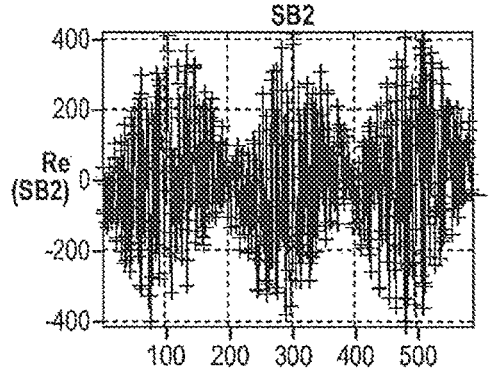
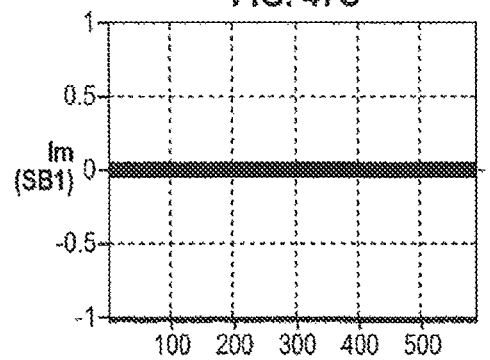
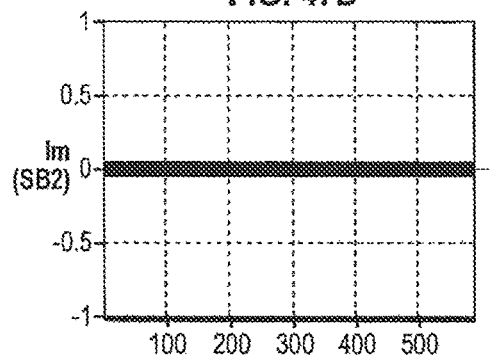

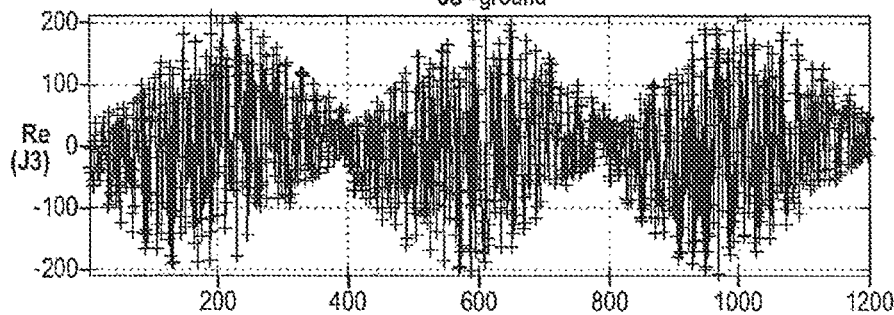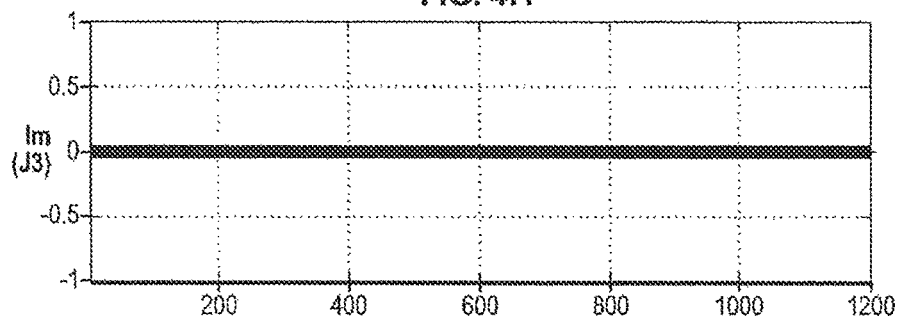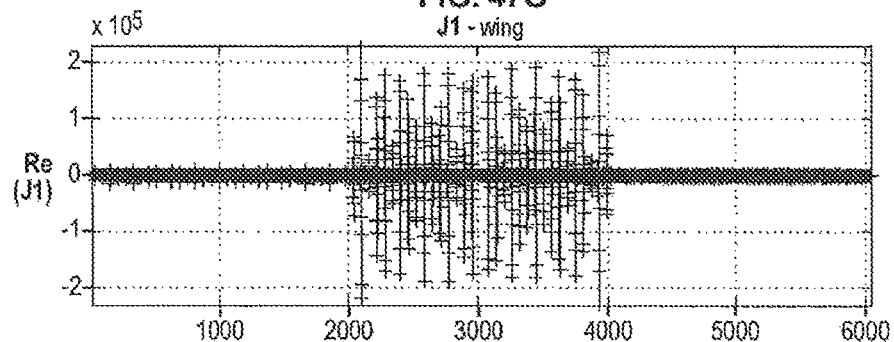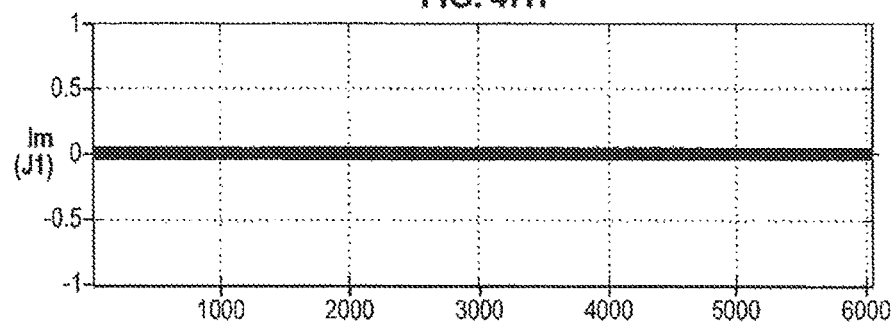

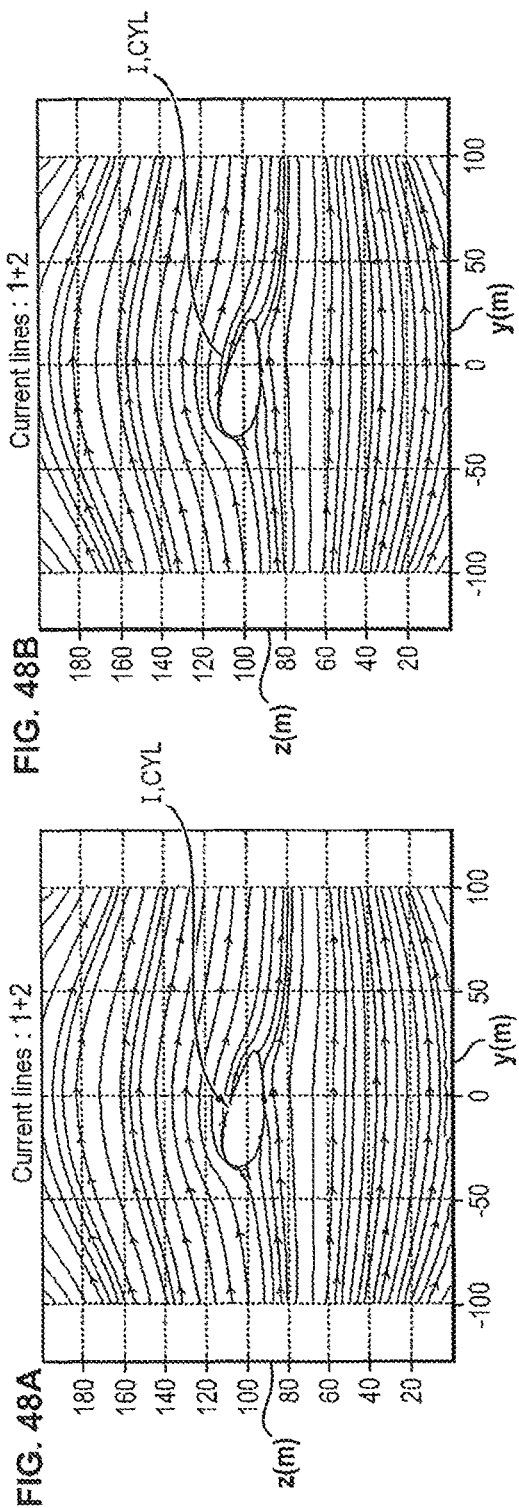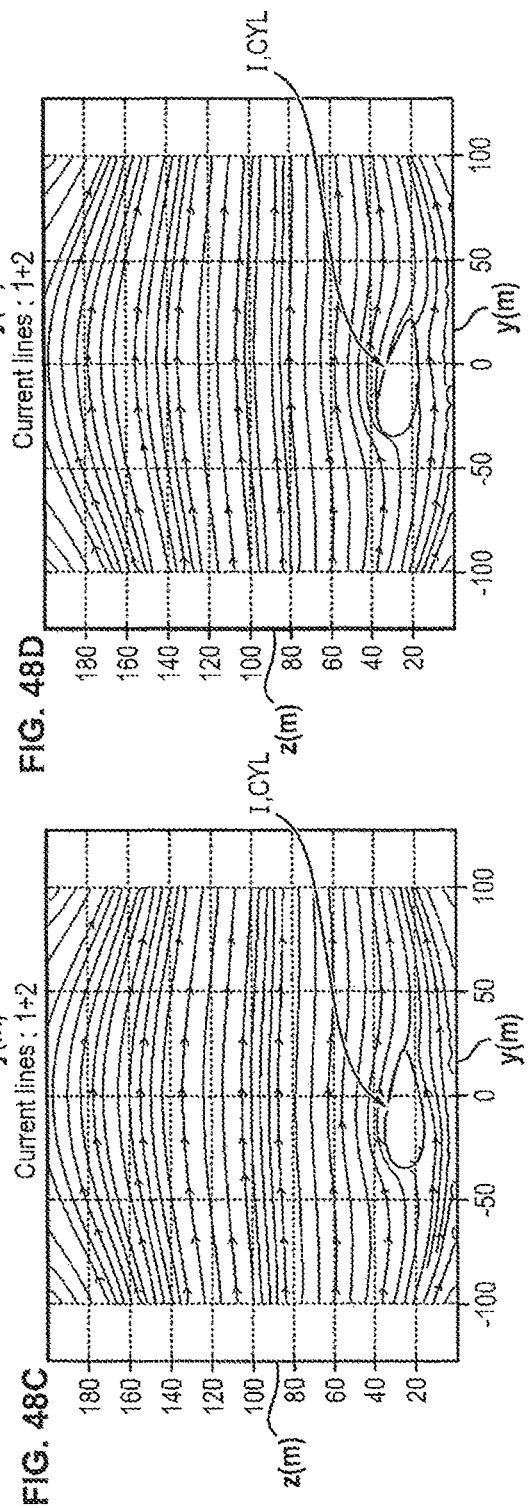
FIG. 48A  FIG. 48B  FIG. 48C  FIG. 48D

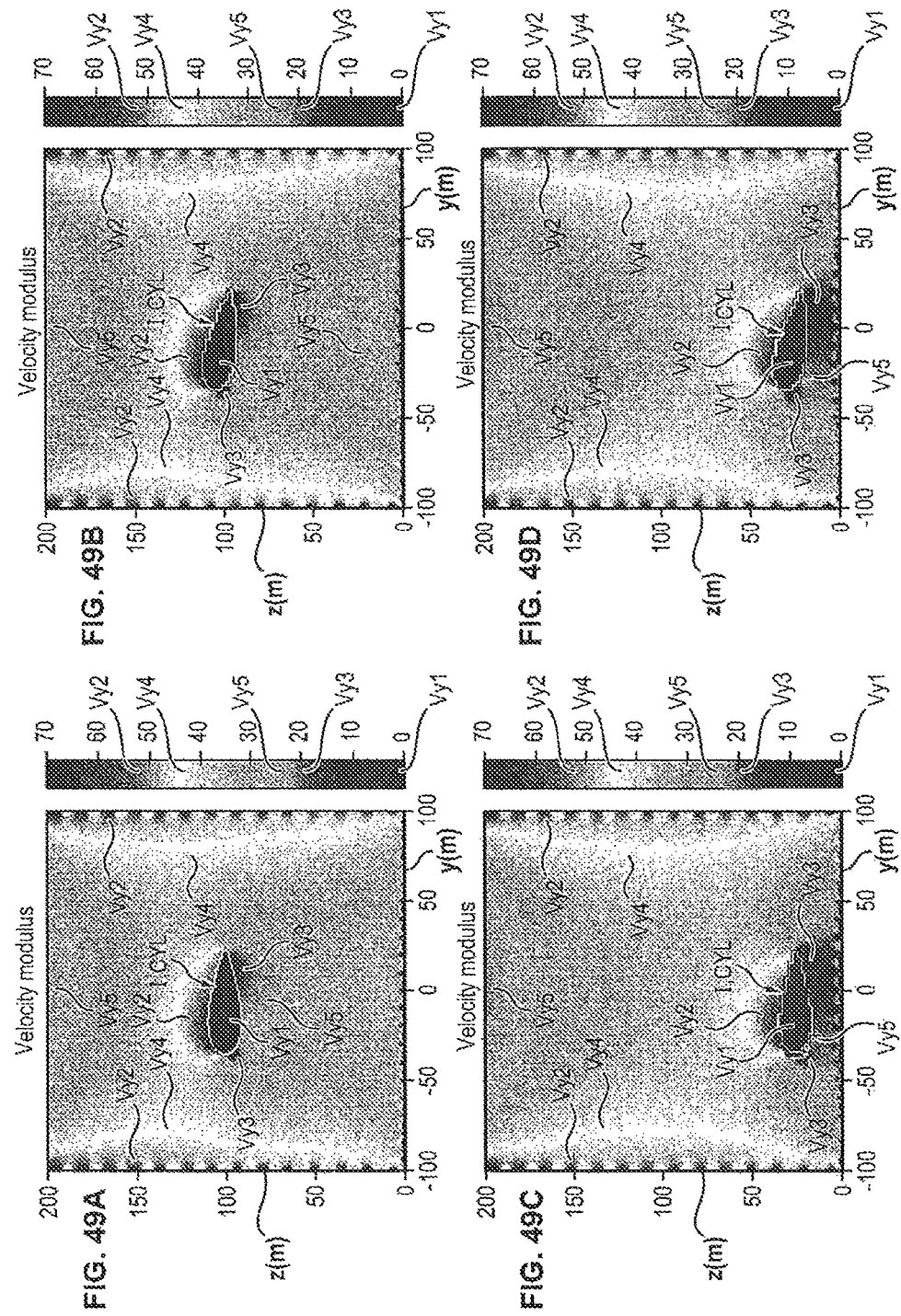

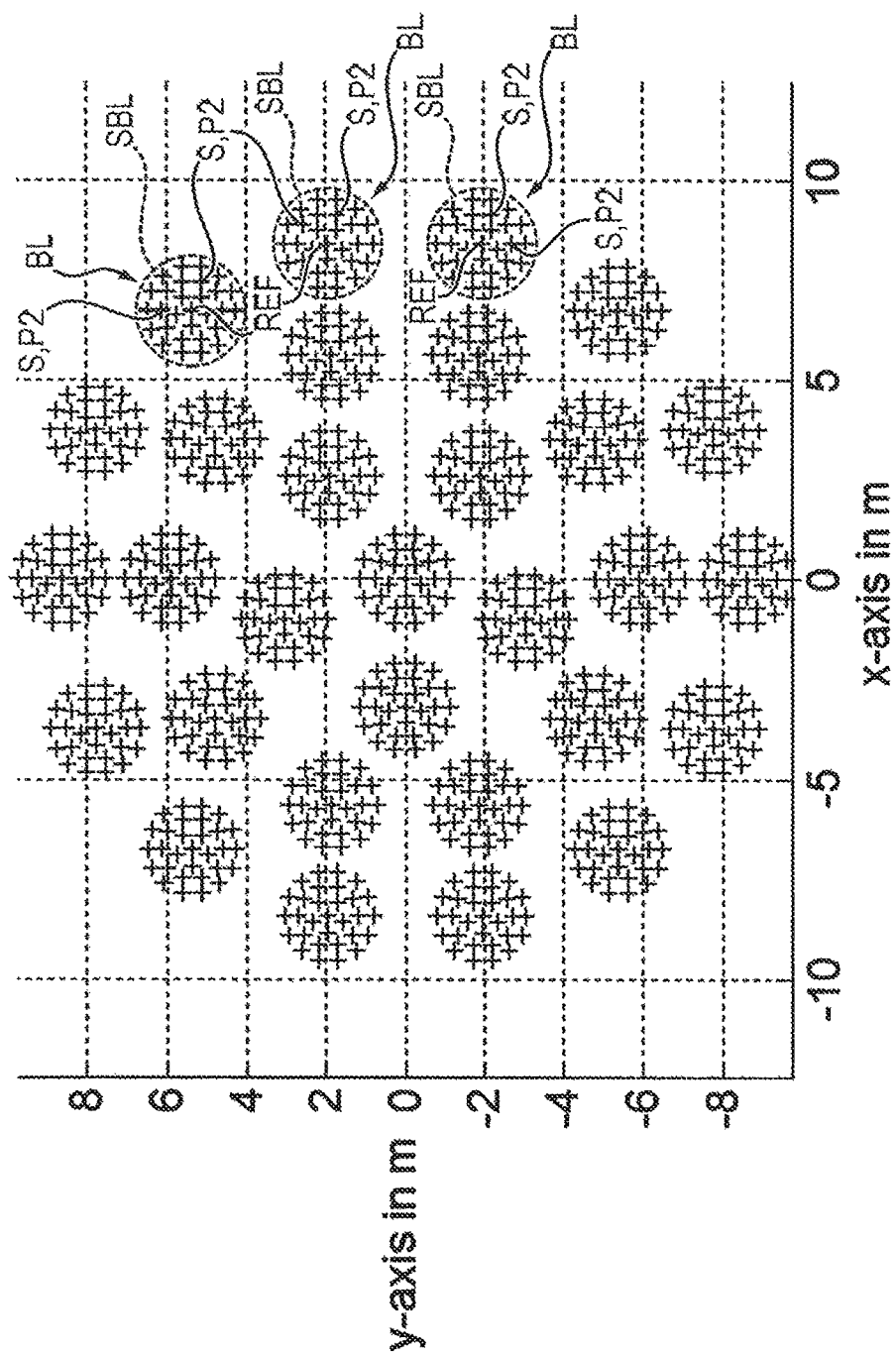

Values of the components of the velocity V in a plane xoy (families of vector sources)

DEVICE AND METHOD FOR MEASURING A PHYSICAL MAGNITUDE OF A FLUID FLOW

CROSS-REFERENCE TO RELATED APPLICATIONS

This application is a National Stage of International patent application PCT/EP2015/061464, filed on May 22, 2015, which claims priority to foreign French patent application No. FR 1454675, filed on May 23, 2014, the disclosures of which are incorporated by reference in their entirety.

FIELD OF THE INVENTION

The invention relates to a method for measuring a physical quantity of a fluid flow.

The field of the invention is fluid mechanics.

A more particular field of the invention relates to the determining of a physical quantity of a fluid flow around at least one profile such as, for example, the pressure of the fluid and/or the velocity of the fluid. One field of the invention relates also to the optimizing of the profiles in order to reduce the drags, and the improving of flight simulator operating algorithms.

One field of the invention is also the representing of the fluid flows around moving objects.

BACKGROUND

Airplane wing profiles can be cited for which the drag and lift has to be evaluated.

Methods for calculating in two dimensions by singular points or analytically are known.

Three-dimensional simulations by finite elements are also known.

One of the difficulties in fluid mechanics is acquiring the value of the physical quantity of the flow in a three-dimensional space.

Another difficulty is modeling, in fluid mechanics, complex profiles or objects in three dimensions.

In effect, having to measure a physical quantity of a fluid flow in three dimensions considerably weighs on the calculation times.

From the following documents, cases of applying the DPSM method are known for calculating the propagation of a wave in a space containing a fluid and a solid, by means of the distributed source calculation:

"Wave propagation in a fluid wedge over a solid half-space—Mesh-free analysis with experimental verification"; Cac Minh Dao, Samik Das, Sourav Banerjee, Tribikram Kundu; International Journal of Solids and Structures, New-York, US; vol. 46, no 11-12, $1^{st}$ Jun. 2009, pages 2486-2492 (D1), "Mesh-free distributed point source method for modeling viscous fluid motion between disks vibrating at ultrasonic frequency"; Yuji Wada, Tribikram Kundu, Kentaro Nakamura; The Journal of the Acoustical Society of America, American Institute of Physics for the Acoustical Society of America, New York, US; vol. 136, no 2, August 2014, pages 466-474 (D2), "Ultrasonic field modeling by distributed point source method for different transducer boundary conditions"; Tamaki Yanagita, Tribikram Kundu, Dominique Placko; The Journal of the Acoustical Society of America; vol. 126, no 5, November 2009, page 2331 (D3), "Ultrasonic field modeling in plates immersed in fluid"; Sourav Banerjee, Tribikram Kundu; International Journal of Solids and Structures, New York, US; vol. 44, no 18-19, 2007, pages 6013-6029 (D4), "Ultrasonic field modeling: a comparison of analytical, semi-analytical, and numerical techniques"; Tribikram Kundu, Dominique Placko, Ehsan Kabiri Rahani, Tamaki Yanagita, Cac Minh Dao; IEEE Transactions on Ultrasonics, Ferroelectrics and Frequency Control, IEEE, US; vol. 57, no 12, December 2010, pages 2795-2807 (D5), "Ultrasonic field modeling in multilayered fluid structures using the distributed point source method technique"; Sourav Banerjee, Tribikram Kundu, Dominique Placko; vol. 73, no 4, July 2006, pages 598-609 (D6),

WO 2011/092210 A1 (D7),

FR 2 895 544 A1 (D8),

"Ultrasonic Field Modeling of Transient Wave Propagation in Homogenous and Non-Homogenous Fluid Media Using Distributed Point Source Method (DPSM)"; Raghu Ram Tirukkavalluri, Dr. Abhijit Mukherjee, Sandeep Sharma; Internet Citation, 2008, pages 1-113 (D9).

However, the sources calculated in these documents do not make it possible to correctly model a fluid flow. In effect, in fluid mechanics, the equations are nonlinear, notably because of the fluid convection term not being involved in the modeling of waves. On the contrary, for the propagation of the waves, the equations have been linearized about a point of operation. Also, an ultrasound wave being propagating in a fluid according to the state of the art cannot be likened to a fluid flow. The propagation of an ultrasound wave in a fluid involves only a small oscillatory or alternating movement of fluid particles about a position of equilibrium, that is to say that some fluid particles which are the vehicle of the propagation of the ultrasound wave step by step each move by a small length and return to their position of equilibrium repetitively. The propagation of an ultrasound wave in a fluid therefore comes under a microscopic alternating movement of certain fluid particles, and not of a microscopic movement of all the fluid for a fluid flow.

Thus, for example in the case where the fluid is air, the documents D1 to D9 do not make it possible to take account of vortexes in proximity to an airplane wing.

The invention aims to take account of the convection or turbulence terms, specific to a fluid flow arriving in the vicinity of an interface.

The aim of the invention is to obtain a device and a method which make it possible to measure at least one physical quantity of at least one fluid flow in a three-dimensional space, which mitigate the drawbacks of the prior art, by being reliable, rapid and directly applicable to fluid mechanics.

SUMMARY OF THE INVENTION

To this end, a first embodiment of the invention provides a device for measuring at least a first physical quantity of at least one fluid flow in a three-dimensional space having at least one predetermined interface, situated between at least two media, characterized in that the device comprises:

at least one computer having means for prescribing at least two first and second boundary conditions concerning the first physical quantity of the fluid flow taken at least at a first predetermined test point of the interface, associated respectively with at least one first source and at least one second source, different from one another and distributed respectively at prescribed positions, distinct from the interface, the first source and the second source being selected from point sources of mass flow of fluid and/or of force, the computer having calculation means configured to calculate, by distributed point source calculation method, a first value of the first physical quantity from the first boundary condition and from at least the first source and at least one second value of the first physical quantity from at least the second boundary condition and from at least the second source, at at least one second point of the space, different from the first test point, then to combine the values obtained respectively from the boundary conditions and sources in order to calculate the first physical quantity.

Obviously, it is possible to provide as second boundary condition at least one or more other boundary conditions, different or not. Obviously, it is possible to provide as second source one or more other sources. Obviously, it is possible to provide for calculating as second value one or more other values.

By virtue of the invention, because of the different nature of the first and second sources, for example of their different directional orientations for the emission of fluid or of force, it is possible to calculate the first physical quantity of the fluid flow (for example its velocity at one or more points) to take account of the vortex phenomena. Because the first and the other source or sources calculated are of different natures, it is possible to take account of the velocity variations of the fluid particles and the vorticity of the fluid. Thus, it is possible for example to superimpose on the first value calculated for the first source or sources, the second value that can take account of second boundary conditions different from the first boundary conditions, to have a closer modeling of the reality and thus be able to measure a flow having vorticity.

A second embodiment of the invention provides a method for measuring at least a first physical quantity of at least one fluid flow in a three-dimensional space having at least one predetermined interface, situated between at least two media, characterized in that during a first iteration, there is prescribed, by at least one computer, at least one first boundary condition concerning the first physical quantity of the fluid flow taken at at least one first predetermined test point of the interface, associated respectively with at least one first source situated at a prescribed and distinct associated position of the interface, there is calculated, by the computer, by distributed point source calculation method, at at least one second point of the space, different from the first test point, a first value of the first physical quantity from the first boundary condition and from at least the first source, during a second iteration, there is prescribed, by the computer, at least one second boundary condition concerning the first physical quantity of the fluid flow taken at the first predetermined test point of the interface, associated respectively with at least one second source situated at a prescribed and distinct associated position of the interface, there is calculated, by the computer by distributed point source calculation method, a second value of the first physical quantity at the second point of the space from the second boundary condition and from at least the second source, the first source and the second source being different from one another and being chosen from point sources of mass flow of fluid and/or of force, the first physical quantity is calculated by combining, by the computer, the first value and the second value.

Obviously, several second iterations can be provided.

A third embodiment of the invention is a computer program, comprising instructions for implementing the measurement method as described above, when it is implemented on a computer.

LIST OF FIGURES OF THE DRAWINGS

The invention will be better understood on reading the following description, given purely as a nonlimiting example with reference to the attached drawings, in which:

FIGS. 1A and 1B represent an interface bathing in a fluid, for which a determination of at least one physical quantity is sought by the measurement method and device according to an embodiment of the invention, FIG. 2 represents a modular block diagram of a measurement device making it possible to implement the measurement method according to an embodiment of the invention, FIG. 3 represents a flow diagram of the measurement method according to an embodiment of the invention, FIGS. 4A, 4B, 15D, 15E, 15F, 19B, 19C, 36B represent an interface bathing in a fluid, for which a determination of at least one physical quantity is sought by the measurement method and the device according to an embodiment of the invention, FIGS. 5A, 5B, 6A, 6B, 7A, 7B, 8, 9, 10, 11A, 11B, 12A, 12B, 12C, 12D, 12E, 12F, 12G, 13A, 13B, 14A, 14B, 15A, 15B, 15C, 16A, 16B, 17A, 17B, 17C, 18A, 18B, 19N, 19P, 19O, 19Q, 19R, 19S, 19T, 19U, 19V, 36C, 36D, 37A, 37B, 37C, 37D, 37E, 37F, 37G, 40A, 40B, 40C, 41A, 41B, 41C, 44A, 44b, 44C, 45A, 45B, 45C, 52 to 60 represent physical quantities of a fluid flow, having been calculated by embodiments according to the invention, FIGS. 15D, 16C, 16D, 16E, 16F, 16G, 16H, 18C, 18D, 18E, 18F, 18G, 18H, 19D, 19E, 19F, 19G, 19H, 19I, 19J, 19K, 19L, 19M, 36A, 42A, 42B, 42C, 42D, 42E, 42F, 42G, 42H, 43A, 43B, 43C, 43D, 43E, 43F, 43G, 43H, 46A, 46B, 46C, 46D, 46E, 46F, 46G, 46H, 47A, 47B, 47C, 47D, 47E, 47F, 47G, 47H, 48A, 48B, 48C, 48D, 49A, 49B, 49C, 49D represent the value of the sources according to different examples, FIGS. 19A, 20, 21, 22, 23, 24, 25, 26, 27A, 27B, 27C, 28A, 28B, 28C, 29, 30, 31, 32, 33, 34, 38A, 38B, 38C, 50, 51A and 51B represent embodiments of the measurement method and of the measurement device according to the invention, FIG. 35 represents a flow diagram summarizing 13 particular cases which will be dealt with hereinbelow in the description, FIG. 39 represents an example of boundary condition vector on the wing I, SUR.

DETAILED DESCRIPTION OF THE INVENTION

FIGS. 1A, 1B, 4A and 4B represent an interface I situated between a first medium M1 and a second medium M2, of which at least one M2 is subjected to a fluid flow F. For example, the medium M1 is not subjected to the fluid flow F. For example, the interface I can be or comprise a surface SUR that is impermeable to the fluid F. The interface can comprise at least one surface of at least one solid or, more generally, of an object, being called profile in these cases. For example, the first medium M1 consists of the interior of the solid or of the object, delimited by the surface SUR, whereas the second medium M2 consists of the outside of the solid or of the object. According to an embodiment, the interface I separates the first medium M1 from the second medium M2. For example, the surface SUR is closed around the first medium M1. Moreover, the object or solid or interface I can be mobile, such as an airplane wing for example, represented by way of example in FIGS. 1B, 4B and 36B. The fluid F and/or the medium M2 can for example be air, water or the like. Several distinct interfaces I and I' can be provided. Obviously, hereinbelow, the interface I and/or the surface SUR can be or comprise an airplane wing.

A device and a method for measuring at least one physical quantity of at least one fluid flow F in the three-dimensional space, in which the predetermined interface I is located, are described hereinbelow.

For example, there is defined an orthonormal reference frame x, y, z of the three-dimensional space, or x and y are two horizontal directions and z is an ascending vertical direction.

According to an embodiment, the fluid flow is stationary and/or non-compressible. For example, the sources emit fluid or a force continuously in the case of a stationary fluid. Obviously, the fluid could also be non-stationary. Obviously, they are sources modeled for the computation of the first physical quantity.

According to an embodiment, the sources emit quantities of the same nature as the surrounding medium, instead of creating, in this medium, a phenomenon of different nature (one example of a phenomenon of different nature in the prior art is the generation of an electromagnetic wave in a fluid or a solid).

According to an embodiment, the measurement device comprises at least one computer having means E, CAL1 for prescribing at least one boundary condition L concerning the first physical quantity of the fluid flow F taken at least at a first predetermined test point P1 of the interface I.

According to an embodiment, the computer CAL has calculation means CAL2 configured to calculate, by DPSM method from the boundary condition L, the first physical quantity of the fluid flow F at at least one second point P of the space, different from the first test point P1.

According to an embodiment, there is provided a device for measuring at least one first physical quantity (V, P) of at least one fluid flow (F) in a three-dimensional space having at least one predetermined interface (I), situated between at least two media (M1, M2), characterized in that the device comprises:

at least one computer having means (E) for prescribing at least two first and second boundary conditions (L) concerning the first physical quantity (V, P) of the fluid flow (F) taken at least at a first predetermined test point (P1) of the interface (I), associated respectively with at least one first source and with at least one second source, different from one another and distributed respectively at prescribed, distinct positions of the interface (I), the first source and the second source being selected from point sources of mass flow of fluid and/or of force, the computer (CAL) having calculation means configured to calculate, by distributed point source calculation method, a first value of the first physical quantity from the first boundary condition (L) and from at least the first source and at least one second value of the first physical quantity from at least the second boundary condition and from at least the second source, at at least one second point (P) of the space, different from the first test point (P1), then to combine the values obtained respectively from the different boundary conditions and sources in order to calculate the first physical quantity.

According to an embodiment, there is provided a method for measuring at least one first physical quantity (V, P) of at least one fluid flow (F) in a three-dimensional space having at least one predetermined interface (I), situated between at least two media (M1, M2), characterized in that during a first iteration, there is prescribed, by at least one computer, at least one first boundary condition (L) concerning the first physical quantity (V, P) of the fluid flow (F) taken at at least one first predetermined test point (P1) of the interface (I), associated respectively with at least one first source situated at a prescribed and distinct associated position of the interface (I), there is calculated, by the computer (CAL) by distributed point source calculation method, at at least one second point (P) of the space, different from the first test point (P1), a first value of the first physical quantity from the first boundary condition (L) and from at least the first source, during a second iteration, there is prescribed, by the computer, at least one second boundary condition (L) concerning the first physical quantity (V, P) of the fluid flow (F) taken at the first predetermined test point (P1) of the interface (I), associated respectively with at least one second source situated at a prescribed and distinct associated position of the interface (I), there is calculated, by the computer (CAL) by distributed point source calculation method, a second value of the first physical quantity at the second point (P) of the space from the second boundary condition (L) and from at least the second source, the first source and the second source being different from one another and being selected from point sources of mass flow of fluid and/or of force, the first physical quantity is calculated by combining, by the computer, the first value and the second value.

For each value calculation, the calculation means can each implement steps described hereinbelow.

The calculation of the first value of the first physical quantity is performed for example during a first iteration of the steps, whereas the calculation of the second value of the first physical quantity is performed for example during a second iteration of the steps. Obviously, these iterations can be performed successively or simultaneously. The two iterations can be grouped together in a single calculation: for example, it is possible to combine two successive iterations of matrix calculations in a single calculation with a matrix twice as large.

$$M_1 * \lambda_1 + M_2 * \lambda_2 = (M_1 \quad M_2) * \begin{pmatrix} \lambda_1 \\ \lambda_2 \end{pmatrix}$$

Obviously, there can be more than two iterations.

Hereinbelow, the source can be the first source or the second source.

Several first sources can be provided.

Several second sources can be provided.

The position (or third point P2 hereinbelow) of the first source can be identical to or different from the position (or third point P2 hereinbelow) of the second source.

According to an embodiment, the first boundary condition is different from the second boundary condition.

According to an embodiment, the calculation means are configured to calculate the second value from the first source and from the second source, and to calculate the first physical quantity as being the second value. That is implemented for example in the case 7 described hereinbelow.

According to an embodiment, the calculation means are configured to calculate the second value from the first value of the second source, and to calculate the first physical quantity as being the second value.

According to an embodiment, the calculation means are configured to calculate the second value from the first source and from the second source, and to calculate the first physical quantity as being the second value. That is implemented for example in the case 6 described hereinbelow.

Thus, the results of the preceding steps can be used to determine the boundary conditions for the subsequent iterations. The results obtained in one iteration make it possible to calculate a quantity at the test points of a surface and to use these quantities to define the boundary conditions of the next iteration. For example: the flow around a wing profile satisfies two conditions, the normal velocity around the wing is zero and the velocity at the leak point is the same for the upper surface and the lower surface. The calculation is done in two iterations, the first having only the zero normal as boundary condition and the second iteration, using the velocities calculated in the first iteration, and conditions will be added to satisfy the equality of the velocities at the leak point. The invention allows, in some embodiments, an iterative resolution, in two or three steps, making it possible, between each step, to determine quantities which are reinjected in the subsequent steps, such as the tangential velocities or the definition of the boundary layer.

It is thus possible to define, in a non-uniform manner, the boundary conditions on the surfaces. It is possible to define particular conditions at certain points only, from elements calculated previously. For example, it is possible to model the loss of lift of certain zones of a wing at the beginning of the lifting of the boundary layer (approaching the breakdown of a profile), by modifying the value of the boundary conditions only in these zones. The conditions applied to these zones can be defined geometrically (angle greater than a certain breakdown angle) or physically (pressure below a threshold or velocity value calculated outside of a realistic value). For example, that is used in the calculation of a macroscopic quantity such as the coefficient of lift Cz or of drag Cx, and makes it possible to obtain, for example, a curve of Cz which passes through a maximum then drops back after the incidence of breakdown, as is illustrated below with reference to the example 1 for FIG. 56.

Steps of the Measurement Method

During a first step E1, there is prescribed, by at least one computer, at least one boundary condition L concerning the first physical quantity of the fluid flow F taken at at least one first predetermined test point P1 of the interface I.

During a second step E2, there is calculated, by the computer CAL by DPSM method from the boundary condition L, the first physical quantity of the fluid flow F at at least one second point P of the space, different from the first test point P1.

According to an embodiment, during a preliminary step, the coordinates of the interface I in the space are determined.

According to an embodiment, the first step E1 can comprise, for example, the preliminary step, in which the coordinates of the first predetermined test point P1 of the interface I, at which the predetermined boundary conditions L are situated, are entered on data input means ME of the computer CAL.

According to an embodiment, the computer CAL can be a computer that has, for data input means ME, a keyboard or any other data input access for example, and, for data output means SD, a display screen or similar. The computer CAL comprises one or more computer programs provided to implement the steps and means described.

According to an embodiment, the coordinates of the interface I are determined, and/or the coordinates of the interface I are entered by the data input means ME of the computer CAL, and/or the predetermined boundary conditions L at several predetermined points P1 of the interface I or at all the interface I are entered on the data input means ME of the computer CAL. Thus, the measurement method can comprise a preprocessing phase consisting in describing the three-dimensional geometry of the problem and in particular in drawing each of the objects (interface I, surface SUR).

According to another embodiment, the boundary condition(s) L and/or the first test point(s) are prescribed in the computer CAL, for example by a computer program, or by being prestored in a memory or originating from another computer.

The DPSM method is the distributed point source method. The first physical quantity can for example be a macroscopic quantity of the fluid.

The first physical quantity can for example be one out of the velocity V of the fluid flow F, the pressure P of the fluid F and/or another quantity. The physical quantity is for example calculated at one or more points P of the second medium M2 or throughout the medium M2. The first physical quantity can notably be the velocity vector of the fluid flow F in the space at one or more points P of the medium M2 or throughout the medium M2. Hereinbelow, the first quantity V, P is considered. The fluid flow can be situated in air, water or another medium.

According to an embodiment, the computer CAL comprises second means CAL3 for calculating, from the first physical quantity having been calculated, a property of the interface I in the fluid flow F, different from the first physical quantity.

According to an embodiment, the property is the drag induced by the interface I in the fluid flow F and/or the lift of the interface I in the fluid flow F and/or a friction force of the interface I in the fluid flow F.

According to an embodiment, the computer CAL comprises output means SD for supplying the first physical quantity having been calculated and/or the property having been calculated. According to an embodiment, during a third step E3 of the method, the physical quantity having been calculated by the computer CAL and/or the property having been calculated is/are supplied on the data output means SD of the computer CAL.

According to an embodiment, the computer CAL comprises third means CAL4 for calculating a second control quantity of an actuator from at least the first physical quantity having been calculated and/or from at least the property having been calculated.

According to an embodiment, the means CAL1 and/or CAL2 and/or CAL3 and/or CAL4 are automatic, by being for example each implemented by a computer program.

According to another embodiment, the computer sends, over its output means SD, the first quantity having been calculated to another computer responsible for calculating a control quantity of an actuator as a function at least of this first quantity.

The device according to the invention comprises corresponding means for implementing the steps of the method.

The means ME, CAL1, CAL2, CAL3, CAL4 can be distributed over different computers or processors, or be implemented by one and the same computer or processor.

According to an embodiment, in the second step E2, the position of at least one third point P2 distinct from the interface I, at which at least one source S of fluid is located, is prescribed.

The DPSM method is used to calculate at least one parameter of the source S of fluid from the boundary condition L concerning the first physical quantity of the fluid flow F taken at the first test point P1 of the interface I.

The DPSM method is used to calculate the first physical quantity of the fluid flow F situated at the second point P of the space, from the parameter of the source S of fluid having been calculated.

Thus, at least one source S of fluid is positioned at at least one second distinct point P2 of the interface I.

According to an embodiment, the calculation means CAL2 are configured to calculate by DPSM method:

at least one parameter of at least one modeled source S of fluid, situated at at least one third point P2 of prescribed position, distinct from the interface I, from the boundary condition L, the first physical quantity of the fluid flow F situated at the second point P of the space, from the parameter of the source S of fluid, having been calculated.

Each source is a point source.

The parameter or parameters can correspond for example to A or to a hereinbelow.

According to an embodiment, the source S of fluid is separated from the first predetermined test point P1 of the interface I.

A plurality of sources S of fluid can be provided at, respectively, a plurality of second points P2 distinct from the interface I. In this case, the sources have spatial positions distinct from one another at the points P2. In the case of several sources in a group, the sources of this group have spatial positions that are distinct from one another at the points P2.

According to an embodiment, the interface I comprises at least one surface SUR of at least one solid, impermeable to the fluid F, at least one source S of fluid associated with the first test point P1 being situated at a distance from the first test point P1 below the surface SUR of the solid, on the other side of the fluid flow F.

According to an embodiment, the source is modeled to emit fluid or a force through the interface I.

Several sources S of fluid can be provided, associated with the first test point P1 and situated at a distance from the first test point P1 below the surface SUR of the solid, on the other side of the fluid flow F. There can be provided, in association with a plurality of first test points P1, a plurality of groups each comprising one or more sources S of fluid, situated at a distance from the first test point P1 below the surface SUR of the solid, on the other side of the fluid flow F. In these embodiments, the source or sources S of fluid associated with the first test point P1 are situated in the first medium M1 not subjected to the fluid flow F. In this case, the source S is modeled to emit fluid (or a force) through the interface I and the surface SUR in the second medium M2 subjected to the fluid flow F. For example, this or these sources S can be at a minimum distance below the surface SUR. The distance between this or these sources and the surface SUR can be different between the sources. This embodiment can be taken in combination with all the other embodiments described. These embodiments are hereinafter called first underlying embodiment.

According to an embodiment, there are provided, in addition to the first test point or points of the interface I, one or more other test points P5 not situated at the interface I and situated in the fluid flow F.

According to an embodiment, the prescribing means are provided to prescribe at least one boundary condition concerning the first physical quantity of the fluid flow F taken at this or these other test points P5.

According to an embodiment, the prescribing means are provided to further prescribe at least one other boundary condition of the fluid flow at at least one other point at a non-zero prescribed distance away from the interface I and a prescribed global direction of flow of the fluid flow from this distant point to the interface I. This other boundary condition can be, for example, the first uniform quantity in the space at this prescribed distance from the interface or at more than the prescribed distance from the interface. For example, this other boundary condition can be the velocity of the wind and/or the orientation of the wind at a distance from the interface, or the difference between the wind and the velocity of movement of the interface (for example in the case of an interface formed by an airplane wing).

According to an embodiment, the prescribing means CAL1 are provided to prescribe a boundary condition comprising at least one out of:

at the first test point P1 at the interface I, a normal fluid F velocity component that is zero, at the first test point P1 at the interface I, a tangential fluid F velocity component that is zero, at the first test point P1 at the interface I, a tangential fluid F velocity component that is prescribed, that can be non-zero, at the other test point P5 at the surface delimiting the boundary layer CL of the fluid flow F, a normal fluid F velocity component that is zero, at the other test point P5 at the surface delimiting the boundary layer CL of the fluid flow F, a normal fluid F velocity component that is conserved, at the other test point P5 at the surface delimiting the boundary layer CL of the fluid flow F, a normal fluid F velocity component that is conserved modulo the density of the fluid, at the other test point P5 at the surface delimiting the boundary layer CL of the fluid flow F, a continuity of the tangential fluid F velocity component, for example equal to the initial velocity of the fluid, at the first test point P1 at the interface I, a fluid pressure value, at the other test point P5 at the surface delimiting the boundary layer CL of the fluid flow, continuity of the pressure.

For example, the velocity is zero at the surface of the impermeable objects.

According to an embodiment, at least one source S of fluid not associated with the first test point P1 and situated in the fluid flow F is provided. At least one source S of fluid in association with at least one other prescribed test point P5 not situated at the interface I and situated in the fluid flow F, can be provided. Several sources S of fluid associated with another test point P5 not situated at the interface I and situated in the fluid flow F can be provided. A plurality of these other test points P5 not situated at the interface I and situated in the fluid flow F can be provided. A plurality of groups each comprising one or more sources S of fluid can be provided, in association with a plurality of other test points P5 not situated at the interface I and situated in the fluid flow F.

This or these other test points P5 can be at the surface SCL delimiting the boundary layer CL of the fluid flow F. For example, this or these sources S of fluid not associated with the first test point P1, and/or situated in the fluid flow F and/or associated with at least one other test point P5, can be at a minimum distance from the surface SCL. The distance between this or these sources and the surface SCL can be different between the sources. Means are provided to determine the coordinates of the surface SCL of the boundary layer.

A first zone Z1, or inner zone Z1, is defined that is situated between the surface SCL delimiting the boundary layer CL of the fluid flow F and the interface I, and a second zone Z2, or outer zone Z2, is defined that is situated above the surface SCL and situated on the other side relative to the interface I. The source or sources S of fluid not associated with a first test point P1 can be either in the first zone Z1, or in the second zone Z2, and at a distance from the surface SCL delimiting the boundary layer CL. The fluid is viscous in the boundary layer, that is to say in the first inner zone Z1, whereas the fluid is considered to be perfect above the boundary layer, that is to say in the second outer zone Z2. The boundary layer CL is delimited by the slip surface SCL. The boundary layer CL is prolonged by a wake. In the case of an airplane wing in flying conditions, the surface SCL of the boundary layer CL is at a few millimeters from the surface SUR of the airplane wing, formed in this case by the interface I.

As is represented in FIGS. 1B, 4B and 20, in the embodiments providing a group BL of sources, that can hereinbelow be a doublet of sources S1, S2, three sources S1, S2, S3, also called triplet of sources S1, S2, S3 or the like, this group BL of sources can be associated with a test point (first test point P1 situated at the interface I or other test point P5 not situated at the interface I). Each source S1, S2, S3 of the group BL is located at a position P2 that is different, from one source to the other of the group B. Hereinbelow, each group BL or BL' is also called block BL or BL'.

According to one possibility of arrangement represented in FIG. 20, the sources S1, S2, S3 of the group BL can be situated around a central point SB or ST. The central point SB or ST can be located on the normal N to the mesh element EM of the surface SUR of the interface I or of the surface SCL delimiting the boundary layer CL. The point SB is on the normal N in the direction going into the mesh element EM, whereas the point ST is on the normal N in the direction outgoing from the mesh element EM. According to the modeling, it is possible to use a source at the central point SB and/or ST, or a doublet of sources around the central point SB and/or ST, or a triplet of sources around the central point SB and/or ST, or several thereof. Obviously, this possibility of arrangement is not limiting and another arrangement of the sources can be provided.

Calculation of the Sources and of the Physical Quantity of the Fluid Flow by DPSM Method:

Embodiments of this calculation are described hereinbelow in more detail.

According to an embodiment, the calculation means CAL2 store a global resolution matrix M, comprising at least one coefficient $M_{ij}$ dependent on both a prescribed value characterizing the fluid and the distance $R_{ij}$ between a source S and a fourth point P of the space, the product of the global resolution matrix M, taken at the first test points P1 as fourth point P of the space, multiplied by a first vector J of the parameters of the first and/or second and/or any source S, being equal to a second vector C of the boundary conditions concerning the first physical quantity V of the fluid flow taken at the first test points P1, according to the equation C=M*J, where * designates multiplication.

According to an embodiment, the coefficient $M_{ij}$ represents the quantity of fluid or of force emitted by the jth source Sj on the ith test point Pi. $M_{ij}$ can be a real number or itself a matrix (for example 3×3), depending on the case. According to an embodiment, for each pair of surfaces, there is a matrix called "coupling matrix". According to an embodiment, the global resolution matrix M is composed of coupling matrices, themselves composed of coefficients $M_{ij}$.

According to an embodiment, the prescribed value characterizing the fluid is the density ρ of the fluid and/or the kinematic viscosity μ of the fluid.

According to an embodiment, there are provided, among the calculation means CAL2:

a means for inverting the global resolution matrix M, taken at the first test points P1 as fourth point P of the space, to calculate the inverse matrix $M^{-1}$, and a means for calculating the first vector J of the parameters of the first and/or second and/or any source S by multiplying the inverse matrix $M^{-1}$ by the second vector C of the boundary conditions of the first physical quantity V of the fluid flow taken at the first test points P1, according to the equation $J=M^{-1}*C$.

According to an embodiment, there is provided, among the calculation means CAL2:

a means for calculating the first physical quantity of the fluid flow F at the second point P of the space having a determined position, by multiplying the global resolution matrix M, calculated at said determined position of the second point P as fourth point P, by the first vector J of the parameters of the first and/or second source and/or of any source S. A plurality of fourth points P is for example provided.

The DPSM makes it possible to model, by one or more sources S of fluid or of force, placed at predetermined positions, the physical quantity of the fluid flow that has to be calculated.

The parameter or parameters defining the source or sources S of fluid or of force are obtained first of all by calculation from the boundary conditions L of the interface I, and from the predetermined positions of the sources S of fluid or of force.

Once the sources S of fluid or of force are calculated, the value of the physical quantity of the fluid flow is obtained therefrom.

According to an embodiment, the DPSM method requires the surfaces SUR of the objects (or interfaces I), and possibly of the surface SCL of the boundary layer CL, to be meshed, in order to create a set of first test points P1 (or P5 for SCL). The meshing comprises a plurality of mesh elements EM of the surface SUR or SCL, each mesh element EM being a planar portion, for example triangular or of another form, in which the first test point P1 or the other test point P5 is for example located.

According to an embodiment, on just one side or on either side of each test point, a group BL is arranged containing one or more individual sources S (also called "singularities"), the set of these groups being intended ultimately to synthesize the physical quantities in the respective media M1 and M2 adjacent to these surfaces.

The interaction between the sources S and the test points P1 belonging to the same object or to the same interface I can then be written in the form of a first coupling matrix, called self-coupling matrix. The interaction between the sources S and the test points P1 belonging to different objects will, for its part, be written in the form of a second matrix, called intercoupling matrix.

According to an embodiment, these individual matrices satisfying all the boundary conditions L between the different media produce a third global matrix M, the inversion of which gives access to the value of the sources S. The global resolution matrix M and the vector C of boundary conditions make it possible, by inversion of this matrix M, to find the value of each individual source S.

According to an embodiment, the global resolution matrix M is square. According to an embodiment, the global resolution matrix M is not square and, in this case, the values of the sources are obtained by pseudo-inversion of the matrix.

According to an embodiment, a number $N_S$ of sources S of fluid or of force and a number $N_P$ of test points (first test points P1 and possibly other test points P5) distinct from one another are provided, such that the global resolution matrix M is square.

According to an embodiment, the number $N_P$ of test points (first test points P1 and possibly other test points P5) of the boundary conditions L is greater than or equal to the number $N_S$ of sources S of fluid or force.

According to an embodiment, the number $N_P$ of test points (first test points P1 and possibly other test points P5) of the boundary conditions L is equal to the number $N_S$ of sources S of fluid or of force.

A preliminary step of determination of the global resolution matrix is provided, which is performed by the calculation means CAL2 of the computer as is described above.

According to an embodiment, the post-processing then consists in using the fluid (or force) emitted by the set of sources S to calculate the physical quantities throughout the space (inside and outside of the objects or the interface I).

By superimposition of the sources S that have been calculated, the first physical quantity is synthesized by these sources.

According to an embodiment, the DPSM method can be applied to a laminar fluid flow F.

The DPSM method makes it possible to model, in fluid mechanics, complex profiles or objects I (for example airplanes or airplane wings) in three dimensions (instead of two dimensions with the singular points methods using only the scalar potential). The DPSM method makes it possible to notably reduce the calculation times by the reduction of the number of elements (meshing of the surfaces and not of the space). Furthermore, the DPSM method makes it possible to solve problems in which several objects I are in interaction (an airplane approaching the ground involving a ground effect for example).

According to an embodiment, the method has interactive applications: assuming that the geometries of the problem are not changed, only the boundary conditions, the method makes it possible to directly generate the resolution matrix. The method describes a two-stage resolution: generation of the coupling matrix Mc, inversion and calculation of the values of the Lambda sources from the vector Vcl of the boundary conditions: Lambda=inv(Mc)*Vcl.

Then, according to an embodiment, in a second stage, the matrix Ms is generated for the points of the space and the quantities G at these points are calculated: G=Ms*Lambda.

According to an embodiment, which tends to be used a lot with the DPSM method used in the present invention, in the context of real-time applications (integrations of algorithms in flight simulators for example), consists in effector in this calculation in a single step, by grouping together the preceding equations and by directly calculating the quantities of the space by: G=Ms*inv(Mc)*Vcl.

The matrix Ms*inv(Mc) is then calculated once for all, and a new result G is obtained in a very short time by simply multiplying this matrix by a new boundary conditions vector Vcl. Note that this calculation makes it possible to also obtain the macroscopic quantities Gm mentioned, by the introduction of a matrix Mm of macroscopic calculations:

$Gm=Mm*G=Mm*Ms*inv(Mc)*Vcl.$

To give only one example, if it is assumed that the values of a vector field along a path have been obtained in the calculation of the vector G, then the circulation of this vector will be calculated by using, for matrix Mm, a lower triangular matrix (composed of ones in the lower triangular part including the diagonal and of zeroes in the upper triangular part). This concept of calculation of macroscopic quantities can be extended to the case of nonlinear calculations such as calculations of forces or of pressures which require the velocities to be raised to the power of two.

According to an embodiment, the first source has a first orientation of fluid or force emission, and the second source has a second orientation of fluid or force emission which is different from the first orientation of fluid emission. For example, this first orientation of fluid or force emission is radial, whereas the second orientation of fluid or force emission is rotational, for example as is described below. The second orientation of rotational fluid emission signifies that, at the point P distant from the second source, the fluid or the force is directed tangentially relative to the radial direction joining this point P to the second source (at the point P2 where this second source is positioned). For example, the second orientation of fluid or force emission is perpendicular to the first orientation of fluid or force emission.

According to an embodiment, the first source is or comprises at least one point source of radial mass flow rate of fluid. This source is also called scalar source.

According to an embodiment, the second source is or comprises at least one point source of rotational mass flow rate of fluid around a determined direction. This source is also called rotational source.

According to an embodiment, the second source is or comprises at least one point source of force.

The pair formed by the at least one first source and at least one second source is called hybrid source. The introduction of hybrid sources, containing scalar and vector sources, makes it possible to satisfy the conditions imposed by vorticity.

Embodiments of first and second sources are described for example in the cases 6, 7, 9, 10, 11, 12, 13 described hereinbelow, where the first source is designated S100 and the second source is designated S200.

According to an embodiment, one or more point sources of radial mass flow rate of fluid and/or one or more point sources of rotational mass flow rate of fluid and/or one or more sources of force are provided. For example, 2, 3 or 4 sources, chosen from the above-mentioned types of sources, can be provided.

It is thus possible to provide two rotational sources and one scalar source, or four sources, such as, for example, three rotational sources and one scalar source, associated with each test point. According to an embodiment, the invention can also be generalized to six sources (three rotational sources and three scalar sources) associated with each test point, with corresponding boundary conditions.

According to an embodiment, the presence of at least one rotational source makes it possible to calculate the lift and/or the drag and/or to take account of a reversible flow and/or to take account of energy losses around the interface I.

Source of Mass Flow Rate of Fluid

A source of mass flow rate of fluid can be a source of radial mass flow rate of fluid or a source of rotational mass flow rate of fluid.

According to an embodiment, the global resolution matrix M comprises several coefficients, of which at least one is equal to, for at least one point source of mass flow rate of fluid as first and/or second source and/or any other source (S):

$\pm(x_i-x_j)/(4\cdot\pi\cdot\rho\cdot R_{ij})$, or to $\pm(y_i-y_j)/(4\cdot\pi\cdot\rho\cdot R_{ij})$, or to $\pm(z_i-z_j)/(4\cdot\pi\cdot\rho\cdot R_{ij})$, or to $\pm(x_i-x_j)/(4\cdot\pi\cdot\rho\cdot R_{ij}^3)$, or to $\pm(y_i-y_j)/(4\cdot\pi\cdot\rho\cdot R_{ij}^3)$, or to $\pm(z_i-z_j)/(4\cdot\pi\cdot\rho\cdot R_{ij}^3)$, or to $1/(4\cdot\pi\cdot\rho\cdot R_{ij})$, or to one thereof, multiplied by a prescribed constant, by which the first vector (J) of the parameters of the point source (Sj) of mass flow rate of fluid is divided, where $R_{ij}$ is the distance between the point source (Sj) of mass flow rate of fluid situated at the third point (P2) of prescribed position $x_j$, $y_j$, $z_j$ according to three non-coplanar directions x, y and z of the space and the fourth point (P) of the space having coordinates $x_i$, $y_i$, $z_i$ according to the three directions x, y and z.

Scalar Source

According to an embodiment, in the case of a point source of radial mass flow rate of fluid, that can be the first and/or second source and/or any other source (S), for the first quantity equal to the velocity of the fluid, the global resolution matrix (M) comprises several coefficients, of which at least one is equal to $\pm(x_i-x_j)/(4\cdot\pi\cdot\rho\cdot R_{ij}^3)$, or to $\pm(y_i-y_j)/(4\cdot\pi\cdot\rho\cdot R_{ij}^3)$, or to $\pm(z_i-z_j)/(4\cdot\pi\cdot\rho\cdot R_{ij}^3)$, or to one thereof, multiplied by a prescribed constant, by which the first vector (J) of the parameters of the point source (Sj) of radial mass flow rate of fluid is divided.

According to an embodiment, in the case of a point source of radial mass flow rate of fluid, that can be the first and/or second source and/or any other source (S), for the first quantity equal to a velocity potential of the fluid, the global resolution matrix (M) comprises several coefficients, of which at least one is equal to $1/(4\cdot\pi\cdot\rho\cdot R_{ij})$, or to the latter, multiplied by a prescribed constant, by which the first vector (J) of the parameters of the point source (Sj) of radial mass flow rate of fluid is divided. The velocity potential θ is linked to the velocity vector V by the equation V=−grad θ.

According to an embodiment, in the case of a point source of radial mass flow rate of fluid, the parameters of this source are homogeneous at $M \cdot T^{-1}$ in international system units, that is to say in kg/s for example.

According to an embodiment, for a point source of rotational mass flow rate of fluid, the matrix M comprises the following submatrix:

$$M_{AS}^x = \frac{1}{4\pi\rho}\begin{pmatrix} \frac{(x_{A1}-x_{S1})}{R_{11}^3} & \cdots & \frac{(x_{An}-x_{S1})}{R_{p1}^3} \\ \vdots & \ddots & \vdots \\ \frac{(x_{A1}-x_{Sn})}{R_{1n}^3} & \cdots & \frac{(x_{Ap}-x_{Sn})}{R_{pn}^3} \end{pmatrix}$$

According to an embodiment, for a point source of radial mass flow rate of fluid, the matrix M is of the following form:

$$\begin{pmatrix} \begin{pmatrix} V_x^1 \\ \vdots \\ V_x^n \end{pmatrix} \\ (V_y)_{1\ldots n} \\ (V_z)_{1\ldots n} \\ (0)_{1\ldots p} \end{pmatrix} = \begin{pmatrix} M_{S_1S}^x & M_{S_2S}^x & M_{S_3S}^x & M_{AS}^x \\ M_{S_1S}^y & M_{S_2S}^y & M_{S_3S}^y & M_{AS}^y \\ M_{S_1S}^z & M_{S_2S}^z & M_{S_3S}^z & M_{AS}^z \\ M_{S_1A}^\perp & M_{S_2A}^\perp & M_{S_3A}^\perp & M_{AA}^\perp \end{pmatrix} * \begin{pmatrix} \begin{pmatrix} \lambda_{S1}^1 \\ \vdots \\ \lambda_{S1}^n \end{pmatrix} \\ (\lambda_{S2})_{1\ldots n} \\ (\lambda_{S3})_{1\ldots n} \\ (\lambda_A)_{1\ldots p} \end{pmatrix}$$

$M_{SP}^x$ coupling matrix between the sources of S and the test points of P.

x designates the component in x and ⊥ designates the projection on the normal at the test point.

$$M_{AS}^x = \frac{1}{4\pi\rho}\begin{pmatrix} \frac{(x_{A1}-x_{S1})}{R_{11}^3} & \cdots & \frac{(x_{An}-x_{S1})}{R_{p1}^3} \\ \vdots & \ddots & \vdots \\ \frac{(x_{A1}-x_{Sn})}{R_{1n}^3} & \cdots & \frac{(x_{Ap}-x_{Sn})}{R_{pn}^3} \end{pmatrix}$$

This embodiment corresponds to an example 1.

According to an embodiment, the scalar source of fluid is a source of isotropic mass flow rate of fluid.

Embodiments of one or more point sources of radial mass flow rate of fluid (scalar sources) are described for example in the cases 1 to 7, 9, 10 described hereinbelow.

According to an embodiment, the first source is or comprises at least one point source (S) of radial mass flow rate of fluid for the first boundary condition (L) having, at the first test point (P1), a normal fluid velocity component at the first test point (P1), which is zero at the interface (I) and/or for another prescribed boundary condition having, at at least one other point at a prescribed distance away from the interface (I), a prescribed velocity component, for example non-zero. This embodiment corresponds to the example 1.

An imaged representation of a scalar source would be a kind of DPSM bubble containing a fluid under pressure (or fed externally by a fluid under pressure) escaping radially through the surface of this sphere.

Rotational Source

According to an embodiment, in the case of a point source of rotational mass flow rate of fluid, that can be the first and/or second source and/or any other source (S), for the first quantity equal to the velocity of the fluid, the global resolution matrix (M) comprises several coefficients, of which at least one is equal to $\pm(x_i-x_j)/(4\cdot\pi\cdot\rho\cdot R_{ij}^3)$, or to $\pm(y_i-y_j)/(4\cdot\pi\cdot\rho\cdot R_{ij}^3)$, or to $\pm(z_i-z_j)/(4\cdot\pi\cdot\rho\cdot R_{ij}^3)$, or to one thereof, multiplied by a prescribed constant, by which the first vector (J) of the parameters of the point source (Sj) of rotational mass flow rate of fluid is divided.

According to an embodiment, in the case of a point source of rotational mass flow rate of fluid, that can be the first and/or second source and/or any other source (S), for the first quantity equal to the velocity potential of the fluid, the global resolution matrix (M) comprises several coefficients, of which at least one is equal to $1/(4\cdot\pi\cdot\rho\cdot R_{ij})$, or to the latter, multiplied by a prescribed constant, by which the first vector (J) of the parameters of the point source (Sj) of rotational mass flow rate of fluid is divided.

According to an embodiment, in the case of a point source of rotational mass flow rate of fluid, the parameters of this source are homogeneous at $M \cdot T^{-1}$ in international system units, that is to say in kg/s for example.

According to an embodiment, for a point source of rotational mass flow rate of fluid, the matrix M comprises the following submatrix:

$$= \frac{1}{4\pi\rho} \begin{pmatrix} 0 & -\frac{(z_{A2} - z_S)}{R_{11}^3} & \frac{(y_{A3} - y_S)}{R_{11}^3} \\ \frac{(z_{A1} - z_S)}{R_{11}^3} & 0 & -\frac{(x_{A3} - x_S)}{R_{11}^3} \\ -\frac{(y_{A1} - y_S)}{R_{11}^3} & \frac{(x_{A2} - x_S)}{R_{11}^3} & 0 \end{pmatrix}$$

According to an embodiment, for a point source of rotational mass flow rate of fluid, the matrix M is of the following form:

$$\begin{pmatrix} (0)_{1 \ldots n} \\ (0)_{1 \ldots n} \\ (0)_{1 \ldots n} \\ (V''_{Ax})_{1 \ldots p} \\ (V''_{Ay})_{1 \ldots p} \\ (V''_{Az})_{1 \ldots p} \end{pmatrix} =$$

$$\begin{pmatrix} \begin{pmatrix} M'^x_{S_1S} & M'^x_{S_2S} & M'^x_{S_3S} \\ M'^y_{S_1S} & M'^y_{S_2S} & M'^y_{S_3S} \\ M'^z_{S_1S} & M'^z_{S_2S} & M'^z_{S_3S} \end{pmatrix} & \begin{pmatrix} M'^x_{A1S} & M'^x_{A2S} & M'^x_{A3S} \\ M'^y_{A1S} & M'^y_{A2S} & M'^y_{A3S} \\ M'^z_{A1S} & M'^z_{A2S} & M'^z_{A3S} \end{pmatrix} \\ \begin{pmatrix} M'^x_{S_1A} & M'^x_{S_2A} & M'^x_{S_3A} \\ M'^y_{S_1A} & M'^y_{S_2A} & M'^y_{S_3A} \\ M'^z_{S_1A} & M'^z_{S_2A} & M'^z_{S_3A} \end{pmatrix} & \begin{pmatrix} M'^x_{A1A} & M'^x_{A2A} & M'^x_{A3A} \\ M'^y_{A1A} & M'^y_{A2A} & M'^y_{A3A} \\ M'^z_{A1A} & M'^z_{A2A} & M'^z_{A3A} \end{pmatrix} \end{pmatrix} * \begin{pmatrix} (\lambda'_{S1})_{1 \ldots n} \\ (\lambda'_{S2})_{1 \ldots n} \\ (\lambda'_{S3})_{1 \ldots n} \\ (\lambda'_{A1})_{1 \ldots p} \\ (\lambda'_{A2})_{1 \ldots p} \\ (\lambda'_{S3})_{1 \ldots p} \end{pmatrix}$$

$$\begin{pmatrix} M'^x_{A1S} & M'^x_{A2S} & M'^x_{A3S} \\ M'^y_{A1S} & M'^y_{A2S} & M'^y_{A3S} \\ M'^z_{A1S} & M'^z_{A2S} & M'^z_{A3S} \end{pmatrix} = \frac{1}{4\pi\rho} \begin{pmatrix} 0 & -\frac{(z_{A2} - z_S)}{R_{11}^3} & \frac{(y_{A3} - y_S)}{R_{11}^3} \\ \frac{(z_{A1} - z_S)}{R_{11}^3} & 0 & -\frac{(x_{A3} - x_S)}{R_{11}^3} \\ -\frac{(y_{A1} - y_S)}{R_{11}^3} & \frac{(x_{A2} - x_S)}{R_{11}^3} & 0 \end{pmatrix}$$

This embodiment corresponds to the example 1.

Embodiments of one or more point sources of rotational mass flow rate of fluid (rotational sources) are described for example in the cases 8, 9, 10 described hereinbelow.

According to an embodiment, the second source is or comprises at least one point source of rotational mass flow rate of fluid about a determined direction, for the second boundary condition (L) having, at the first test point (P1), a fluid velocity component at the first test point (P1), which is prescribed as being non-zero and tangential to the interface (I) and/or for another prescribed boundary condition having, at at least one other point at a prescribed distance away from the interface (I), a prescribed velocity component, for example zero. This embodiment corresponds to the example 1.

According to this example 1, a surface A is for example provided, representing a wind tunnel, a surface B or SUR representing an airplane wing in the air. It is assumed that the boundary condition Cs on the wind tunnel is a prescribed constant wind $\vec{V}(v_x, v_y, v_z)$ or $V_\infty$ and that the boundary condition Ca on the wing is $V_A^{\perp}=0$ (the air does not enter into the wing) and $\vec{V}_A^{flute} - \vec{V}_A^{corde} = \vec{0}$ (the fluid leaves the wing parallel to the cord of the wing). This second condition will be achieved in this example, by creating, for the second source, a fluid circulation that is constant around the wing: $V''_A = K$. The modulus $V_A''$ of the tangent velocity of this circulation will be taken as constant with K prescribed.

The wind tunnel S is discretized at n points, and the wing at p points. The resolution breaks down into the two step iterations for which the two calculated velocities will be added.

First iteration:

First boundary conditions: $\vec{V}(v_x, v_y, v_z)$ or $V_\infty$ and $V_A^{\perp}=0$
First sources: Scalar sources (S1, S2, S3: 3n points on the wind tunnel A: p points on the wing B).

The first value obtained by these first sources is illustrated in FIG. 44A and the case 7.

Second iteration:

Second boundary conditions: zero velocity at a distance from the wing (wind tunnel)=0 and $V''_A = K$ Second sources: Hybrid sources (scalar and rotational). (S1, S2, S3: 3n points on the wind tunnel, A1, A2, A3: 3p points on the wing B).

The second value obtained by these first sources is illustrated in FIG. 44B and the case 7.

Source of Force

According to an embodiment, the global resolution matrix (M) comprises several coefficients, of which at least one is equal to one out of, for at least one point source of force as first and/or second source (S):

$(x_i - x_j)/(8 \cdot \pi \cdot \mu \cdot R_{ij})$, $(y_i - y_j)/(8 \cdot \pi \cdot \mu \cdot R_{ij})$, $(z_i - z_j)/(8 \cdot \pi \cdot \mu \cdot R_{ij})$, $(x_i - x_j)^2/(8 \cdot \pi \cdot \mu \cdot R_{ij})$, $(y_i - y_j)^2/(8 \cdot \pi \cdot \mu \cdot R_{ij})$, $(z_i - z_j)^2/(8 \cdot \pi \cdot \mu \cdot R_{ij})$, $(x_i - x_j) \cdot (y_i - y_j)/(8 \cdot \pi \cdot \mu \cdot R_{ij}^3)$, $(x_i - x_j) \cdot (z_i - z_j)/(8 \cdot \pi \cdot \mu \cdot R_{ij}^3)$, $(z_i - z_j) \cdot (y_i - y_j)/(8 \cdot \pi \cdot \mu \cdot R_{ij}^3)$, or to one thereof, multiplied by a prescribed constant, by which the first vector (J) of the parameters of the point source (Sj) of force is divided, where $R_{ij}$ is the distance between the point source (Sj) of force situated at the third point (P2) of prescribed position $x_j, y_j, z_j$ according to three non-coplanar directions x, y and z of the space and the fourth point (P) of the space having coordinates $x_i, y_i, z_i$ according to the three directions x, y and z.

Embodiments of one or more point sources of force are described for example in the cases 8, 9, 10 described hereinbelow.

The following notations are adopted hereinbelow with regard to the matrix M, which can comprise other matrices indicated hereinbelow:

$\vec{V}$: the velocity vector of the flow, $\vec{V} = (V^x, V^y, V^z)$ $\vec{V}_S^N = \vec{V} \cdot \vec{N}_S$: the normal component of the velocity of the flow over a surface S (or SUR) of an object or of an interface, The surface S (or SUR) has $n_S$ test points P1, $M_{BA}$: coupling matrix between the test points belonging to the object B (or to the interface B) and the sources associated with the object A (or with another interface A), For the surface of the object A or of the interface A:

$\alpha_A$ or $\lambda_A$: vector of the parameters of the sources associated with the object A or with the interface A, of dimension $n_A$, $\lambda_{A1}$: vector of the parameters of the sources S1 associated with the object A or with the interface A in the case of the sources S1 of the triplets of sources S1, S2, S3, of dimension $n_{A1}$, $\lambda_{A1}{}^j$: parameter of the vector $\lambda_{A1}$ (that is to say the component of dimension 1×1 of this vector $\lambda_{A1}$ having these $n_{A1}$ components), Distance between the points i and j:

$$R_{ij} = \sqrt{(x_i-x_j)^2+(y_i-y_j)^2+(z_i-z_j)^2}$$

An embodiment of this DPSM method is described hereinbelow in the case of a scalar point source at the point P2 which emits a homogeneous flow $a_i$ at a flow in m³/s is given hereinbelow. Obviously, this embodiment is not limiting.

For the scalar source of fluid, the calculation of the velocity V of the flow at the point P or P1=Pi of coordinates $x_i$, $y_i$, $z_i$ derives from the potential according to the following equation:

$$\vec{v} = -\vec{\nabla}\theta \Rightarrow \begin{cases} v_x = \frac{(x_i-x_j)}{4\pi\rho R_i^3}\cdot\lambda \\ v_y = \frac{(y_i-y_j)}{4\pi\rho R_i^3}\cdot\lambda \\ v_z = \frac{(z_i-z_j)}{4\pi\rho R_i^3}\cdot\lambda \end{cases} \quad \vec{v} = \begin{pmatrix} \frac{(x_i-x_j)}{4\pi\rho R_i^3} \\ \frac{(y_i-y_j)}{4\pi\rho R_i^3} \\ \frac{(z_i-z_j)}{4\pi\rho R_i^3} \end{pmatrix}\cdot\lambda$$

$$\vec{v} = -\overrightarrow{grad}\,\theta = \begin{pmatrix} v^x \\ v^y \\ v^z \end{pmatrix} = \begin{pmatrix} \frac{(x_i-x_j)}{4\pi\rho R_{ij}^3} \\ \frac{(y_i-y_j)}{4\pi\rho R_{ij}^3} \\ \frac{(z_i-z_j)}{4\pi\rho R_{ij}^3} \end{pmatrix}\cdot\lambda = \begin{pmatrix} q_{ij}^x \\ q_{ij}^y \\ q_{ij}^z \end{pmatrix}\cdot\lambda$$

In this embodiment, the boundary conditions L can comprise intrinsic boundary conditions (CLI), which provide, at the interface between two media defined by their respective densities ($\rho_1$, $\rho_2$), for the continuity of the potential and the normal velocity (modulo rho) at the interface at each point of the interface to be considered. This is expressed as:

$$\begin{cases} \theta_1 = \theta_2 \\ \rho_1 \cdot V_1^N = \rho_2 \cdot V_2^N \end{cases}$$

In this embodiment, the boundary conditions L can comprise user boundary conditions (CLU) which make it possible to set conditions at the boundaries on the objects: zero normal velocity and/or zero velocity, and/or similar.

For an isotropic point source S at the point P2 of coordinates $x_j$, $y_j$, $z_j$, consisting of a triplet of sources (or group of sources or block of sources, the triplet of sources being situated around the point P2 at the coordinates ($x_{jk}$, $y_{jk}$, $z_{jk}$) k=1,2,3) which emits the flow a or $\lambda(\lambda_1, \lambda_2, \lambda_3)$ (homogeneous at a flow rate in kg/s), the velocity at the point P or P1=Pi of coordinates $x_i$, $y_i$, $z_i$ is:

$$\vec{v} = \begin{pmatrix} v_x \\ v_y \\ v_z \end{pmatrix} = \frac{1}{\rho}\begin{pmatrix} \frac{x_i-x_{j_1}}{4\pi R_{ij_1}^3} & \frac{x_i-x_{j_2}}{4\pi R_{ij_2}^3} & \frac{x_i-x_{j_3}}{4\pi R_{ij_3}^3} \\ \frac{y_i-y_{j_1}}{4\pi R_{ij_1}^3} & \frac{y_i-y_{j_2}}{4\pi R_{ij_2}^3} & \frac{y_i-y_{j_3}}{4\pi R_{ij_3}^3} \\ \frac{z_i-z_{j_1}}{4\pi R_{ij_1}^3} & \frac{z_i-z_{j_2}}{4\pi R_{ij_2}^3} & \frac{z_i-z_{j_3}}{4\pi R_{ij_3}^3} \end{pmatrix}\cdot\begin{pmatrix} a_1 \\ a_2 \\ a_3 \end{pmatrix} = [T_{ij}]\cdot\begin{pmatrix} a_1 \\ a_2 \\ a_3 \end{pmatrix}$$

$$R_{ij_1} = \sqrt{(x_i-x_{j_1})^2+(y_i-y_{j_1})^2+(z_i-z_{j_1})^2}$$

$$R_{ij_2} = \sqrt{(x_i-x_{j_2})^2+(y_i-y_{j_2})^2+(z_i-z_{j_2})^2}$$

$$R_{ij_3} = \sqrt{(x_i-x_{j_3})^2+(y_i-y_{j_3})^2+(z_i-z_{j_3})^2}$$

For Ns point sources S=Sj (of indices j, j={1, . . . , $N_s$}) situated respectively at the points P2 of coordinates $x_j$, $y_j$, $z_j$ and respectively emitting a fluid flow $a_j$ or $\lambda_j$ and for Np test points P or P1=Pi (of indices i, i={1, . . . , $N_p$}) of coordinates $x_i$, $y_i$, $z_i$, the velocity at the point P or P1=Pi of coordinates $x_i$, $y_i$, $z_i$ is:

$Q_{object-source}{}^x = (q_{ij}{}^x)_{1\leq i\leq n_p, 1\leq j\leq n_s}$ $Q_{object-source}{}^y = (q_{ij}{}^y)_{1\leq i\leq n_p, 1\leq j\leq n_s}$ $Q_{object-source}{}^z = (q_{ij}{}^z)_{1\leq i\leq n_p, 1\leq j\leq n_s}$ $\lambda = (\lambda_j)_{1\leq j\leq n_s}\quad a = (a_j)_{1\leq j\leq n_s}$ $$\begin{pmatrix} V_{x_1} \\ \vdots \\ V_{x_{N_p}} \end{pmatrix} = \begin{pmatrix} Q_{11}^x & \cdots & Q_{1N_s}^x \\ \vdots & & \vdots \\ Q_{N_p 1}^x & \cdots & Q_{N_p N_s}^x \end{pmatrix}\cdot\begin{pmatrix} a_1 \\ \vdots \\ a_{N_s} \end{pmatrix}$$

$$\begin{pmatrix} V_{y_1} \\ \vdots \\ V_{y_{N_p}} \end{pmatrix} = \begin{pmatrix} Q_{11}^y & \cdots & Q_{1N_s}^y \\ \vdots & & \vdots \\ Q_{N_p 1}^y & \cdots & Q_{N_p N_s}^y \end{pmatrix}\cdot\begin{pmatrix} a_1 \\ \vdots \\ a_{N_s} \end{pmatrix}$$

$$\begin{pmatrix} V_{z_1} \\ \vdots \\ V_{z_{N_p}} \end{pmatrix} = \begin{pmatrix} Q_{11}^z & \cdots & Q_{1N_s}^z \\ \vdots & & \vdots \\ Q_{N_p 1}^z & \cdots & Q_{N_p N_s}^z \end{pmatrix}\cdot\begin{pmatrix} a_1 \\ \vdots \\ a_{N_s} \end{pmatrix}$$

$$Q_{ij}^x = \frac{x_i-x_j}{4\pi\rho R_{ij}^3},\quad Q_{ij}^y = \frac{y_i-y_j}{4\pi\rho R_{ij}^3},\quad Q_{ij}^z = \frac{z_i-z_j}{4\pi\rho R_{ij}^3}$$

The expression of the boundary conditions at the test points of any interface between two fluid media of different densities will be a conserved normal velocity component modulo rho and the continuity of the scalar potential.

The expression of the boundary conditions at the test points P1 at the surface SUR of the interface I (which constitutes an impermeable medium equivalent to a medium of density tending toward infinity) will be a zero normal velocity component at the test points P1 in a perfect flow. The coupling matrix M is calculated for the normal velocity $v_n(v_{nx}, v_{ny}, v_{nz})$ at a surface. For an interface I meshed by $N_s$ points, at each point, the normal vector $n_k$ ($n_{kx}$, $n_{ky}$, $n_{kz}$) is defined k={1, . . . , $N_s$}).

The calculation of the matrix of the normal velocity at the test points P1 of the interface I gives the normal vectors $n_k$ at the interface:

$$[Q^n_{object-source}] = \begin{pmatrix} n_{x_1} & 0 & 0 \\ 0 & \ddots & 0 \\ 0 & 0 & n_{x_{N_s}} \end{pmatrix} \cdot [Q^x_{object-source}] +$$

$$\begin{pmatrix} n_{y_1} & 0 & 0 \\ 0 & \ddots & 0 \\ 0 & 0 & n_{y_{N_s}} \end{pmatrix} \cdot [Q^y_{object-source}] + \begin{pmatrix} n_{z_1} & 0 & 0 \\ 0 & \ddots & 0 \\ 0 & 0 & n_{z_{N_s}} \end{pmatrix} \cdot [Q^z_{object-source}]$$

Calculation of the coupling matrices for the velocity $v(v_x, v_y, v_z)$:

$N_p$ test points of coordinates $P_i(x_i, y_i, z_i)$ $i=\{1, \ldots, N_p\}$ and $N_s$ point sources of flow at the points $S_j(x_j, y_j, z_j)$ $j=\{1, \ldots, N_s\}$ consisting of a triplet of sources (or block of three sources) which emit a flow $\lambda_j$ ($\lambda_{j1}, \lambda_{j2}, \lambda_{j3}$):

$$\vec{V}_{object} = \begin{pmatrix} \begin{pmatrix} v_{x_1} \\ v_{y_1} \\ v_{z_1} \end{pmatrix} \\ \vdots \\ \begin{pmatrix} v_{x_i} \\ v_{y_i} \\ v_{z_i} \end{pmatrix} \\ \vdots \\ \begin{pmatrix} v_{x_{N_p}} \\ v_{y_{N_p}} \\ v_{z_{N_p}} \end{pmatrix} \end{pmatrix} = \begin{pmatrix} [T_{11}] & \cdots & \cdots & [T_{1N_s}] \\ \vdots & & & \\ [T_{i1}] & & & [T_{iN_s}] \\ \vdots & & & \\ [T_{N_p1}] & \cdots & \cdots & [T_{N_pN_s}] \end{pmatrix} \cdot \begin{pmatrix} \begin{pmatrix} \lambda_{11} \\ \lambda_{12} \\ \lambda_{13} \end{pmatrix} \\ \vdots \\ \begin{pmatrix} \lambda_{j1} \\ \lambda_{j2} \\ \lambda_{j3} \end{pmatrix} \\ \vdots \\ \begin{pmatrix} v_{N_s1} \\ v_{N_s2} \\ v_{N_s3} \end{pmatrix} \end{pmatrix}$$

The following notation reveals the coupling matrices between object and block of sources:

$$\vec{V}_{object} = \begin{pmatrix} (V^x_{object}) \\ (V^y_{object}) \\ (V^z_{object}) \end{pmatrix} = \begin{pmatrix} \begin{pmatrix} v_{x_1} \\ \vdots \\ v_{x_i} \\ \vdots \\ v_{x_{N_p}} \end{pmatrix} \\ \begin{pmatrix} v_{y_1} \\ \vdots \\ v_{y_i} \\ \vdots \\ v_{y_{N_p}} \end{pmatrix} \\ \begin{pmatrix} v_{y_1} \\ \vdots \\ v_{y_i} \\ \vdots \\ v_{y_{N_p}} \end{pmatrix} \end{pmatrix} =$$

$$\begin{pmatrix} [Q^x_{object-source_1}] & [Q^x_{object-source_2}] & [Q^x_{object-source_3}] \\ [Q^y_{object-source_1}] & [Q^y_{object-source_2}] & [Q^y_{object-source_3}] \\ [Q^z_{object-source_1}] & [Q^z_{object-source_2}] & [Q^z_{object-source_3}] \end{pmatrix} \cdot \begin{pmatrix} \begin{pmatrix} \lambda_{11} \\ \vdots \\ \lambda_{j1} \\ \vdots \\ \lambda_{N_s1} \end{pmatrix} \\ \begin{pmatrix} \lambda_{12} \\ \vdots \\ \lambda_{j2} \\ \vdots \\ \lambda_{N_s2} \end{pmatrix} \\ \begin{pmatrix} \lambda_{13} \\ \vdots \\ \lambda_{j3} \\ \vdots \\ \lambda_{N_s3} \end{pmatrix} \end{pmatrix}$$

which makes it possible to obtain the coupling matrices M in the block of sources case (here with a block containing three scalar sources).

$$[Q_{object-source_{1,2,3}}{}^x] = [Q_{object-source_1}{}^x \; Q_{object-source_2}{}^x \; Q_{object-source_3}{}^x]$$

which makes it possible to rewrite $V_{object}$ in a more compact manner:

$$\vec{V}_{object} = \begin{pmatrix} (V^x_{object}) \\ (V^y_{object}) \\ (V^z_{object}) \end{pmatrix} = \begin{pmatrix} [Q^x_{object-source_{1,2,3}}] \\ [Q^y_{object-source_{1,2,3}}] \\ [Q^z_{object-source_{1,2,3}}] \end{pmatrix} \cdot \begin{pmatrix} (\Lambda_1) \\ (\Lambda_2) \\ (\Lambda_3) \end{pmatrix}.$$

In a nonlimiting example, represented in FIGS. 19A, 19B and 19C, the objects (or interfaces I) are named according to a letter E, IS, B, the test points associated by T with the letter as index, the associated source blocks are named by S with the number of the medium and the letter as index:

Input E on the left (wind tunnel input): $T_E/S_{1E}-n_e$ test points—scalar triplet source block (for example 600 points), Output IS on the right (wind tunnel output): $T_{IS}/S_{1S}-n_s$ test points—scalar triplet source block (for example 600 points), Obstacle A in the flow (sphere): $T_A/S_{1A}-n_a$ test points—single source block (for example 300 points), sphere of center situated at a height z=40 m with a radius of 20 m, Ground B: $T_B/S_{1B}-n_b$ test points—scalar triplet source block (for example 800 points).

In this example, $V_n=0$ on the sphere gives $n_a$ equations:

$$Q_{T_AS_{1E}}{}^n \cdot S_{1E} + Q_{T_AS_{1A}}{}^n \cdot S_{1A} + Q_{T_AS_{1B}}{}^n \cdot S_{1B} + Q_{T_AS_{1S}}{}^n \cdot S_{1S} = 0$$

$V=V_B$ on the ground gives $3*n_b$ equations:

$$\begin{cases} Q^x_{T_BS_{1E}} \cdot S_{1E} + Q^x_{T_BS_{1A}} \cdot S_{1A} + Q^x_{T_BS_{1B}} \cdot S_{1B} + Q^x_{T_BS_{1S}} \cdot S_{1S} = V^x_B \\ Q^y_{T_BS_{1E}} \cdot S_{1E} + Q^y_{T_BS_{1A}} \cdot S_{1A} + Q^y_{T_BS_{1B}} \cdot S_{1B} + Q^y_{T_BS_{1S}} \cdot S_{1S} = V^y_B \\ Q^z_{T_BS_{1E}} \cdot S_{1E} + Q^z_{T_BS_{1A}} \cdot S_{1A} + Q^z_{T_BS_{1B}} \cdot S_{1B} + Q^z_{T_BS_{1S}} \cdot S_{1S} = V^z_B \end{cases}$$

$V=V_E$ on the air input gives $3*n_e$ equations:

$$\begin{cases} Q^x_{T_E S_{1E}} \cdot S_{1E} + Q^x_{T_E S_{1A}} \cdot S_{1A} + Q^x_{T_E S_{1B}} \cdot S_{1B} + Q^x_{T_E S_{1S}} \cdot S_{1S} = V^x_E \\ Q^y_{T_E S_{1E}} \cdot S_{1E} + Q^y_{T_E S_{1A}} \cdot S_{1A} + Q^y_{T_E S_{1B}} \cdot S_{1B} + Q^y_{T_E S_{1S}} \cdot S_{1S} = V^y_E \\ Q^z_{T_E S_{1E}} \cdot S_{1E} + Q^z_{T_E S_{1A}} \cdot S_{1A} + Q^z_{T_E S_{1B}} \cdot S_{1B} + Q^z_{T_E S_{1S}} \cdot S_{1S} = V^z_E \end{cases}$$

$V=V_S$ on the air input gives $3*n_s$ equations:

$V = V_s$ on the air input gives $3*n_s$ equations:

$$\begin{cases} Q^x_{T_S S_{1E}} \cdot S_{1E} + Q^x_{T_S S_{1A}} \cdot S_{1A} + Q^x_{T_S S_{1B}} \cdot S_{1B} + Q^x_{T_S S_{1S}} \cdot S_{1S} = V^x_S \\ Q^y_{T_S S_{1E}} \cdot S_{1E} + Q^y_{T_S S_{1A}} \cdot S_{1A} + Q^y_{T_S S_{1B}} \cdot S_{1B} + Q^y_{T_S S_{1S}} \cdot S_{1S} = V^y_S \\ Q^z_{T_S S_{1E}} \cdot S_{1E} + Q^z_{T_S S_{1A}} \cdot S_{1A} + Q^z_{T_S S_{1B}} \cdot S_{1B} + Q^z_{T_S S_{1S}} \cdot S_{1S} = V^z_S \end{cases}$$

The global resolution matrix M is then:

$$\begin{pmatrix} \begin{pmatrix} V^x_E \\ V^y_E \\ V^z_E \end{pmatrix} \\ (0) \\ \begin{pmatrix} V^x_B \\ V^y_B \\ V^z_B \end{pmatrix} \\ \begin{pmatrix} V^x_S \\ V^y_S \\ V^z_S \end{pmatrix} \end{pmatrix} = \begin{pmatrix} (Q^x_{T_E S_{1E}}) & Q^x_{T_E S_{1A}} & (Q^x_{T_E S_{1B}}) & (Q^x_{T_E S_{1S}}) \\ (Q^y_{T_E S_{1E}}) & Q^y_{T_E S_{1A}} & (Q^y_{T_E S_{1B}}) & (Q^y_{S_1 J S_2}) \\ (Q^z_{T_E S_{1E}}) & Q^z_{T_E S_{1A}} & (Q^z_{T_E S_{1B}}) & (Q^z_{S_1 J S_2}) \\ (Q^n_{T_A S_{1E}}) & Q^n_{T_A S_{1A}} & (Q^n_{T_A S_{1B}}) & (Q^n_{T_A S_{1S}}) \\ (Q^x_{T_B S_{1E}}) & Q^x_{T_B S_{1A}} & (Q^x_{T_B S_{1B}}) & (Q^x_{T_B S_{1S}}) \\ (Q^y_{T_B S_{1E}}) & Q^y_{T_B S_{1A}} & (Q^y_{T_B S_{1B}}) & (Q^y_{T_B S_{1S}}) \\ (Q^z_{T_B S_{1E}}) & Q^z_{T_B S_{1A}} & (Q^z_{T_B S_{1B}}) & (Q^z_{T_B S_{1S}}) \\ (Q^x_{T_S S_{1E}}) & Q^x_{T_S S_{1A}} & (Q^x_{T_S S_{1B}}) & (Q^x_{T_S S_{1S}}) \\ (Q^y_{T_S S_{1E}}) & Q^y_{T_S S_{1A}} & (Q^y_{T_S S_{1B}}) & (Q^y_{T_S S_{1S}}) \\ (Q^z_{T_S S_{1E}}) & Q^z_{T_S S_{1A}} & (Q^z_{T_S S_{1B}}) & (Q^z_{T_S S_{1S}}) \end{pmatrix} \begin{pmatrix} (S_{1E}) \\ (S_{1A}) \\ (S_{1B}) \\ (S_{1S}) \end{pmatrix}$$

The boundary conditions used for the resolution are: $V_B=0$, $V_S=V_0 \cdot u_y$, $V_E=V_0 \cdot u_y$.

In this example, the sources are represented in FIGS. 19D to 19M, where the x axis is the index of the point in the point mesh on the corresponding object and the y axis is the flow from the source.

The first quantity (velocity V) was then calculated and visualized in the two planes XOY and YOZ passing through the center of the sphere, in FIGS. 19N to 19V.

An embodiment is described hereinbelow in the case of a rotational source of fluid.

Take a rotational point source S at the point $P2=Pj(x_j, y_j, z_j)$ which emits a homogeneous flow $\lambda(\lambda_x, \lambda_y, \lambda_z)$ with a mass flow rate (kg/s) in a medium defined by its density $\rho$. The vector A, its normal derivative at the interface I and the velocity of the flow v are calculated at the point P or $P1=Pi$ of coordinates $(x_i, y_i, z_i)$.

$$\vec{A} = \begin{pmatrix} A_x \\ A_y \\ A_z \end{pmatrix} = \begin{pmatrix} \frac{1}{4\pi \rho R_{ij}} & 0 & 0 \\ 0 & \frac{1}{4\pi \rho R_{ij}} & 0 \\ 0 & 0 & \frac{1}{4\pi \rho R_{ij}} \end{pmatrix} \cdot \begin{pmatrix} \lambda_x \\ \lambda_y \\ \lambda_z \end{pmatrix} = w_{ij} \cdot \begin{pmatrix} \lambda_x \\ \lambda_y \\ \lambda_z \end{pmatrix}$$

-continued $$\vec{v} = -\vec{rot}\,\vec{A} = \begin{pmatrix} 0 & \frac{-(z_i - z_j)}{4\pi \rho R_{ij}} & \frac{(y_i - y_j)}{4\pi \rho R_{ij}} \\ \frac{(z_i - z_j)}{4\pi \rho R_{ij}} & 0 & \frac{-(x_i - x_j)}{4\pi \rho R_{ij}} \\ \frac{-(y_i - y_j)}{4\pi \rho R_{ij}} & \frac{(x_i - x_j)}{4\pi \rho R_{ij}} & 0 \end{pmatrix} \cdot \begin{pmatrix} \lambda_x \\ \lambda_y \\ \lambda_z \end{pmatrix} = t_{ij} \cdot \begin{pmatrix} \lambda_x \\ \lambda_y \\ \lambda_z \end{pmatrix}$$

For Ns point sources $S=Sj$ (of indices j, $j=\{1, \ldots, N_s\}$) situated respectively at the points P2 of coordinates $x_j, y_j, z_j$ and respectively emitting a fluid flow $a_j$ or $\lambda_j$ and for Np test points P or $P1=Pi$ (of indices i, $i=\{1, \ldots, N_p\}$) of coordinates $x_i, y_i, z_i$, the matrix M to differentiate the cases will be denoted W, T or Y $$W = (w_{ij})_{1 \leq i \leq n_p, 1 \leq j \leq n_s} \quad T = (t_{ij})_{1 \leq i \leq n_p, 1 \leq j \leq n_s} \quad Y = (y_{ij})_{1 \leq i \leq n_p, 1 \leq j \leq n_s}$$

And a flow source vector is considered $\lambda = (\lambda^x_j, \lambda^y_j, \lambda^z_j)_{1 \leq j \leq N_s}$ In this embodiment, the boundary conditions L can comprise intrinsic boundary conditions (CLI) which provide, at the interface between two media defined by their respective densities $(\rho_1, \rho_2)$, for the continuity of the vector potential and its derivative calculated relative to the normal at the interface at each point of the interface to be considered:

$$\begin{cases} \vec{A_1} = \vec{A_2} \\ \rho_1 \cdot \frac{\partial \vec{A_1}}{\partial \vec{n}} = \rho_2 \cdot \frac{\partial \vec{A_2}}{\partial \vec{n}} \end{cases}$$

In this embodiment, the boundary conditions L can comprise user boundary conditions (CLU) which make it possible to set boundary conditions of the objects: zero normal velocity and/or zero velocity, and/or similar.

An embodiment is described hereinbelow in the case of a source of force. A source of force is also called Stokeslet.

Take a point source S of force at the point $P2=Pj(x_j, y_j, z_j)$ which emits a homogeneous flow $\lambda$ $(\lambda_x, \lambda_y, \lambda_z)$ with a mass flow rate (kg/s) in a medium defined by its viscosity $\eta$ and its kinematic viscosity $\mu$. The velocity of the flow v and the pressure p are calculated at the point P or $P1=Pi$ of coordinates $(x_i, y_i, z_i)$.

$$v = \begin{pmatrix} v^x \\ v^y \\ v^z \end{pmatrix} = \frac{1}{8 \pi \mu} \begin{pmatrix} \frac{(x_i - x_j)}{R_{ij}} & 0 & 0 \\ 0 & \frac{(y_i - y_j)}{R_{ij}} & 0 \\ 0 & 0 & \frac{(z_i - z_j)}{R_{ij}} \end{pmatrix} \cdot \begin{pmatrix} \lambda_x \\ \lambda_y \\ \lambda_z \end{pmatrix} +$$

$$\frac{1}{8 \pi \mu} \begin{pmatrix} \frac{(x_i - x_j) \cdot (x_i - x_j)}{R^3_{ij}} & \frac{(x_i - x_j) \cdot (y_i - y_j)}{R^3_{ij}} & \frac{(x_i - x_j) \cdot (z_i - z_j)}{R^3_{ij}} \\ \frac{(y_i - y_j) \cdot (x_i - x_j)}{R^3_{ij}} & \frac{(y_i - y_j) \cdot (y_i - y_j)}{R^3_{ij}} & \frac{(y_i - y_j) \cdot (z_i - z_j)}{R^3_{ij}} \\ \frac{(z_i - z_j) \cdot (x_i - x_j)}{R^3_{ij}} & \frac{(z_i - z_j) \cdot (y_i - y_j)}{R^3_{ij}} & \frac{(z_i - z_j) \cdot (z_i - z_j)}{R^3_{ij}} \end{pmatrix}$$

-continued $$\begin{pmatrix} \lambda_x \\ \lambda_y \\ \lambda_z \end{pmatrix} = k_{ij} \cdot \begin{pmatrix} \lambda_x \\ \lambda_y \\ \lambda_z \end{pmatrix}$$

$$p = \frac{1}{4\pi} \begin{pmatrix} \frac{(x_i - x_j)}{R_{ij}} & \frac{(y_i - y_j)}{R_{ij}} & \frac{(z_i - z_j)}{R_{ij}} \end{pmatrix} \cdot \begin{pmatrix} \lambda_x \\ \lambda_y \\ \lambda_z \end{pmatrix} = p_{ij} \begin{pmatrix} \lambda_x \\ \lambda_y \\ \lambda_z \end{pmatrix}$$

For Ns point sources S=Sj (of indices j, j={1, ..., Ns}) situated respectively at the points P2 of coordinates xj, yj, zj and respectively emitting a fluid flow aj or λj and for Np test points P or P1=Pi (of indices i, i={1, ..., Np}) of coordinates xi, yi, zi, the matrix M will be denoted K for the stokeslets or P for the pressure.

$$K_{ij} = (k_{ij})_{1 \le i \le n_p, 1 \le j \le n_s} \quad P_{ij} = (p_{ij})_{1 \le i \le n_p, 1 \le j \le n_s}$$

And a flow source vector is considered $\lambda=(\lambda_j^x, \lambda_j^y, \lambda_j^z)_{1 \le j \le N_s}$ In this embodiment, the boundary conditions L can comprise intrinsic boundary conditions (CLI), which provide, at the interface between two media defined by their respective densities ($\rho_1$, $\rho_2$), for the continuity of the pressure and of the velocity normal to the interface at each point of the interface to be considered.

$$\begin{cases} P_1 = P_2 \\ \rho_1 \cdot V_1^N = \rho_2 \cdot V_2^N \end{cases}$$

In this embodiment, the boundary conditions L can comprise user boundary conditions (CLU) which make it possible to set boundary conditions of the objects: zero normal velocity and/or zero velocity, and/or similar.

According to an embodiment, the velocity V is equal to:

$$\vec{V}(\vec{r}) = \frac{1}{\rho} \begin{pmatrix} \frac{x-x'}{4\pi|\vec{r}-\vec{r}'|^3} \\ \frac{y-y'}{4\pi|\vec{r}-\vec{r}'|^3} \\ \frac{z-z'}{4\pi|\vec{r}-\vec{r}'|^3} \end{pmatrix} a - \frac{1}{\rho} \begin{pmatrix} 0 & -\frac{z-z'}{4\pi|\vec{r}-\vec{r}'|^3} & \frac{y-y'}{4\pi|\vec{r}-\vec{r}'|^3} \\ \frac{z-z'}{4\pi|\vec{r}-\vec{r}'|^3} & 0 & -\frac{x-x'}{4\pi|\vec{r}-\vec{r}'|^3} \\ -\frac{y-y'}{4\pi|\vec{r}-\vec{r}'|^3} & \frac{x-x'}{4\pi|\vec{r}-\vec{r}'|^3} & 0 \end{pmatrix} \cdot \begin{pmatrix} j_x \\ j_y \\ j_z \end{pmatrix}$$

In this equation, the first part multiplied by the scalar a is the longitudinal (or irrotational or scalar) component which is described by a tensor of order 1, whereas the second part multiplied by j is the transverse (or solenoidal or rotational) component which is described by a tensor of order 2.

V is calculated at r for a singularity situated at r' (scalar+rotational source).

According to an embodiment of the invention, several sources of fluid can be combined.

According to a first example, a triplet of scalar sources is provided, situated around the point r' (at r1', r2', r3'), the term a becomes a vector:

$$\vec{V}(\vec{r}) = \frac{1}{\rho} \begin{pmatrix} \frac{x-x'_1}{4\pi|\vec{r}-\vec{r}'_1|^3} & \frac{x-x'_2}{4\pi|\vec{r}-\vec{r}'_2|^3} & \frac{x-x'_3}{4\pi|\vec{r}-\vec{r}'_3|^3} \\ \frac{y-y'_1}{4\pi|\vec{r}-\vec{r}'_1|^3} & \frac{y-y'_2}{4\pi|\vec{r}-\vec{r}'_2|^3} & \frac{y-y'_3}{4\pi|\vec{r}-\vec{r}'_3|^3} \\ \frac{z-z'_1}{4\pi|\vec{r}-\vec{r}'_1|^3} & \frac{z-z'_2}{4\pi|\vec{r}-\vec{r}'_2|^3} & \frac{z-z'_3}{4\pi|\vec{r}-\vec{r}'_3|^3} \end{pmatrix} \cdot \begin{pmatrix} a_1 \\ a_2 \\ a_3 \end{pmatrix}$$

In this last equation, the longitudinal and transverse components are possible (but the flow remains irrotational).

V is calculated at r for a triplet of singularities situated at r'1, r'2, r'3 (scalar sources). The three sources must not be merged.

According to a second example, a dipole of scalar sources is provided, centered at r1' and oriented according to the axis X:

$$\vec{V}(\vec{r}) = \frac{1}{\rho} \begin{pmatrix} \frac{x-(x'_1+\Delta x)}{4\pi|\vec{r}-(\vec{r}'_1+\Delta x)|^3} - \frac{x-(x'_1-\Delta x)}{4\pi|\vec{r}-(\vec{r}'_1-\Delta x)|^3} \\ \frac{y-y'_1}{4\pi|\vec{r}-(\vec{r}'_1+\Delta x)|^3} - \frac{y-y'_1}{4\pi|\vec{r}-(\vec{r}'_1-\Delta x)|^3} \\ \frac{z-z'_1}{4\pi|\vec{r}-(\vec{r}'_1+\Delta x)|^3} - \frac{z-z'_1}{4\pi|\vec{r}-(\vec{r}'_1-\Delta x)|^3} \end{pmatrix} \cdot a$$

In this last equation, the longitudinal and transverse components are possible (but the flow remains irrotational).

V is calculated at r for a doublet of singularities situated at r'1+Δx, r'1−Δx (scalar sources).

According to a third example, three dipoles are provided, centered at r1', r2', r3' and oriented respectively according to X, Y and Z:

$$\vec{V}(\vec{r}) = \frac{1}{\rho} \begin{pmatrix} \frac{x-(x'_1+\Delta x)}{4\pi|\vec{r}-(\vec{r}'_1+\Delta x)|^3} - \frac{x-x'_2}{4\pi|\vec{r}-(\vec{r}'_2+\Delta y)|^3} - \frac{x-x'_3}{4\pi|\vec{r}-(\vec{r}'_3+\Delta z)|^3} - \\ \frac{x-(x'_1-\Delta x)}{4\pi|\vec{r}-(\vec{r}'_1-\Delta x)|^3} & \frac{x-x'_2}{4\pi|\vec{r}-(\vec{r}'_2-\Delta y)|^3} & \frac{x-x'_3}{4\pi|\vec{r}-(\vec{r}'_3-\Delta z)|^3} \\ \frac{y-y'_1}{4\pi|\vec{r}-(\vec{r}'_1+\Delta x)|^3} - \frac{y-(y'_2+\Delta y)}{4\pi|\vec{r}-(\vec{r}'_2+\Delta y)|^3} - \frac{y-y'_3}{4\pi|\vec{r}-(\vec{r}'_3+\Delta z)|^3} - \\ \frac{y-y'_1}{4\pi|\vec{r}-(\vec{r}'_1-\Delta x)|^3} & \frac{y-(y'_2-\Delta y)}{4\pi|\vec{r}-(\vec{r}'_2-\Delta y)|^3} & \frac{y-y'_3}{4\pi|\vec{r}-(\vec{r}'_3-\Delta z)|^3} \\ \frac{z-z'_1}{4\pi|\vec{r}-(\vec{r}'_1+\Delta x)|^3} - \frac{z-z'_2}{4\pi|\vec{r}-(\vec{r}'_2+\Delta y)|^3} - \frac{z-(z'_3+\Delta z)}{4\pi|\vec{r}-(\vec{r}'_3+\Delta z)|^3} - \\ \frac{z-z'_1}{4\pi|\vec{r}-(\vec{r}'_1-\Delta x)|^3} & \frac{z-z'_2}{4\pi|\vec{r}-(\vec{r}'_2-\Delta y)|^3} & \frac{z-(z'_3-\Delta z)}{4\pi|\vec{r}-(\vec{r}'_3-\Delta z)|^3} \end{pmatrix} \begin{pmatrix} a_1 \\ a_2 \\ a_3 \end{pmatrix}$$

In this last equation, the longitudinal and transverse components are possible (but the flow remains irrotational).

V is calculated at r for three doublets of singularities situated respectively at r'1+Δx, r'1−Δx, r'2+Δy, r'2−Δy, r'3+Δz, r'r3−Δz (scalar sources).

If each of the three dipoles has a same center situated at r', the indices 1, 2, and 3 can be removed from the matrix:

$$\vec{V}(\vec{r}) =$$

$$\frac{1}{\rho} \begin{pmatrix} \frac{x-(x'+\Delta x)}{4\pi|\vec{r}-(\vec{r}'+\Delta x)|^3} - \frac{x-x'}{4\pi|\vec{r}-(\vec{r}'+\Delta y)|^3} - \frac{x-x'}{4\pi|\vec{r}-(\vec{r}'+\Delta z)|^3} - \\ \frac{x-(x'-\Delta x)}{4\pi|\vec{r}-(\vec{r}'-\Delta x)|^3} \quad \frac{x-x'}{4\pi|\vec{r}-(\vec{r}'-\Delta y)|^3} \quad \frac{x-x'}{4\pi|\vec{r}-(\vec{r}'-\Delta z)|^3} \\ \frac{y-y'}{4\pi|\vec{r}-(\vec{r}'+\Delta x)|^3} - \frac{y-(y'+\Delta y)}{4\pi|\vec{r}-(\vec{r}'+\Delta y)|^3} - \frac{y-y'}{4\pi|\vec{r}-(\vec{r}'+\Delta z)|^3} - \\ \frac{y-y'}{4\pi|\vec{r}-(\vec{r}'-\Delta x)|^3} \quad \frac{y-(y'-\Delta y)}{4\pi|\vec{r}-(\vec{r}'-\Delta y)|^3} \quad \frac{y-y'}{4\pi|\vec{r}-(\vec{r}'-\Delta z)|^3} \\ \frac{z-z'}{4\pi|\vec{r}-(\vec{r}'+\Delta x)|^3} - \frac{z-z'}{4\pi|\vec{r}-(\vec{r}'+\Delta y)|^3} - \frac{z-(z'+\Delta z)}{4\pi|\vec{r}-(\vec{r}'+\Delta z)|^3} - \\ \frac{z-z'}{4\pi|\vec{r}-(\vec{r}'-\Delta x)|^3} \quad \frac{z-z'}{4\pi|\vec{r}-(\vec{r}'-\Delta y)|^3} \quad \frac{z-(z'-\Delta z)}{4\pi|\vec{r}-(\vec{r}'-\Delta z)|^3} \end{pmatrix}$$

$$\begin{pmatrix} a_1 \\ a_2 \\ a_3 \end{pmatrix}$$

When the viscosity is no longer negligible, at the low Reynolds numbers, the pressure p and the velocity V are expressed:

$$p = -\frac{\vec{r}.\vec{\lambda}}{4\pi.\rho.|r-r'|^3} \text{ and } V = \frac{1}{8.\pi.\rho}\left(\frac{I}{|r-r'|}\cdot\vec{\lambda} + \frac{\sigma_{rr}}{|r-r'|^3}\cdot\vec{\lambda}\right)$$

where I is the identity and σ a tensor.

Hence the expression of p calculated at the point of index i, for a singularity situated at the point of index j:

$$p = \frac{1}{4\pi.\rho}\begin{pmatrix} \frac{(x_i-x_j)}{R_{ij}^3} & \frac{(y_i-y_j)}{R_{ij}^3} & \frac{(z_i-z_j)}{R_{ij}^3} \end{pmatrix} \cdot \begin{pmatrix} \lambda ix \\ \lambda iy \\ \lambda iz \end{pmatrix}$$

and the tensor of order 2 is expressed for V:

$$\begin{pmatrix} Vx \\ Vy \\ Vz \end{pmatrix} = \frac{1}{8.\pi.\rho}$$

-continued $$\begin{pmatrix} \frac{(x_i-x_j)}{R_{ij}} + & \frac{(x_i-x_j)}{R_{ij}} + & \frac{(x_i-x_j)}{R_{ij}} + \\ \frac{(x_i-x_j).(x_i-x_j)}{R_{ij}^3} & \frac{(x_i-x_j).(y_i-y_j)}{R_{ij}^3} & \frac{(x_i-x_j).(z_i-z_j)}{R_{ij}^3} \\ \frac{(y_i-y_j)}{R_{ij}} + & \frac{(y_i-y_j)}{R_{ij}} + & \frac{(y_i-y_j)}{R_{ij}} + \\ \frac{(y_i-y_j).(x_i-x_j)}{R_{ij}^3} & \frac{(y_i-y_j).(y_i-y_j)}{R_{ij}^3} & \frac{(y_i-y_j).(z_i-z_j)}{R_{ij}^3} \\ \frac{(z_i-z_j)}{R_{ij}} + & \frac{(z_i-z_j)}{R_{ij}} + & \frac{(z_i-z_j)}{R_{ij}} + \\ \frac{(z_i-z_j).(x_i-x_j)}{R_{ij}^3} & \frac{(z_i-z_j).(y_i-y_j)}{R_{ij}^3} & \frac{(z_i-z_j).(z_i-z_j)}{R_{ij}^3} \end{pmatrix} \cdot \begin{pmatrix} \lambda ix \\ \lambda iy \\ \lambda iz \end{pmatrix}$$

The boundary conditions applied at the surfaces and contained in the vector C can be vectorial and different at each test point P1 of the surface SUR. This opens up the possibility of immersing an object I in a vector field of irregular topology, on the one hand, but also of conferring on each point of the object a particular velocity vector. This has been tested, for example with, as interface I, a rotating cylinder (each test point P3 of its surface SUR is associated with a tangential velocity vector) immersed in a fluid F with wind gradient.

In all the following cases, the fluid F is considered incompressible and/or non-reversible.

The Reynolds number is the ratio between the forces of inertia and the viscous forces. Cases of high Reynolds numbers, that is to say greater than 3000, are considered, for which the fluid is considered non-viscous. In these cases, the viscosity terms are disregarded. There is decoupling between the pressure equations and those of the velocity. Poisson's equation which results from these approximations makes it possible to calculate the velocity and accepts for solutions the harmonic functions (at 1/R and their derivatives). The pressure is calculated by Bernouilli's equation.

Other cases of Reynolds numbers less than 2000 are also considered, for which the viscosity forces are predominant. Between the two, there is an intermediate zone where the two phenomena are mixed.

Case 1

According to an embodiment, represented in FIG. 21, there is provided, as source of fluid, a single scalar source S of mass flow rate of fluid associated with each first test point P1, for the boundary condition L having, at the first test point P1, a normal fluid velocity component at the first test point P1, which is zero at the interface I, B. This embodiment therefore provides a single source per group. Each of the embodiments and variants of the case 1 is for example combined with the above-mentioned first underlying embodiment (source S situated below the impermeable surface SUR of the solid of the interface and on the other side of the fluid flow F), which is the case hereinbelow.

This embodiment is for example used for a fluid that is incompressible, non-viscous (high Reynolds number) and non-rotational, without taking account of a boundary layer, the object being dipped in a field Vo of fluid. In this case, the solution is Poisson's equation, the velocity derives from a scalar potential. This case 1 and the cases comprising only scalar sources makes it possible to know the velocity or pressure values far from the surface SUR of the interface I, that can be an airplane wing, the fluid being considered as perfect.

In the global resolution matrix M, the coefficient is:

$$Q^{ij} = \frac{\vec{R_{ij}}}{4.\pi.\rho.R_{ij}^3}$$

The boundary conditions are, by projecting onto the normals to the surface B (or SUR): $C_{Ai} = \vec{V}_i \cdot \vec{N}_B = \Sigma_j (Q_{B,A}{}^{ij} \cdot \vec{N}_B) \cdot \lambda_{Bj} = Q_{NBA}{}^i \cdot \lambda_B = -\vec{V}_0 \cdot \vec{N}_B$ The matrix M is:

$$\begin{pmatrix} V_{B,1}^N \\ \vdots \\ V_{B,n_B}^N \end{pmatrix} = \begin{pmatrix} Q_{BB}^{N1,1} & \cdots & Q_{BB}^{N1,n_B} \\ \vdots & & \vdots \\ Q_{BB}^{Nn_B,1} & \cdots & Q_{BB}^{Nn_B,n_B} \end{pmatrix} \cdot \begin{pmatrix} \lambda_{B,1} \\ \vdots \\ \lambda_{B,n_B} \end{pmatrix}$$

with $V_B^N = -\vec{V}_0 \cdot \vec{N}_B$ that is to say, written in condensed fashion: $-\vec{V}_0{}^N = Q_{BB}{}^N \cdot \lambda_B$ The complete solution (V) is the sum of the initial solution (Vo) and of the calculated solution (Vc).

For the normal N to the surface SUR, the following obtains:

$$\vec{V} \cdot \vec{N}_B = (V_0 + V_c) \cdot \vec{N}_B = \vec{V}_0 \cdot \vec{N}_B - \vec{V}_0 \cdot \vec{N}_B = 0$$

Nonlimiting examples are: for the solid interface I, a cylinder in a wind tunnel according to FIGS. 19A, 19B and 19C (FIG. 5A illustrating the absolute value of the component $V_y$ of the velocity of the fluid flow having been calculated according to the axis y and FIG. 5B representing current lines of this fluid flow, having been calculated, for a cylinder CYL, having an axis parallel to the direction x), two cylinders (FIG. 6A illustrating the absolute value of the component $V_y$ of the velocity of the fluid flow having been calculated according to the axis y and FIG. 6B representing current lines of this fluid flow, having been calculated, for a cylinder CYL1 and another cylinder CYL2 remote from the cylinder CYL1, which each have an axis parallel to the direction x), a sphere or a profile NACA in a flow, with ground effect taken into account to illustrate the fact that the method allows for an analysis of the interactions between objects. The cylinder or cylinders are obstacles in the fluid flow of a wind tunnel.

Another nonlimiting example is an airplane wing according to FIG. 36A, for which FIG. 36B illustrates the three-dimensional impermeable surface SUR of the interface I, FIG. 36C illustrates the modulus of the velocity of the fluid flow having been calculated at points P situated in the plane of the axes y and z and FIG. 36D represents current lines of this fluid flow, having been calculated at points P situated in the plane of the axes y and z. In this example, there have been provided a triplet of scalar sources S' per group BL' according to the case 2 hereinbelow and one scalar source per group BL. The boundary condition on the surface SUR was wind=Vy=100 m/s (including on the ground) and zero normal velocity on the wing.

FIGS. 37A, 37B, 37C, 37D, 37E, 37F show the differences in accuracy on the modulus of the velocity having been calculated at points P situated in the plane of the axes y and z (FIGS. 37A, 37C, 37E) and on the current lines of the flow having been calculated at points P situated in the plane of the axes y and z (FIGS. 37B, 37D, 37F) around the wing when only the number of points of the space is changed:

FIGS. 37A, 37B: 10000 points of the space,

FIGS. 37C, 37D: 86000 points of the space,

FIGS. 37E, 37F: 240000 points of the space.

The calculations are all done with a wing having approximately 2000 test points P1.

Obviously, the calculations can be performed in several planes, as is represented for example in FIG. 37G showing the current lines of the flow having been calculated at points P situated in several planes parallel to the axes y and z, separated according to the axis x.

The calculation is performed in three dimensions, the results are presented more often than not in one plane for greater legibility.

Cases 2 and 3:

According to an embodiment, represented in FIG. 22, there are provided, as source of fluid, three scalar sources S of mass flow rate of fluid associated with each first test point P1, for the boundary condition L having a normal fluid velocity component and a tangential fluid velocity component at the first test point P1, which are zero at the interface I. This embodiment therefore provides a triplet of sources per group. Each of the embodiments and of the variants of the cases 2 and 3 is for example combined with the above-mentioned first underlying embodiment (source S situated below the impermeable surface SUR of the solid of the interface and on the other side of the fluid flow F), which is the case hereinbelow.

Case 2

According to an embodiment, represented in FIG. 23, there are provided, as source of fluid:

a single scalar source S of mass flow rate of fluid associated with each first test point P1 of a first interface I, for the boundary condition L having a normal fluid velocity component at the first test point P1, which is zero at the interface I, three scalar sources S' of mass flow rate of fluid associated with each first test point P1' of a second interface I' distinct from the first interface I, for the boundary condition L having a normal fluid velocity component and a tangential fluid velocity component at the first test point P1', which are zero at the interface I'. This embodiment therefore provides a triplet of sources S' per group BL'. This embodiment is for example combined with the above-mentioned first underlying embodiment (source S and/or S' situated below the impermeable surface SUR of the solid of the interface I and/or I' and on the other side of the fluid flow F), which is the case hereinbelow. The interface I is for example an object B. The interface I' is for example an object A.

For example, the interface I' can be the input E of a wind tunnel, in the case of the interface I located in a fluid flow provoked by a wind tunnel. Obviously, this example is nonlimiting.

For example
the matrix M comprises the coefficients $$Q^{ij} = \frac{\vec{R}_{ij}}{4.\pi.\rho.R_{ij}^3}$$

the velocity vector is: $\vec{V}_i = Q^{ij} \cdot \lambda_j$
The boundary conditions are, by projecting onto the normals to the surface SUR: $\vec{C}_{Ai} =$
$\vec{V_0}^i = Q_{A_1,A}{}^i \cdot \lambda_{A_1} + Q_{A_2,A}{}^i \cdot \lambda_{A_2} + Q_{A_3,A}{}^i \cdot \lambda_{A_3} + Q_{B,A}{}^i \cdot \lambda_B$
the matrix M is, written in condensed form:

$$\begin{pmatrix} V_0^x \\ V_0^y \\ V_0^z \\ V_B^N = 0 \end{pmatrix} = \begin{pmatrix} Q_{AA1}^x & Q_{AA2}^x & Q_{AA3}^x & Q_{AB}^x \\ Q_{AA1}^y & Q_{AA2}^y & Q_{AA3}^y & Q_{AB}^y \\ Q_{AA1}^z & Q_{AA2}^z & Q_{AA3}^z & Q_{AB}^z \\ Q_{BA1}^N & Q_{BA2}^N & Q_{BA3}^N & Q_{BB}^N \end{pmatrix} \begin{pmatrix} \lambda_{A_1} \\ \lambda_{A_2} \\ \lambda_{A_3} \\ \lambda_B \end{pmatrix}$$

that is to say $$\begin{pmatrix} V_0 \\ V_B^N = 0 \end{pmatrix} = \begin{pmatrix} Q_{AA} & Q_{BA} \\ Q_{AB}^N & Q_{BB}^N \end{pmatrix} \cdot \begin{pmatrix} \lambda_A \\ \lambda_B \end{pmatrix}$$

the dimension of the matrix is:

$$dim = \begin{pmatrix} 3n_A \times 3n_A & 3n_A \times n_B \\ n_B \times 3n_A & n_B \times n_B \end{pmatrix} = (3n_A + n_B) \times (3n_A + n_B)$$

The interfaces I and I' can be objects impermeable to the fluid, which are in interaction, such as, for example, an airplane I approaching the ground I'. Vectorial boundary conditions (indicated hereinbelow for the three scalar sources) can also be provided on the interfaces (for example for a wind gradient or similar).
Case 3
According to an embodiment, represented in FIG. 24, there are provided, as source of fluid:
three scalar sources S of mass flow rate of fluid associated with each first test point P1 of a first interface I, for the boundary condition L having a normal fluid velocity component at the first test point P1, which is zero at the interface I,
three scalar sources S' of mass flow rate of fluid associated with each first test point P1' of a second interface I' distinct from the first interface I, for the boundary condition L having a normal fluid velocity component and a tangential fluid velocity component at the first test point P1', which are zero at the interface I'. This embodiment therefore provides a triplet of sources S per group BL and a triplet of sources S' per group BL'. This embodiment is for example combined with the above-mentioned first underlying embodiment (source S and/or S' situated below the impermeable surface SUR of the solid of the interface I and/or I' and on the other side of the fluid flow F), which is the case hereinbelow. The interface I is for example an object B. The interface I' is for example an above-mentioned object A or E. In this embodiment, as variants, there could be provided a single scalar source S of mass flow rate of fluid associated with each first test point P1 of a first interface I, or two scalars of mass flow rate of fluid associated with each first test point P1 of a first interface I, with a single scalar source S' of mass flow rate of fluid associated with each first test point P1' of a second interface I' or two scalar sources S' of mass flow rate of fluid associated with each first test point P1' of a second interface I'.

For example, the interface I' can be the input E of a wind tunnel, in the case of the interface I located in a fluid flow provoked by a wind tunnel. Obviously, this example is nonlimiting.

For example, in the case of three scalar sources S and three scalar sources S':
the matrix M comprises the coefficients $$Q^{ij} = \frac{\vec{R}}{4.\pi.\rho.R_{ij}^3}$$

the velocity vector is: $\vec{V}_i = Q^{ij} \cdot \lambda_j$
The boundary conditions are, by projecting onto the normals to the surface SUR:

$\vec{C}_{Ai} =$
$\vec{V}_i = Q_{A_1,A}{}^i \cdot \lambda_{A_1} + Q_{A_2,A}{}^i \cdot \lambda_{A_2} + Q_{A_3,A}{}^i \cdot \lambda_{A_3} + Q_{B_1,A}{}^i \cdot \lambda_{B_1} + Q_{B_2,A}{}^i \cdot \lambda_{B_2} + Q_{B_3,A}{}^i \cdot \lambda_{B_3}$ $\vec{C}_A = \vec{V}_O \quad \vec{C}_B = \vec{0}$ the matrix M is, written in condensed form:

$$\begin{pmatrix} V_0^x \\ V_0^y \\ V_0^z \\ V_B^x = 0 \\ V_B^y = 0 \\ V_B^z = 0 \end{pmatrix} = \begin{pmatrix} Q_{AA1}^x & Q_{AA2}^x & Q_{AA3}^x & Q_{AB1}^x & Q_{AB2}^x & Q_{AB3}^x \\ \ldots & \ldots & (y) & & \ldots & \\ \ldots & \ldots & (z) & & \ldots & \\ Q_{BA1}^x & Q_{BA2}^x & Q_{BA3}^x & Q_{BB1}^x & Q_{BB2}^x & Q_{BB3}^x \\ \ldots & \ldots & (y) & & \ldots & \\ \ldots & \ldots & (z) & & \ldots & \end{pmatrix} \begin{pmatrix} \lambda_{A_1} \\ \lambda_{A_2} \\ \lambda_{A_3} \\ \lambda_{B_1} \\ \lambda_{B_2} \\ \lambda_{B_3} \end{pmatrix}$$

that is to say $$\begin{pmatrix} V_0 \\ V_B = 0 \end{pmatrix} = \begin{pmatrix} Q_{AA} & Q_{BA} \\ Q_{AB} & Q_{BB} \end{pmatrix} \cdot \begin{pmatrix} \lambda_A \\ \lambda_B \end{pmatrix}$$

the dimension of the matrix is:

$$dim = \begin{pmatrix} 3n_A \times 3n_A & 3n_A \times 3n_B \\ 3n_B \times 3n_A & 3n_B \times 3n_B \end{pmatrix} = (3n_A + 3n_B) \times (3n_A + 3n_B)$$

The embodiments of the cases 2 and 3 are for example used for a fluid that is incompressible, non-viscous (high Reynolds number), non-rotational, with restoration of the boundary layer CL phenomenon by cancellation of the tangential velocity component at the interface I. Examples are: cylinder in a flow with ground effect, and zoom in the vicinity of the walls of the objects to illustrate the fact that the method allows complex boundary conditions at each of the points of the surface of the objects. For this example in the case 3, FIG. 7A represents the absolute value of the component $V_y$ of the velocity of the fluid flow having been calculated according to the axis y and FIG. 7B represents current lines of this fluid flow, having been calculated, and this having been done for a solid interface I, formed by a cylinder CYL having an axis parallel to the direction x. FIGS. 8, 9 and 10 illustrate curves C1, C2, C3, C4 of the calculated velocity $V_y$ of the fluid flow F according to the axis y on a vertical axis, as a function of the altitude z on the x axis for, respectively, the following boundary conditions of the cylinder CYL of FIGS. 7A and 7B and of the ground:

C1: $V_{sol}{}^n=0$ and $V_{cyl}{}^n=0$,
C2: $V_{sol}=0$ and $V_{cyl}{}^n=0$,
C3: $V_{sol}{}^n=0$ and $V_{cyl}=0$,
C4: $V_{sol}=0$ and $V_{cyl}=0$, where the exponent n designates the normal component of the velocity V and the absence of the exponent n designates the velocity vector.

According to an embodiment, each group BL contains three scalar sources S of mass flow rate of fluid, for boundary conditions L having a normal fluid velocity component, which is zero at the interface I, and a tangential fluid velocity component, which is imposed. FIG. 11A represents the absolute value of the component $V_y$ of the velocity of the fluid flow having been calculated according to the axis y and FIG. 11B represents current lines of this fluid flow, having been calculated, and this having been done for a solid interface I, formed by a cylinder CYL having an axis parallel to the direction x, where the boundary conditions provide for the tangential component of the velocity vector of the fluid flow to be equal to a prescribed value of the wind (for example 100 m·s$^{-1}$ here) on the cylinder.

Case 4

According to an embodiment, represented in FIG. 25, there are provided, as source S of fluid, at least one first scalar source S of mass flow rate of fluid in association with each first test point P1 of the interface I, at least one second scalar source S20 of mass flow rate of fluid situated above a surface SCL delimiting a boundary layer CL of the fluid flow F relative to the interface I and at least one third scalar source S30 of mass flow rate of fluid situated below the surface SCL delimiting the boundary layer CL, for the boundary condition L having, at the first test point P1 of the interface I, a normal fluid velocity component, zero at the interface I, and a conserved normal velocity component at another prescribed test point P5 of the surface SCL delimiting the boundary layer CL, modulo the density of the fluid. The at least one first scalar source S of mass flow rate of fluid is therefore situated in the first inner zone Z1. The at least one second scalar source S20 of mass flow rate of fluid is therefore situated in the second outer zone Z2.

It is possible to provide a single scalar source S of mass flow rate of fluid in association with each first test point P1 of the interface I or three scalar sources S of mass flow rate of fluid in association with each first test point P1 of the interface I. This embodiment therefore provides a source S or a triplet of sources S per group BL and two sources S20, S30 per group BL''. The interface I is for example an object B. This embodiment is for example combined with the above-mentioned first underlying embodiment (source S and/or S' situated below the impermeable surface SUR of the solid of the interface I and/or I' and on the other side of the fluid flow F), which is the case hereinbelow. The interface I is for example an object B. The interface I' is for example an above-mentioned object A or E. C designates the surface SCL.

This case appears for example for a high Reynolds number in irrotational fluid, layered fluid media M2 in which solid objects are immersed. The boundary conditions are for example user boundary conditions (CLU) at the impermeable surfaces and intrinsic boundary conditions (CLI) at the fluid-fluid surface SCL. It is possible to provide an isolated object in an irrotational flow surrounded by layers of different physical properties, with two boundary conditions per test point of the fluid/fluid surface SCL (conserved normal velocity component modulo rho and scalar potential) (CLI) and the same boundary conditions as previously at the impermeable surface SUR.

The coefficient of the matrix M in potential $\vartheta$ is for example:

With $\theta_i = M^{ij} \cdot \alpha_j$

There are imposed, as intrinsic boundary conditions the equality of the potential on either side of the surface SCL:

$$C_A = \theta_{A,Top} - \theta_{A,Bottom} = M_{A,A}{}^{ij} \cdot \lambda_A - M_{B,A}{}^{ik} \cdot \lambda_B = 0$$

The velocity is tangential to the surface SCL, that is to say that the normal velocity is zero.

$$M^{ij} = \frac{1}{4\pi\rho R_{ij}}$$

In a condensed form of the matrix:

$$\begin{pmatrix} V_0^x \\ V_0^y \\ V_0^z \\ \rho_1 \cdot V_{C1}^N - \rho_2 \cdot V_{C2}^N = 0 \\ \theta_1 - \theta_2 = 0 \\ V_B^N = 0 \end{pmatrix} =$$

$$\begin{pmatrix} Q_{AA1}^x & Q_{AA2}^x & Q_{AA3}^x & 0 & Q_{AC_{Bot}}^x & 0 \\ \ldots & (y) & \ldots & 0 & (y) & 0 \\ \ldots & (z) & \ldots & 0 & (z) & 0 \\ -\rho_2 \cdot Q_{CA1}^N & -\rho_2 \cdot Q_{CA2}^N & -\rho_2 \cdot Q_{CA3}^N & \rho_1 \cdot Q_{CC_{Top}}^N & -\rho_2 \cdot Q_{CC_{Bot}}^N & \rho_1 \cdot Q_{CB}^N \\ M_{CA_1} & M_{CA_2} & M_{CA_3} & M_{CC_{Top}} & M_{CC_{Bot}} & M_{CB} \\ 0 & 0 & 0 & Q_{BC_{Top}}^N & 0 & Q_{BB}^N \end{pmatrix} \begin{pmatrix} \lambda_{A1} \\ \lambda_{A2} \\ \lambda_{A3} \\ \lambda_{C_{Top}} \\ \lambda_{C_{Bot}} \\ \lambda_B \end{pmatrix}$$

-continued $$\begin{pmatrix} V_0 \\ \rho_1 \cdot V_{C1}^N - \rho_2 \cdot V_{C2}^N = 0 \\ \theta_1 - \theta_2 = 0 \\ V_B^N = 0 \end{pmatrix} = \begin{pmatrix} Q_{AA} & 0 & Q_{AC_{Bot}} & 0 \\ \rho_1 \cdot Q_{CA}^N & -\rho_2 \cdot Q_{CC_{Top}}^N & \rho_1 \cdot Q_{CC_{Bot}}^N & -\rho_2 \cdot Q_{CB}^N \\ M_{CA} & -M_{CC_{Top}} & M_{CC_{Bot}} & -M_{CB} \\ 0 & Q_{BC_{Top}}^N & 0 & Q_{BB}^N \end{pmatrix} \begin{pmatrix} \lambda_A \\ \lambda_{C_{Top}} \\ \lambda_{C_{Bot}} \\ \lambda_B \end{pmatrix}$$

The dimension of the matrix is:

$$dim = \begin{pmatrix} 3n_A \times 3n_A & 3n_A \times n_C & 3n_A \times n_C & 3n_A \times n_B \\ n_C \times 3n_A & n_C \times n_C & n_C \times n_C & n_C \times n_B \\ n_C \times 3n_A & n_C \times n_C & n_C \times n_C & n_C \times n_B \\ n_B \times 3n_A & n_B \times n_C & n_B \times n_C & n_B \times n_B \end{pmatrix} =$$

$$(3n_A + 2n_C + n_B) \times (3n_A + 2n_C + n_B)$$

Case 5

According to an embodiment, represented in FIG. 26, there are provided, as source S of fluid, at least two scalar sources S of mass flow rate of fluid in association with each first test point P1 of the interface I, for the boundary condition L having, at the first test point P1 of the interface I, a normal fluid velocity component, zero at the interface I, and a zero normal velocity component at a prescribed other test point P5 of a surface SCL delimiting a boundary layer CL of the fluid flow relative to the interface I. This embodiment therefore provides two sources S per group BL and two sources S20, S30 per group BL". As a variant, it would be possible to provide a single scalar source S of mass flow rate of fluid in association with each first test point P1 of the interface I or three scalar sources S of mass flow rate of fluid in association with each first test point P1 of the interface I. The interface I is for example an object B. Each of the embodiments and variants of the case 5 is for example combined with the above-mentioned first underlying embodiment (source S and/or S' situated below the impermeable surface SUR of the solid of the interface I and/or I' and on the other side of the fluid flow F), which is the case hereinbelow. The interface I is for example an object B. The interface I' is for example an above-mentioned object A or E. C designates the surface SCL.

This case occurs for example for a high Reynolds number, for an isolated object in an irrotational flow, surrounded by layers of the same physical properties. User boundary conditions (CLU) are set on the fluid/fluid surface SCL (for example zero normal velocity component). This case involves layered boundary conditions (CLS): there is no need for blocks of sources on either side of the test points of the surface SCL, the sources situated in the surrounding objects I are calculated to take these CLUs into account. There are the same conditions as previously on the impermeable surfaces: the CLUs apply. There can be additional sources to take account of the CLSs that have just been added.

The case of two scalar sources S is described hereinbelow. The matrix M is:

$$\begin{pmatrix} V_A^x \\ V_A^y \\ V_A^z \\ V_C^N = 0 \\ V_B^N = 0 \end{pmatrix} = \begin{pmatrix} Q_{AA1}^x & Q_{AA2}^x & Q_{AA3}^x & Q_{AB1}^x & Q_{AB2}^x \\ & \cdots & (y) & \cdots & \\ & \cdots & (z) & \cdots & \\ Q_{CA1}^N & Q_{CA2}^N & Q_{CA3}^N & Q_{CB1}^N & Q_{CB2}^N \\ Q_{BA1}^N & Q_{BA2}^N & Q_{BA3}^N & Q_{BB1}^N & Q_{BB2}^N \end{pmatrix} \begin{pmatrix} \lambda_{A1} \\ \lambda_{A2} \\ \lambda_{A3} \\ \lambda_{B1} \\ \lambda_{B2} \end{pmatrix}$$

that is to say:

$$\begin{pmatrix} V_0 \\ V_C^N = 0 \\ V_B^N = 0 \end{pmatrix} = \begin{pmatrix} Q_{AA} & Q_{AB1} & Q_{AB2} \\ Q_{CA1}^N & Q_{CB1}^N & Q_{CB2}^N \\ Q_{BA1}^N & Q_{BB1}^N & Q_{BB2}^N \end{pmatrix} \begin{pmatrix} \lambda_A \\ \lambda_{B1} \\ \lambda_{B2} \end{pmatrix}$$

The dimension of the matrix is:

$$dim = \begin{pmatrix} 3n_A \times 3n_A & 3n_A \times n_B & 3n_A \times n_B \\ n_B \times 3n_A & n_B \times n_B & n_B \times n_B \\ n_B \times 3n_A & n_B \times n_B & n_B \times n_B \end{pmatrix} = (3n_A + 2n_B) \times (3n_A + 2n_B)$$

The surface SCL is not a separation surface, it bears only the test points P5. The sources S' of A send fluid through B.

Case 6

According to an embodiment, represented in FIGS. 27A, 27B and 27C, during a first iteration of the first and second steps E1, E2, a first boundary condition is prescribed concerning the first physical quantity (V, P) of the fluid flow F taken at the predetermined first test point P1 of the interface I and a first determined number of sources S100 of fluid, greater than or equal to 1, to calculate by DPSM method a first iteration of the first physical quantity (V, P) of the fluid flow F situated at the second point P of the space from the at least one parameter of the first determined number of sources S of fluid, having been calculated, then, during at least one second iteration of the first and second steps E1, E2, following the first iteration, a second boundary condition is prescribed concerning the first physical quantity (V, P) of the fluid flow (F) taken at the predetermined first test point (P1) of the interface (I), the second boundary condition being different from the first boundary condition, a second determined number of sources S200 of fluid, greater than or equal to 1, is added to the first determined number of sources S100 of fluid, to calculate by DPSM method at least one second iteration of the first physical quantity (V, P) of the fluid flow F situated at the second point P of the space from the at least one parameter of the first and second determined numbers of sources S100, S200 of fluid, having been calculated.

Each first source S100 is or comprises, for example, one or more point sources of radial mass flow rate of fluid. Each second source S200 is or comprises, for example, one or more point sources of rotational mass flow rate of fluid.

The computer comprises a fifth calculation means CAL5 configured to calculate the first iteration, a sixth calculation means CAL6 configured to calculate the second iteration.

An example of first iteration is represented in FIG. 27A (first boundary condition being zero normal fluid velocity, non-zero tangential fluid velocity). An example of second iteration is represented in FIG. 27B (second boundary condition being zero tangential fluid velocity). Obviously, one or more other iterations can be performed, such as, for example, a third iteration represented in FIG. 27C (for example circulation or rotation of the surface SUR).

This case is called integrated sequential calculation. In this integrated sequential calculation, the results obtained in the step n−1 are fully integrated in the step n.

Thus, according to an embodiment, during a first iteration of the second calculation step E2, each block BL contains a first scalar source S of flow rate of fluid for the boundary conditions L having a normal fluid velocity component, which is zero at the interface I, and the DPSM method is implemented to calculate the fluid flow rate of the first scalar source S from the boundary conditions L. Then, during a second iteration of the second calculation step E2, each block BL contains the first scalar source S of mass flow rate of fluid, a second source S of mass flow rate of fluid and two rotational sources S of mass flow rate of fluid for the boundary conditions L having a normal fluid velocity component, which is zero at the interface I, and a tangential fluid velocity component, which is prescribed. This embodiment is for example used for a fluid that is incompressible and non-viscous (high Reynolds number) with the vorticity taken into account by successive iterations. This makes it possible for example to take account of an object, rotating or not, that can be a sphere that is immobile or in rotation in a flow with ground effect.

This second method can be coupled with the calculation of the boundary layer on completion of the first step. For example, a slip surface SG representative of the boundary layer surrounding the object is defined geometrically, and meshed by test points. This surface can be either a slip surface deriving from the first calculation, or a surface of a boundary layer calculated with a suitable model, for example a Prandtl model, which defines a boundary layer thickness $$\delta(l) = \frac{l}{\sqrt{R_e}}$$

(where l is the distance traveled along a current line relative to the upstream stop point).

In an embodiment of the invention, blocks of sources BL arranged inside the profile are arranged to send fluid simultaneously into the boundary layer and into the medium outside the boundary layer according to the boundary conditions set jointly at the test points of the interface I and of the slip surface SG. The sources send fluid into these two media, assumed identical on each side of the boundary layer. This case is illustrated in the case of three scalar sources and one rotational source.

In a second embodiment of the invention, the viscosity in the boundary layer is taken into account, and the slip surface SG becomes an interface separating two media of different properties: close to the surface with low Reynolds number, beyond this surface with high Reynolds number. This case will be dealt with later.

This embodiment allows, for example, a superimposing of the scalar and vectorial solutions by successive iterations: integration of the result of the iteration n in the iteration n+1. In this case, a scalar solution is first of all calculated with one source per block in the profile, and the general form of the flow lines is therefore obtained. Then, this result is integrated in the following calculation which, for its part, introduces other conditions on the object (cancellation of the tangential component, object in rotation, etc.).

For example, the first iteration gives the following first matrix M:

$$\begin{pmatrix} V_B^N = 0 \\ V_0^x \\ V_0^y \\ V_0^z \end{pmatrix} = \begin{pmatrix} Q_{BB}^N & Q_{BA2}^N & Q_{BA3}^N & Q_{BA3}^N \\ Q_{AB}^x & Q_{AA1}^x & Q_{AA1}^x & Q_{AA1}^x \\ Q_{AB}^y & Q_{AA2}^y & Q_{AA2}^y & Q_{AA2}^y \\ Q_{AB}^z & Q_{AA3}^z & Q_{AA3}^z & Q_{AA3}^z \end{pmatrix} \begin{pmatrix} \lambda_{1B} \\ \lambda_{A_1} \\ \lambda_{A_2} \\ \lambda_{A_3} \end{pmatrix}$$

that is to say:

$$\begin{pmatrix} V_B^N = 0 \\ V_0 \end{pmatrix} = \begin{pmatrix} Q_{BB}^N & Q_{BA}^N \\ Q_{AB} & Q_{AA} \end{pmatrix} \begin{pmatrix} \lambda_{1B} \\ \lambda_A \end{pmatrix}$$

the dimension of which is:

$$dim = \begin{pmatrix} n_B \times n_B & n_B \times 3n_A \\ 3n_A \times n_B & 3n_A \times 3n_A \end{pmatrix} = (n_B + 3n_A) \times (n_B + 3n_A)$$

On the second iteration, the first matrix M is for example increased, by adding the three sources of B and by changing the boundary conditions: the tangential velocity calculated in the first iteration is canceled, to obtain the following second matrix M:

$$\begin{pmatrix} \lambda_{1B} \\ V_B^T = -V_{Bstep1}^T \\ V_0 \end{pmatrix} = \begin{pmatrix} Id & 0 & 0 \\ Q_{BB}^T & Q_{BB123}^T & Q_{BA}^T \\ Q_{AB} & Q_{AB123} & Q_{AA} \end{pmatrix} \begin{pmatrix} \lambda_{1B} \\ \lambda_{2B} \\ \lambda_A \end{pmatrix}$$

the dimension of which is:

$$dim = \begin{pmatrix} n_B \times n_B & n_B \times 3n_B & n_B \times 3n_A \\ 3n_B \times n_B & 3n_B \times 3n_B & 3n_B \times 3n_A \\ 3n_A \times n_B & 3n_A \times 3n_B & 3n_A \times 3n_A \end{pmatrix} = (4n_B + 3n_A) \times (4n_B + 3n_A)$$

$$\begin{cases} \text{First iteration: } \lambda_{1B} \\ \text{Second iteration: } \lambda_{2B} \\ \text{Third iteration: } \lambda_{3B} \end{cases}$$

On the third iteration, the following third matrix M is obtained:

$$\begin{pmatrix} \lambda_{1B} \\ \begin{pmatrix} \lambda_{2B1} \\ \lambda_{2B2} \\ \lambda_{2B3} \end{pmatrix} \\ \begin{pmatrix} V_B^x = V_B^{Tx} \\ V_B^y = V_B^{Ty} \\ V_B^z = 0 \end{pmatrix} \\ \begin{pmatrix} V_0^x \\ V_0^y \\ V_0^z \end{pmatrix} \end{pmatrix} =$$

$$\begin{pmatrix} Id & 0 & 0 & 0 & 0 & 0 & 0 & 0 & 0 & 0 \\ 0 & Id & 0 & 0 & 0 & 0 & 0 & 0 & 0 & 0 \\ 0 & 0 & Id & 0 & 0 & 0 & 0 & 0 & 0 & 0 \\ 0 & 0 & 0 & Id & 0 & 0 & 0 & 0 & 0 & 0 \\ Q_{BB}^x & Q_{BB1}^x & Q_{BB2}^x & Q_{BB3}^x & Q_{BB1}^x & Q_{BB2}^x & Q_{BB3}^x & Q_{BA1}^x & Q_{BA2}^x & Q_{BA3}^x \\ \cdots & & (y) & & \cdots & & & \cdots & & \\ \cdots & & (z) & & \cdots & & & \cdots & & \\ Q_{AB}^x & Q_{AB1}^x & Q_{AB1}^x & Q_{BB3}^x & Q_{AB1}^x & Q_{AB2}^x & Q_{BB3}^x & Q_{AA1}^x & Q_{AA2}^x & Q_{AA3}^x \\ \cdots & & (y) & & \cdots & & & \cdots & & \\ \cdots & & (z) & & \cdots & & & \cdots & & \end{pmatrix} \begin{pmatrix} \lambda_{1B} \\ \begin{pmatrix} \lambda_{2B1} \\ \lambda_{2B2} \\ \lambda_{2B3} \end{pmatrix} \\ \begin{pmatrix} \lambda_{3B1} \\ \lambda_{3B2} \\ \lambda_{3B3} \end{pmatrix} \\ \begin{pmatrix} \lambda_{A1} \\ \lambda_{A2} \\ \lambda_{A3} \end{pmatrix} \end{pmatrix}$$

that is to say $$\begin{pmatrix} \lambda_{1B} \\ \lambda_{2B} \\ V_B = V_{rotation} \\ V_0 \end{pmatrix} = \begin{pmatrix} Id & 0 & 0 & 0 \\ 0 & Id & 0 & 0 \\ Q_{BB1} & Q_{BB2} & Q_{BB3} & Q_{BA} \\ Q_{AB1} & Q_{AB2} & Q_{AB3} & Q_{AA} \end{pmatrix} \begin{pmatrix} \lambda_{1B} \\ \lambda_{2B} \\ \lambda_{3B} \\ \lambda_A \end{pmatrix}$$

the dimension of which is:

$$dim = \begin{pmatrix} n_B \times n_B & n_B \times 3n_B & n_B \times 3n_B & n_B \times 3n_A \\ 3n_B \times n_B & 3n_B \times 3n_B & 3n_B \times 3n_B & 3n_B \times 3n_A \\ 3n_B \times n_B & 3n_B \times 3n_B & 3n_B \times 3n_B & 3n_B \times 3n_A \\ 3n_A \times n_B & 3n_A \times 3n_B & 3n_A \times 3n_B & 3n_A \times 3n_A \end{pmatrix} =$$

$$(7n_B + 3n_A) \times (7n_B + 3n_A)$$

The velocity at a point M is:

$$V_M = \begin{pmatrix} Q_{MB1} & Q_{MB2} & Q_{MB3} & Q_{MA} \end{pmatrix} \begin{pmatrix} \lambda_{1B} \\ \lambda_{2B} \\ \lambda_{3B} \\ \lambda_A \end{pmatrix}$$

Case 7

According to an embodiment represented in FIGS. 28A, 28B and 28C, during a first iteration of the first and second steps E1, E2, a first boundary condition is prescribed concerning the first physical quantity (V, P) of the fluid flow F taken at the first predetermined test point P1 of the interface I and a first determined number of sources S100 of fluid, greater than or equal to 1, is prescribed to calculate, by DPSM method, a first iteration of the first physical quantity (V, P) of the fluid flow F situated at the second point P of the space from the at least one parameter of the first determined number of sources S100 of fluid, having been calculated, then, during at least one second iteration of the first and second steps E1, E2, following the first iteration, a second boundary condition is prescribed concerning the first physical quantity (V, P) of the fluid flow F taken at the first predetermined test point P1 of the interface I and a second determined number of sources S200 of fluid, greater than or equal to 1, is determined to calculate, by DPSM method, a second iteration of the first physical quantity (V, P) of the fluid flow F situated at the second point P of the space from the at least one parameter of the second determined number of sources S200 of fluid, having been calculated, the second boundary condition being different from the first boundary condition, then, the first iteration of the first physical quantity (V, P) of the fluid flow F and the second iteration of the first physical quantity (V, P) of the fluid flow F are added together.

The computer comprises a fifth calculation means CAL5 configured to calculate the first iteration, a sixth calculation means CAL6 configured to calculate the second iteration and a seventh calculation means CAL7 configured to add together the first iteration and the second iteration.

Each first source S100 is or comprises, for example, one or more point sources of radial mass flow rate of fluid. Each second source S200 is or comprises, for example, one or more point sources of rotational mass flow rate of fluid.

An example of first iteration is represented in FIG. 28A (first boundary condition being zero normal fluid velocity, calculated tangential fluid velocity). An example of second iteration and of addition of the first iteration and of the second iteration is represented in FIG. 28B (second boundary condition being tangential velocity imposed, by the user, or dependent on the first calculation). Obviously, one or more other iterations can be performed, such as, for example, a third iteration represented in FIG. 28C (for example circulation or rotation of the surface SUR).

This case is called sequential summed calculation. In this sequential summed calculation, the results obtained in the step n−1 can be partially injected into the step n in the form of boundary conditions.

This embodiment allows, for example, a superimposition of the scalar and vectorial solutions by successive iterations: summing of the results of the different iterations to obtain the final result. This case can be identical to the preceding case, but each solution is created successively. This leads to the concept of additional sources. For example: a scalar solution is first of all calculated with one source per block in the profile, then hybrid sources are added to cancel the tangential component of the velocity on the profile: the result thereof is sets of additional sources for all the objects in interaction in the problem modeled. Then, a rotation is imposed on the object, etc. The solution will be the resultant of each of the individual solutions obtained in each step. This case makes it possible to calculate the geometry of a boundary layer CL and of the surface SCL delimiting it, on completion of the first iteration and to take it into account during the second iteration.

Thus, for example, boundary conditions are imposed on the fly on the first iteration, then new boundary conditions are imposed on the second iteration. The new boundary conditions depend on the first iteration or are intrinsic, as in the case of constant recirculation.

For example, the result of the first iteration for a single scalar source S per block BL or a single scalar source S associated with each first test point P1 (case 1 below) gave a velocity vector at the surface SUR of the interface I (in this case an airplane wing I, SUR) according to FIG. 38A (velocity vector going from the leading front edge BAV of the wing I, SUR to the trailing rear edge BAR of the wing I, SUR both on the upper surface EXTR thereof and on the lower surface INTR thereof). In this first iteration, the boundary conditions that are imposed are the nullity of the normal component of the velocity of the fluid flow at the surface SUR of the wing I, SUR.

In the second iteration, it is possible to impose on the surface SUR of the wing I, SUR boundary conditions being a velocity opposite the velocity calculated on the first iteration according to the example of FIG. 38B (velocity vector going from the trailing rear edge BAR of the wing I, SUR to the leading front edge BAV of the wing I, SUR both on the side of the upper surface EXTR thereof and on the lower surface INTR thereof). Thus, by adding the first iteration and the second iteration together, a zero velocity of the fluid flow at the surface SUR of the wing I, SUR is obtained.

Or, on the second iteration, it is possible to impose on the surface SUR of the wing I, SUR boundary conditions being a constant tangent velocity according to the example of FIG. 38C (constant recirculation around the wing I, SUR, namely velocity vector going from the leading front edge BAV of the wing I, SUR to the trailing rear edge BAR of the wing I, SUR on the side of the upper surface EXTR thereof, and velocity vector going from the trailing rear edge BAR of the wing I, SUR to the leading front edge BAV of the wing I, SUR on the side of the lower surface INTR thereof).

A first example of FIGS. 38A and 38B is illustrated hereinbelow.

FIG. 39 represents an example of boundary condition vector on the wing I, SUR.

FIGS. 40A and 41A respectively represent the field lines of the flow and the modulus of the velocity of the flow and correspond to the first iteration according to the case 1 of one scalar source S per block BL or one scalar source S associated with each first test point P1. These figures correspond to FIG. 38A and have been established for the wing I, SUR of FIG. 39.

FIGS. 40B and 41B respectively represent the field lines of the flow and the modulus of the velocity of the flow and correspond to the second iteration according to the case of three scalar sources S per block BL or three scalar sources S associated with each first test point P1. The boundary conditions of this second iteration comprise a velocity at the surface SUR, opposite the velocity calculated in the first iteration. Furthermore, the boundary conditions of this second iteration comprise a zero velocity at the input and at the output of the wind tunnel and on the ground. These figures correspond to FIG. 38B.

FIGS. 40C and 41C respectively represent the field lines of the flow and the modulus of the velocity of the flow and correspond to the addition of the second iteration of FIGS. 40B and 41B and of, respectively, the first iteration of FIGS. 40A and 41A. It will be noted that the velocities on the second iteration are much smaller than on the first iteration.

FIGS. 42A, 42B, 42C, 42D, 42E, 42F, 42G and 42H represent the sources of the first iteration of FIGS. 40A and 41A, where the x axis is the index of the point in the point meshing on the corresponding object and the y axis is the flow from the source.

FIGS. 43A, 43B, 43C, 43D, 43E, 43F, 43G and 43H represent the sources of the second iteration of FIGS. 40B and 41B, where the x axis is the index of the point in the point meshing on the corresponding object and the y axis is the flow from the source. It will be noted that the influence of the sources of the wind tunnel decreases, whereas the influence of the sources of the wing I, SUR increases.

A second example of FIGS. 38A and 38B is illustrated hereinbelow.

Figure 39:
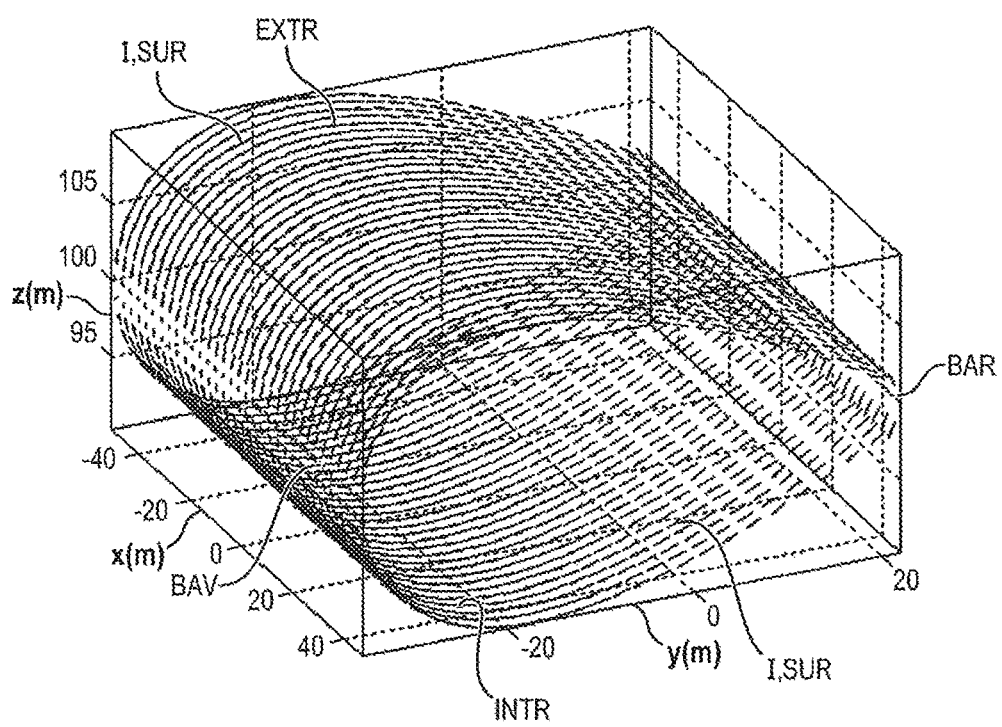
Figure 40A:
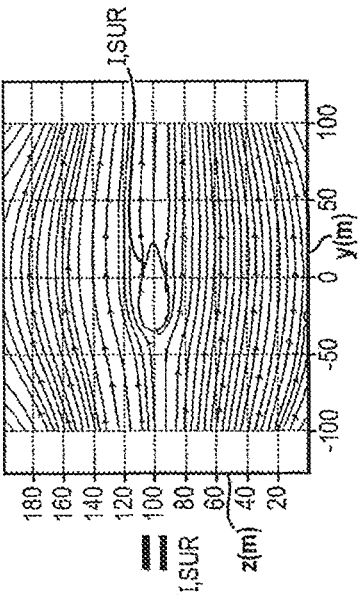
Figure 40B:
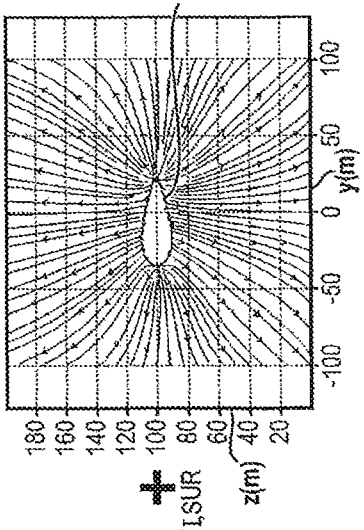
Figure 40C:
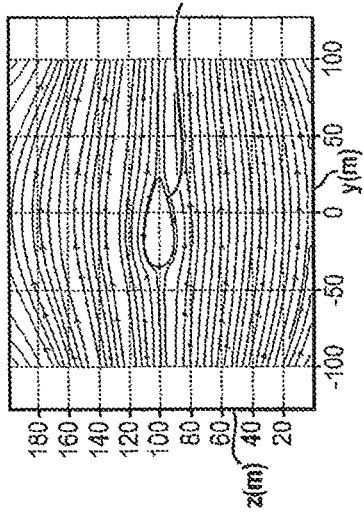

FIG. 39 represents an example of boundary condition vector on the wing I, SUR.

Figure 44A:
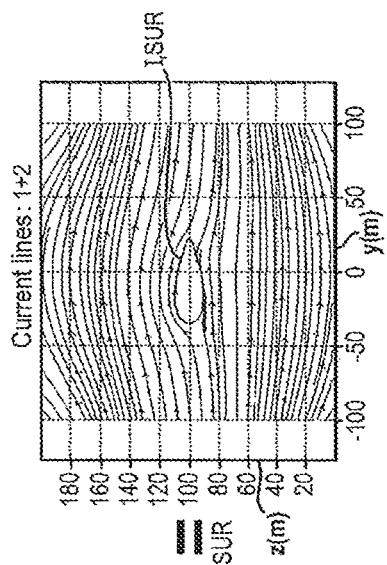
Figure 45A:
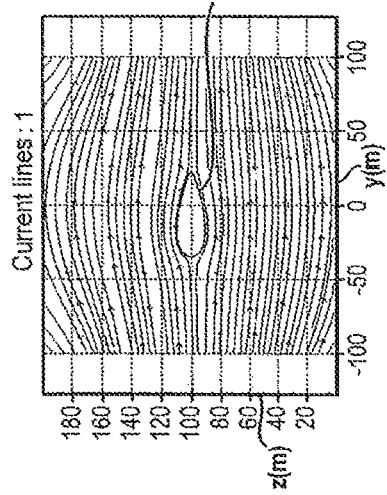

FIGS. 44A and 45A respectively represent the field lines of the flow and the modulus of the velocity of the flow and correspond to the first iteration according to the case 1 of one scalar source S per block BL or one scalar source S associated with each first test point P1. These figures correspond to FIG. 38A and have been established for the wing I, SUR of FIG. 39.

Figure 44B:
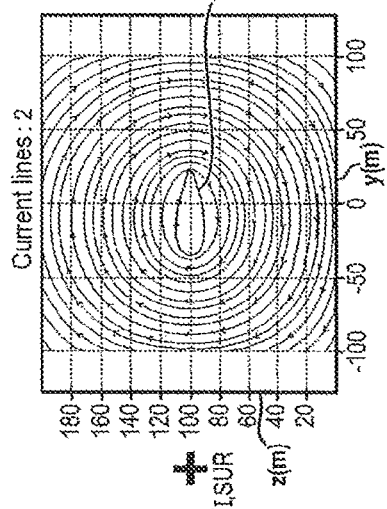
Figure 45B:
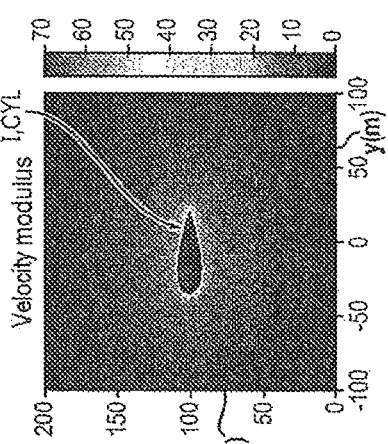

FIGS. 44B and 45B respectively represent the field lines of the flow and the modulus of the velocity of the flow and correspond to the second iteration according to the case of one scalar source S and of two rotational sources SR per block BL or of one scalar source S and of two rotational sources SR associated with each first test point P1 (the two rotational sources SR being, for example, a rotational source about a direction parallel to the axis x and a rotational source about another direction parallel to the axis y). That is called a so-called hybrid source S, SR. The boundary conditions of this second iteration comprise a constant recirculation around the wing I, SUR according to FIG. 38C, for example with a tangent velocity of 20 m/s.

Figure 44C:
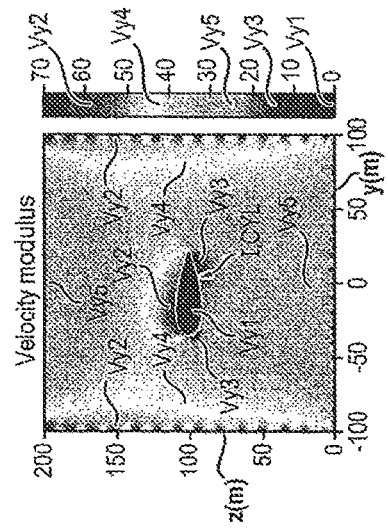
Figure 45C:
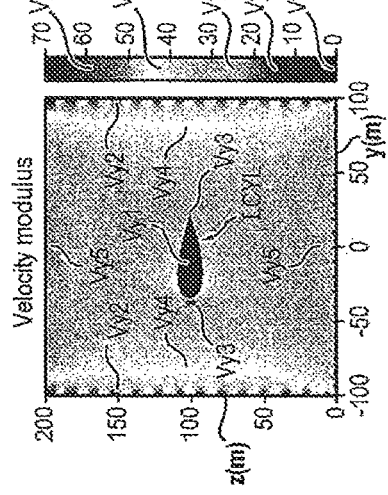

FIGS. 44C and 45C respectively represent the field lines of the flow and the modulus of the velocity of the flow and correspond to the addition of the second iteration of FIGS. 44B and 44B and, respectively, the first iteration of FIGS. 44A and 45A.

FIGS. 46A, 46B, 46C, 46D, 46E, 46F, 46G and 46H represent the sources of the first iteration of FIGS. 44A and 45A, where the x axis is the index of the point in the point meshing on the corresponding object and the y axis is the flow from the source.

FIGS. 47A, 47B, 47C, 47D, 47E, 47F, 47G and 47H represent the sources of the second iteration of FIGS. 44B and 45B, where the x axis is the index of the point in the point meshing on the corresponding object and the y axis is the flow from the source.

FIGS. 48A and 49A respectively represent the field lines of the flow and the modulus of the velocity of the flow and correspond to the addition of the second iteration and of the first iteration in the above-mentioned second example of FIGS. 38A and 38B for an angle of incidence of the wing I, SUR of 0° and at a first determined distance, away from the ground.

FIGS. 48B and 49B respectively represent the field lines of the flow and the modulus of the velocity of the flow and correspond to the addition of the second iteration and of the first iteration in the above-mentioned second example of FIGS. 38A and 38B for an angle of incidence of the wing I, SUR of 10° and at the first determined distance from the wing I, SUR, away from the ground.

FIGS. 48C and 49C respectively represent the field lines of the flow and the modulus of the velocity of the flow and correspond to the addition of the second iteration and of the first iteration in the above-mentioned second example of FIGS. 38A and 38B for an angle of incidence of the wing of 0° and at a second determined distance from the wing I, SUR, close to the ground. The second determined distance is less than the first determined distance.

FIGS. 48C and 49C respectively represent the field lines of the flow and the modulus of the velocity of the flow and correspond to the addition of the second iteration and of the first iteration in the above-mentioned second example of FIGS. 38A and 38B for an angle of incidence of the wing I, SUR of 0° and at a second determined distance from the wing I, SUR, close to the ground.

FIGS. 48D and 49D respectively represent the field lines of the flow and the modulus of the velocity of the flow and correspond to the addition of the second iteration and of the first iteration in the above-mentioned second example of FIGS. 38A and 38B for an angle of incidence of the wing I, SUR of 10° and at the second determined distance from the wing I, SUR, close to the ground.

Hereinabove, FIGS. 36A to 49D correspond to a wing of NACA type.

In a variant, in the second iteration, the velocity imposed on the surface SUR of the wing I, SUR is calculated from the first iteration.

Obviously, what is described for the wing I, SUR, for which the fluid is air, is valid for any surface SUR, any interface I and any fluid.

Figure 41A:
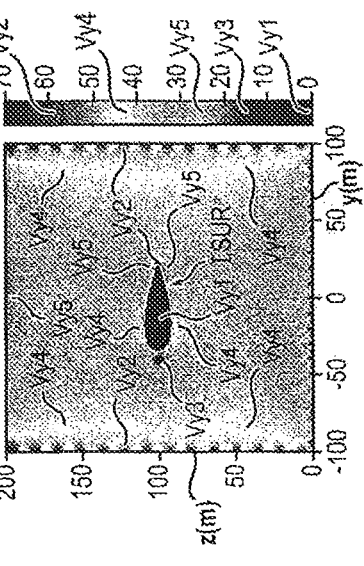
Figure 41B:
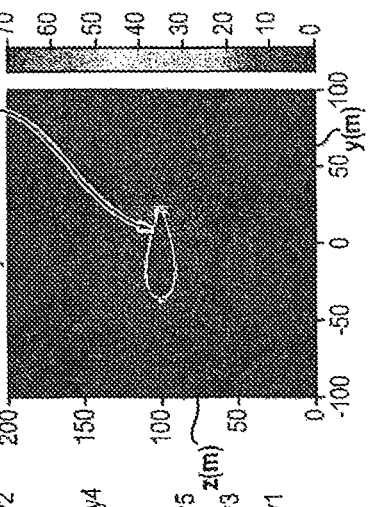
Figure 41C:
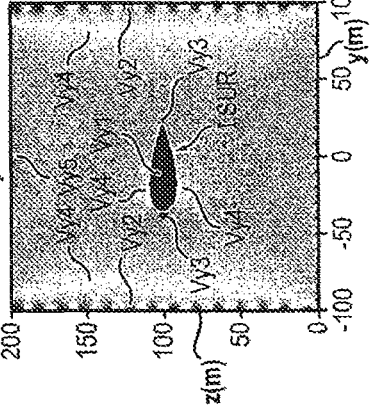
Figure 43E:
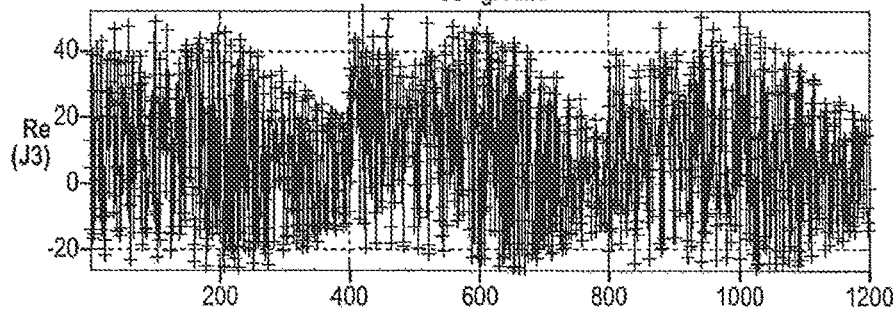
Figure 43F:
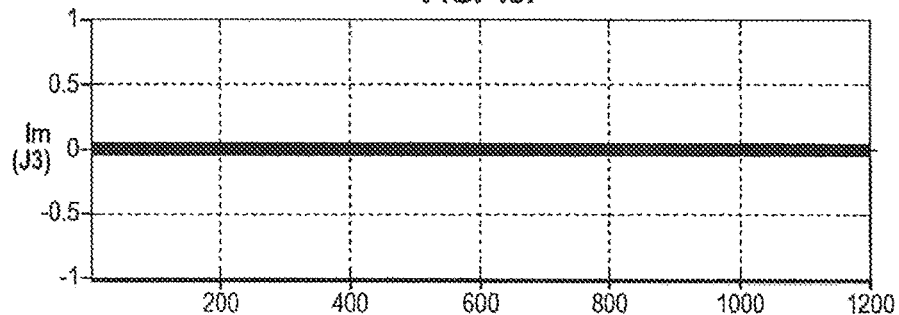
Figure 43G:
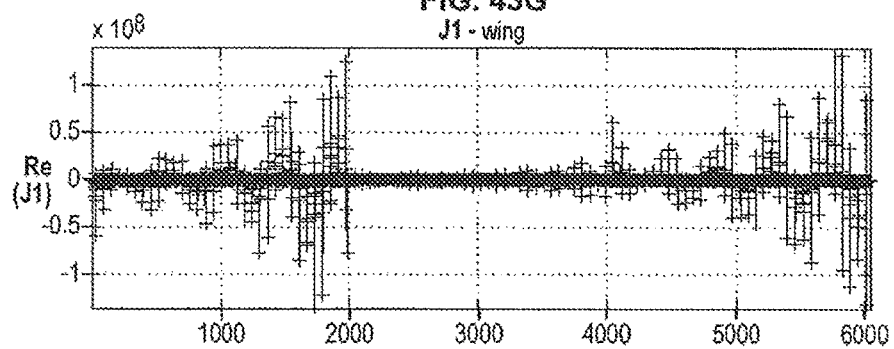
Figure 43H:
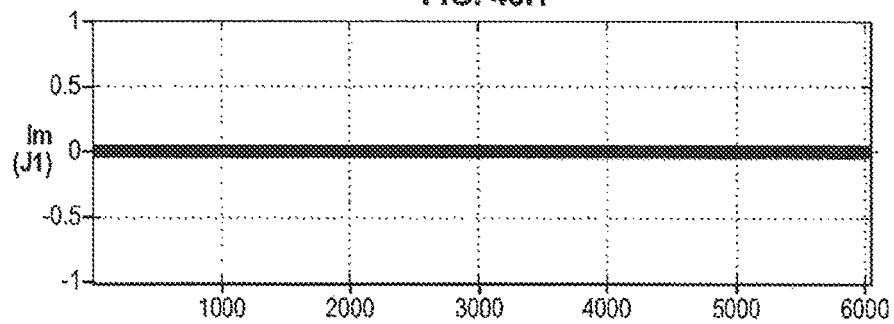

In FIGS. 41B, 45B, the color black or dark grey corresponds to a value situated in the bottom of the grayscale represented on the right.

In the other figures, Vy1, Vy2, Vy3, Vy4, Vy5 designate the ranges of values of the velocity Vy, indicated in the grayscale represented on the right.

For example: this embodiment can proceed as follows:
Step 1 (first iteration): the matrix is generated for a scalar source S100. (source: 1)

Boundary conditions CL1: velocity on A=wind tunnel velocity,
normal velocity on B=0.

The calculation gives a tangential velocity on B

Step 2 (second iteration): boundary conditions are superimposed (need for new sources S200 in place of the sources S100), Boundary conditions CL2: Velocity on A zero
Velocity on B opposite to the velocity calculated in the step 1 previously.

By summing the two steps, the following is obtained

Velocity=Velocity$_{Step1}$+Velocity$_{Step2}$ $\vec{V}_A = \vec{V}_{AStep1} + \vec{V}_{AStep2} = \vec{V}_{windtunnel}$ and $\vec{V}_B = V_{BStep1} + \vec{V}_{BStep2} = \vec{0}$ Step 3: New boundary conditions are superimposed on the object (for example: circulation around a profile or object in rotation given here for example), by taking new sources S300.

For example, the matrix M on the first iteration is:

$$\begin{pmatrix} V_B^N = 0 \\ V_0 \end{pmatrix} = \begin{pmatrix} Q_{BB}^N & Q_{BA}^N \\ Q_{AB} & Q_{AA} \end{pmatrix} \begin{pmatrix} \lambda_{1B} \\ \lambda_{1A} \end{pmatrix}$$

of dimension:

$$\begin{pmatrix} n_B \times n_B & n_B \times 3n_A \\ 3n_A \times n_B & 3n_A \times 3n_A \end{pmatrix} = (n_B + 3n_A) \times (n_B + 3n_A)$$

For example, the matrix M on the second iteration is:

$$\begin{pmatrix} V_B^T = -V_{Bstep1}^T \\ V_A = 0 \end{pmatrix} = \begin{pmatrix} Q_{BB2}^T & Q_{BA}^T \\ Q_{AB2} & Q_{AA} \end{pmatrix} \begin{pmatrix} \lambda_{2B} \\ \lambda_{2A} \end{pmatrix}$$

of dimension:

$$\begin{pmatrix} 3n_B \times 3n_B & 3n_B \times 3n_A \\ 3n_A \times 3n_B & 3n_A \times 3n_A \end{pmatrix} = (3n_B + 3n_A) \times (3n_B + 3n_A)$$

For example, the matrix M on the third iteration is:

$$\begin{pmatrix} V_B = V_{rotation} \\ V_A = 0 \end{pmatrix} = \begin{pmatrix} Q_{BB3} & Q_{BA} \\ Q_{AB3} & Q_{AA} \end{pmatrix} \begin{pmatrix} \lambda_{3B} \\ \lambda_{3A} \end{pmatrix}$$

of dimension:

$$\begin{pmatrix} 3n_B \times 3n_B & 3n_B \times 3n_A \\ 3n_A \times 3n_B & 3n_A \times 3n_A \end{pmatrix} = (3n_B + 3n_A) \times (3n_B + 3n_A)$$

By adding together the iterations, the velocity at a point M is:

$$V_M = (Q_{MB1} \quad Q_{MA}) \begin{pmatrix} \lambda_{1B} \\ \lambda_{1A} \end{pmatrix} + (Q_{MB2} \quad Q_{MA}) \begin{pmatrix} \lambda_{2B} \\ \lambda_{2A} \end{pmatrix} + (Q_{MB3} \quad Q_{MA}) \begin{pmatrix} \lambda_{3B} \\ \lambda_{3A} \end{pmatrix}$$

According to an embodiment in the cases 6 and 7, the resolution is performed by at least two or more successive iterations. For example, the problem is solved with scalar sources in the first iteration, then rotational sources are added in the second iteration to satisfy, if necessary, the case of a rotational fluid. One example is that of a sphere in a flow, which can be modeled in DPSM by scalar sources.

Figure 55A:
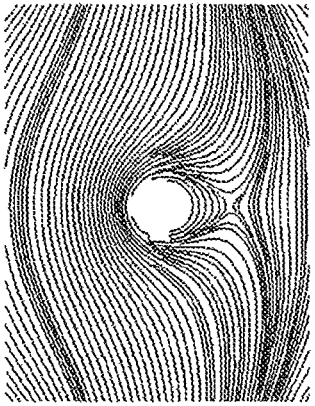
Figure 55B:
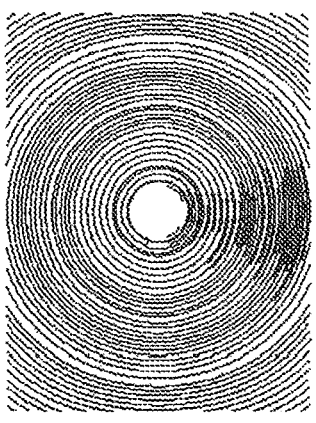
Figure 55C:
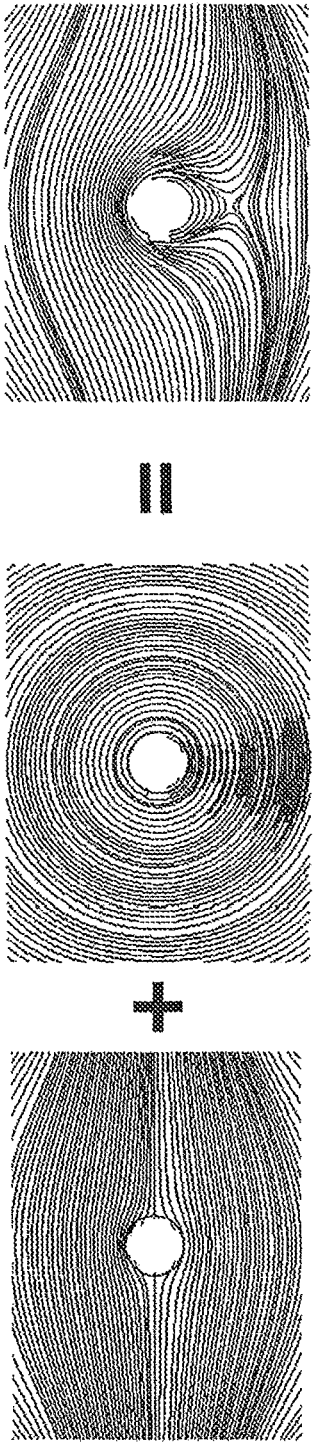

However, if this sphere is in rotation (Magnus effect), a rotational source (vortex) must be added to the preceding solution. For a cylinder in rotation, that gives the second value represented by way of example in FIG. 55B, the first value obtained by scalar sources being represented by way of example in FIG. 55A, to give, by the addition of the first and second values, the velocity of the fluid according to FIG. 55C (the boundary conditions being those mentioned above in the example 1). Each of the embodiments and variants of the cases 6 and 7 is for example combined with the abovementioned first underlying embodiment (source S and/or S' situated below the impermeable surface SUR of the solid of the interface I and/or I' and on the other side of the fluid flow F), which is the case hereinbelow. The interface I is for example an object B. The interface I' is for example an abovementioned object A or E. C designates the surface SCL.

Case 8

Figure 29:
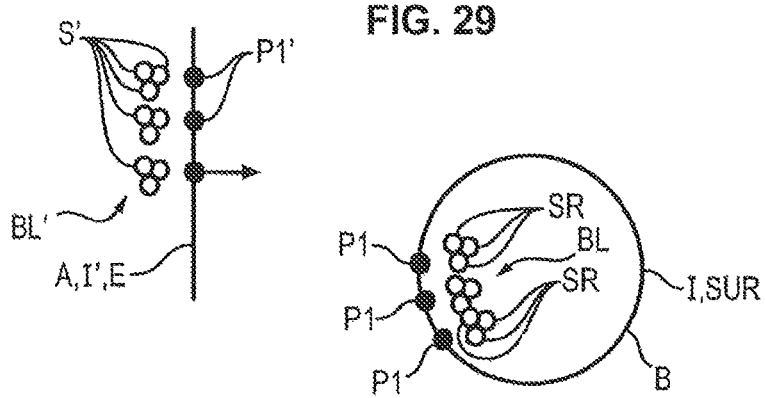

According to an embodiment, represented in FIG. 29, there are provided, as source of fluid, at least one rotational source SR of fluid in association with each first test point P1, for the boundary conditions L having a normal fluid velocity component at the first test point P1, which is zero at the interface I, and a tangential fluid velocity component at the first test point P1, which is prescribed.

In this embodiment, there can be provided a single rotational source SR of fluid in association with each first test point P1 of the interface I or two rotational sources SR of fluid in association with each first test point P1 of the interface I or three rotational sources SR of fluid in association with each first test point P1 of the interface I. This embodiment therefore provides one, two or three rotational sources SR per group BL. The interface I is for example an object B. Each of the embodiments and variants of the case 8 is, for example, combined with the abovementioned first underlying embodiment (source SR and/or S' situated below the impermeable surface SUR of the solid of the interface I and/or I' and on the other side of the fluid flow F), which is the case hereinbelow. The interface I is for example an object B. The interface I' is for example an abovementioned object A or E. C designates the surface SCL.

This case is for example used for a high Reynolds number in rotational fluid. This case applies for example to boundary conditions introducing or requiring vorticity (object in motion, in rotation, or in any flow). The geometries dealt with are identical to the preceding cases.

As a variant of this embodiment there are provided, as source of fluid:

at least one rotational source SR of fluid associated with each first test point P1 of a first interface I, for the boundary conditions L having a normal fluid velocity component at the first test point P1, which is zero at the interface I, and a tangential fluid velocity component at the first test point P1, which is prescribed, at least one scalar source S' of mass flow rate of fluid associated with each first test point P1' of a second interface I' distinct from the first interface I. There could be provided, as variants, a single rotational source SR of mass flow rate of fluid associated with each first test point P1 of a first interface I, or two rotational sources SR of fluid associated with each first test point P1 of a first interface I or three rotational sources SR of fluid associated with each first test point P1 of a first interface I, with a single scalar source S' of mass flow rate of fluid associated with each first test point P1' of a second interface I' or two scalar sources S' of mass flow rate of fluid associated with each first test point P1' of a second interface I' or three scalar sources S' of mass flow rate of fluid associated with each first test point P1'.

This case 8 is described hereinbelow for three rotational sources SR of fluid in association with each first test point P1 of the interface I with three scalar sources S' of mass flow rate of fluid associated with each first test point P1'.

The coupling matrix between the test points $P5=Pi$ of A and the sources $S'=Sj$ of B is expressed $$\begin{pmatrix} 0 & \frac{-(z_i - z_j)}{4\pi\rho R_{ij}} & \frac{(y_i - y_j)}{4\pi\rho R_{ij}} \\ \frac{(z_i - z_j)}{4\pi\rho R_{ij}} & 0 & \frac{-(x_i - x_j)}{4\pi\rho R_{ij}} \\ \frac{-(y_i - y_j)}{4\pi\rho R_{ij}} & \frac{(x_i - x_j)}{4\pi\rho R_{ij}} & 0 \end{pmatrix} \cdot \begin{pmatrix} \lambda_x \\ \lambda_y \\ \lambda_z \end{pmatrix} = t_{ij} \cdot \begin{pmatrix} \lambda_x \\ \lambda_y \\ \lambda_z \end{pmatrix}$$

with $T_{BA} = (t_{ij})_{1 \le i \le n_p, 1 \le j \le n_s}$

The global resolution matrix M comprising this coupling matrix is:

$$\begin{pmatrix} V_0 \\ V_B^N = 0 \end{pmatrix} = \begin{pmatrix} Q_{AA} & T_{AB} \\ Q_{BA} & T_{BB} \end{pmatrix} \cdot \begin{pmatrix} \lambda_A \\ \lambda_B \end{pmatrix}$$

This case 8, and the cases 9 and 10 hereinbelow, make it possible to model a perfect fluid but with zero boundary conditions at the surface SUR of the interface I, that can be, for example, an airplane wing.

Cases 9 and 10

According to an embodiment, there are provided, as source of fluid, at least one scalar source S of mass flow rate of fluid and at least one rotational source SR of fluid in association with each first test point P1, for the boundary condition L having at least a normal fluid velocity component at the first test point P1, which is zero at the interface I, and a tangential fluid velocity component at the first test point P1, which is prescribed.

Figure 30:
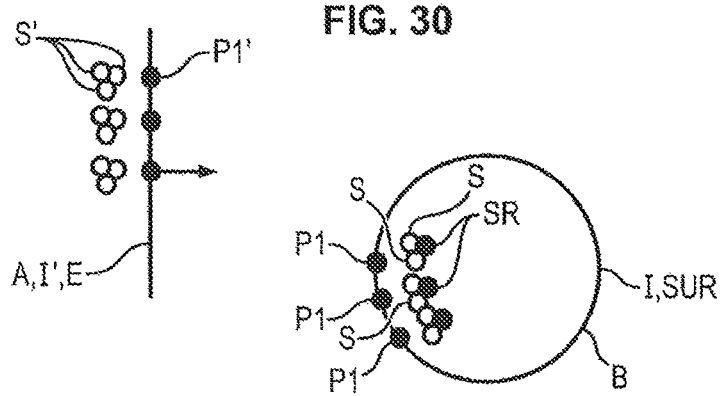

FIG. 30 is an illustration of this embodiment. This embodiment is said to be hybrid or with hybrid sources S, SR. The interface I is, for example, an object B. Each of the embodiments and variants of the cases 9 and 10 is, for example, combined with the above-mentioned first underlying embodiment (source S, SR situated below the impermeable surface SUR of the solid of the interface I and on the other side of the fluid flow F and/or source S' situated below the interface I' and on the other side of the fluid flow F), which is the case hereinbelow. The interface I is, for example, an object B. The interface I' is, for example, an abovementioned object A or E. In this embodiment, there can be provided just one, two or three scalar sources S of mass flow rate of fluid and just one, two or three rotational sources SR of fluid in association with each first test point P1.

There can also be provided, in this embodiment, at least one (for example just one, or two or three) scalar source S' of mass flow rate of fluid associated with each first test point P1' of a second interface I' distinct from the first interface I.

Case 9

According to an embodiment, there can be provided, as source of fluid, a scalar source S of mass flow rate of fluid and two rotational sources SR of fluid in association with each first test point P1, for the boundary conditions L having a normal fluid velocity component at the first test point P1, which is zero at the interface I, and a tangential fluid velocity component at the first test point P1, which is prescribed.

This case 9 is described hereinbelow for three scalar sources S' of mass flow rate of fluid associated with each first test point P1' of a second interface I' distinct from the first interface I.

For example, the coupling matrix between the test points P1=Pi of A and the sources S'=Sj of B is expressed:

$$\begin{pmatrix} \frac{x_i - x_j}{4\pi\rho R_{ij}^3} & 0 & 0 \\ 0 & \frac{y_i - y_j}{4\pi\rho R_{ij}^3} & 0 \\ 0 & 0 & \frac{z_i - z_j}{4\pi\rho R_{ij}^3} \end{pmatrix} \cdot \begin{pmatrix} \lambda \\ \lambda \\ \lambda \end{pmatrix} =$$

$$\begin{pmatrix} 0 & -\frac{z_i - z_j}{4\pi\rho R_{ij}^3} & \frac{y_i - y_j}{4\pi\rho R_{ij}^3} \\ \frac{z_i - z_j}{4\pi\rho R_{ij}^3} & 0 & -\frac{x_i - x_j}{4\pi\rho R_{ij}^3} \\ -\frac{y_i - y_j}{4\pi\rho R_{ij}^3} & \frac{x_i - x_j}{4\pi\rho R_{ij}^3} & 0 \end{pmatrix} \cdot \begin{pmatrix} \lambda_x \\ \lambda_y \\ \lambda_z \end{pmatrix}$$

For example, the following hybrid coupling matrix $H^3$ is introduced, which is, with two rotational sources Jx and Jy and one scalar source:

$$\frac{1}{4\pi\rho} \begin{pmatrix} 0 & \frac{z_i - z_j}{R_{ij}^3} & \frac{x_i - x_j}{R_{ij}^3} \\ -\frac{z_i - z_j}{R_{ij}^3} & 0 & \frac{y_i - y_j}{R_{ij}^3} \\ \frac{y_i - y_j}{R_{ij}^3} & -\frac{x_i - x_j}{R_{ij}^3} & \frac{z_i - z_j}{R_{ij}^3} \end{pmatrix} \cdot \begin{pmatrix} \lambda_x \\ \lambda_y \\ \lambda \end{pmatrix} = H_{ij}^3 \cdot \begin{pmatrix} \lambda_x \\ \lambda_y \\ \lambda \end{pmatrix}$$

The global resolution matrix M, comprising the coupling matrix, is:

$$\begin{pmatrix} V_0 \\ V_B^N = 0 \end{pmatrix} = \begin{pmatrix} Q_{AA} & H_{AB}^3 \\ Q_{BA} & H_{BB}^3 \end{pmatrix} \cdot \begin{pmatrix} \lambda_A \\ \lambda_B \end{pmatrix}$$

of dimension: dim=$(3n_A+3n_B) \times (3n_A+3n_B)$

This embodiment is for example for a fluid that is incompressible and non-viscous (high Reynolds number) with the vorticity taken into account in a single resolution phase. Examples are: object or cylinder in rotation in a flow with ground effect, and possibly wind gradient to illustrate the fact that the method allows complex boundary conditions at each of the points of the surface of the objects.

Figure 1A:
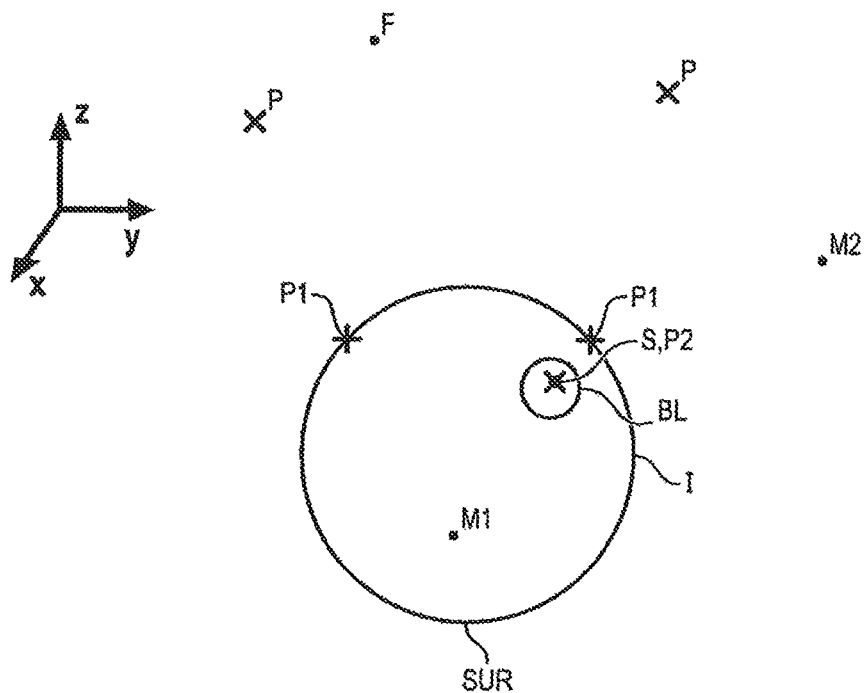
Figure 1B:
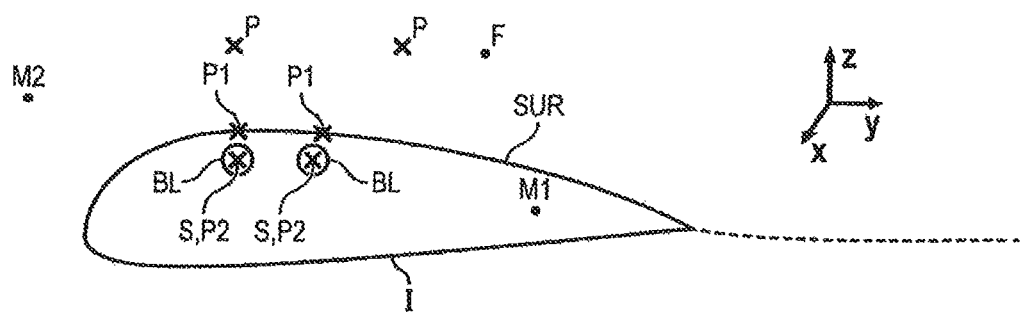
Figure 2:
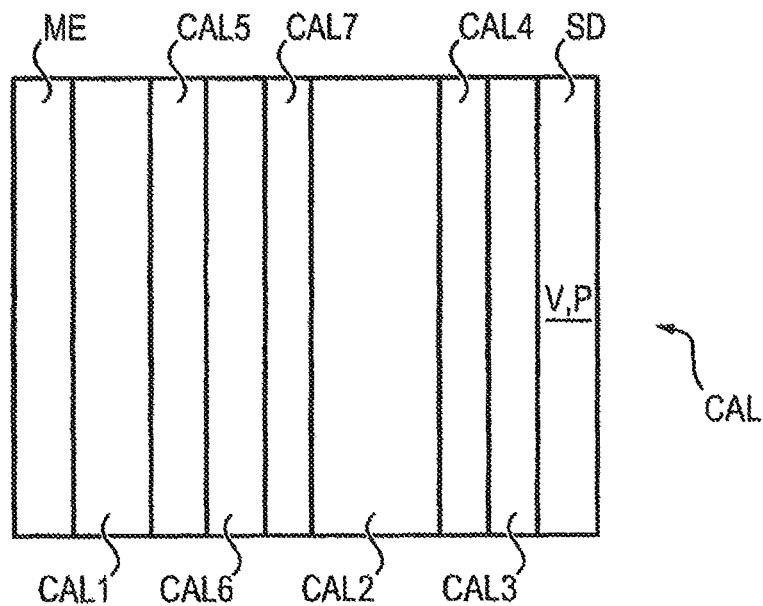
Figure 3:
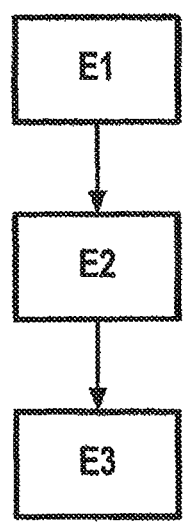
Figure 4A:
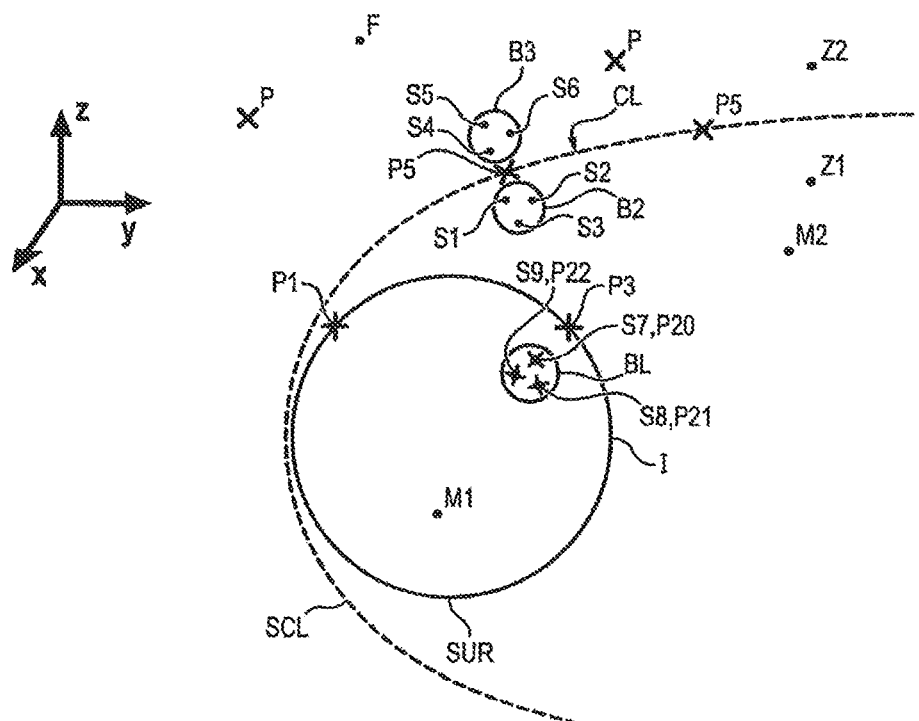
Figure 4B:
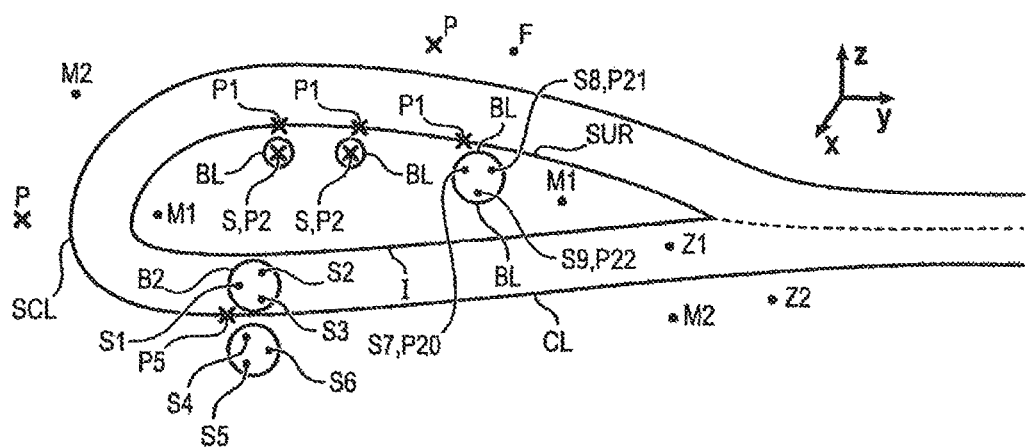
Figure 5A:
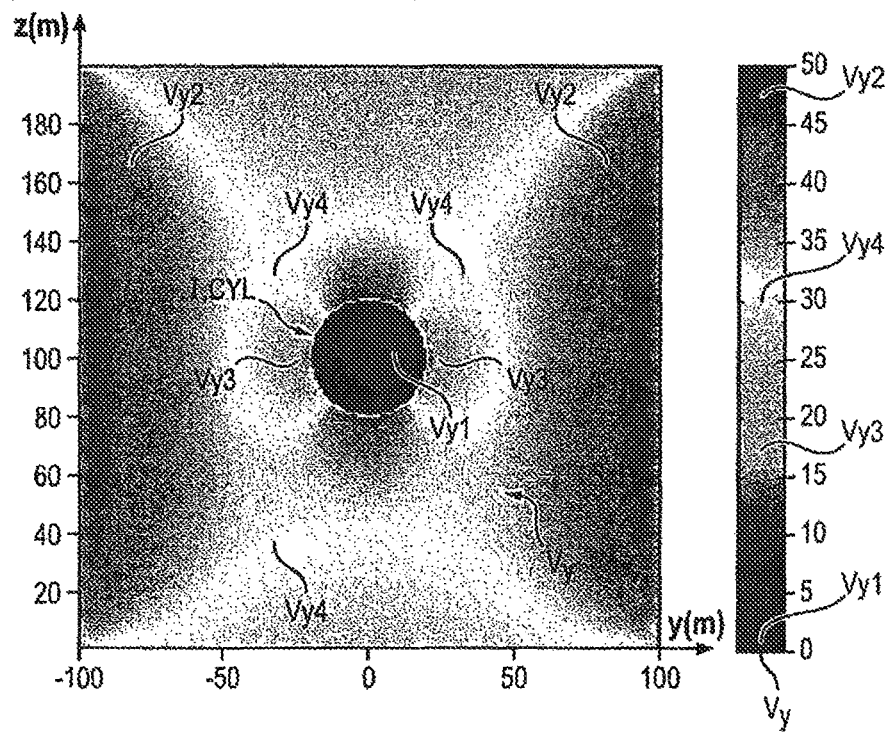
Figure 5B:
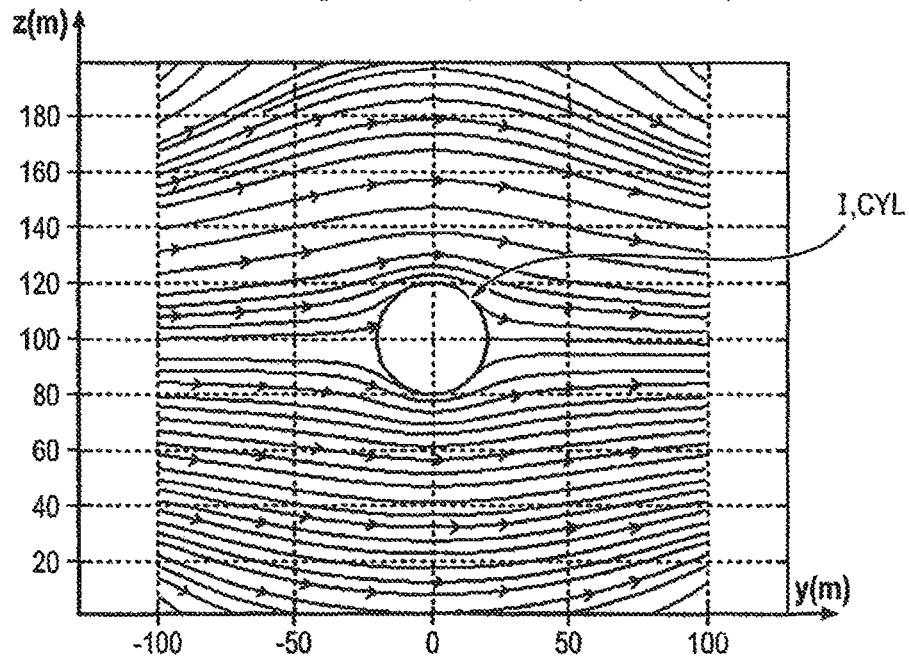
Figure 6A:
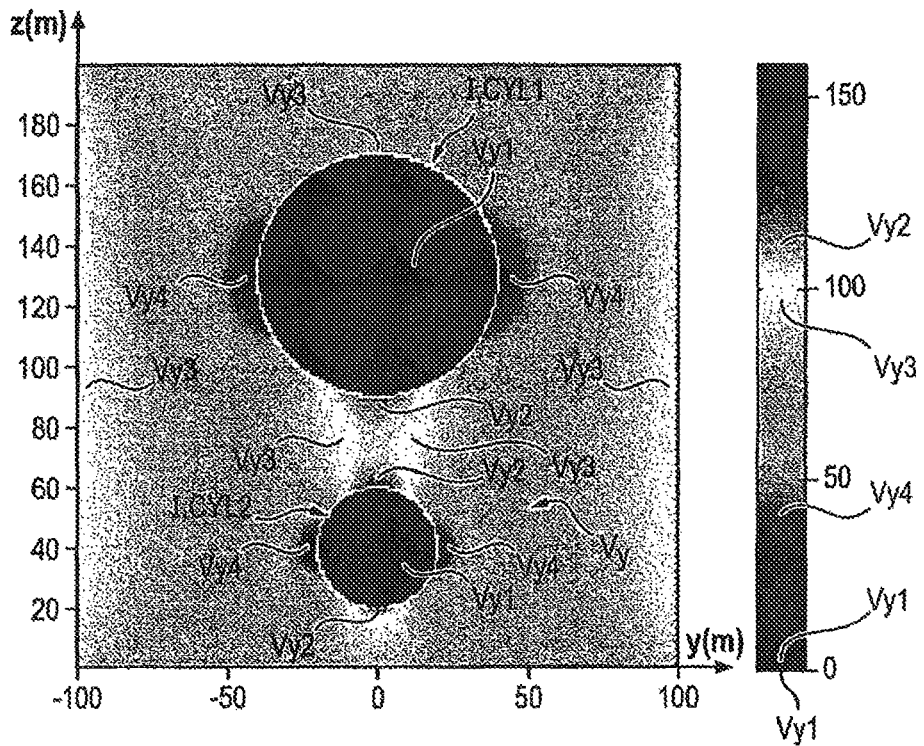
Figure 6B:
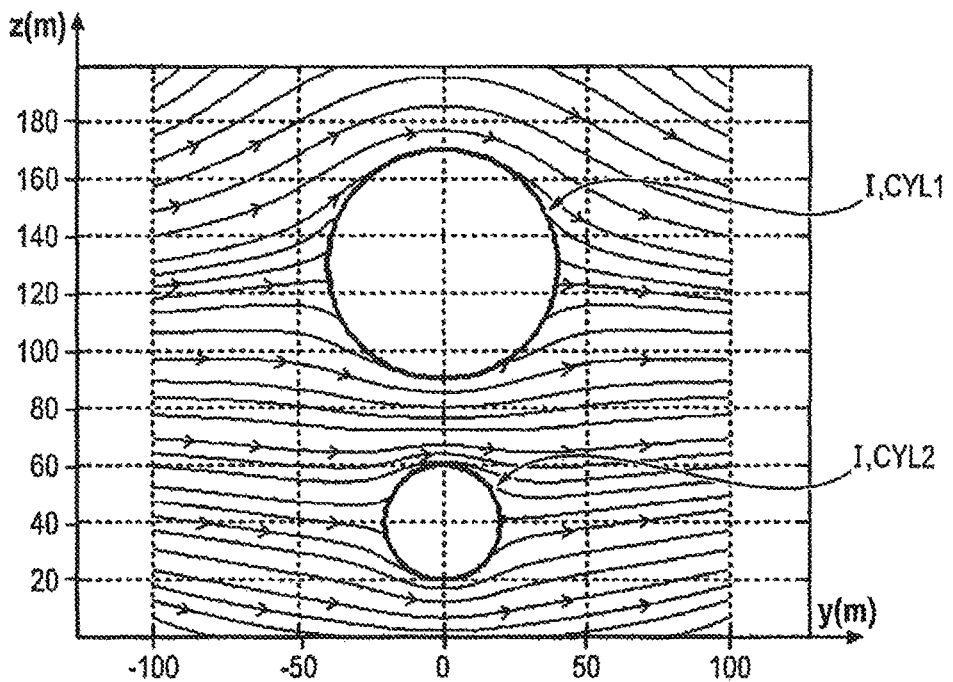
Figure 7A:
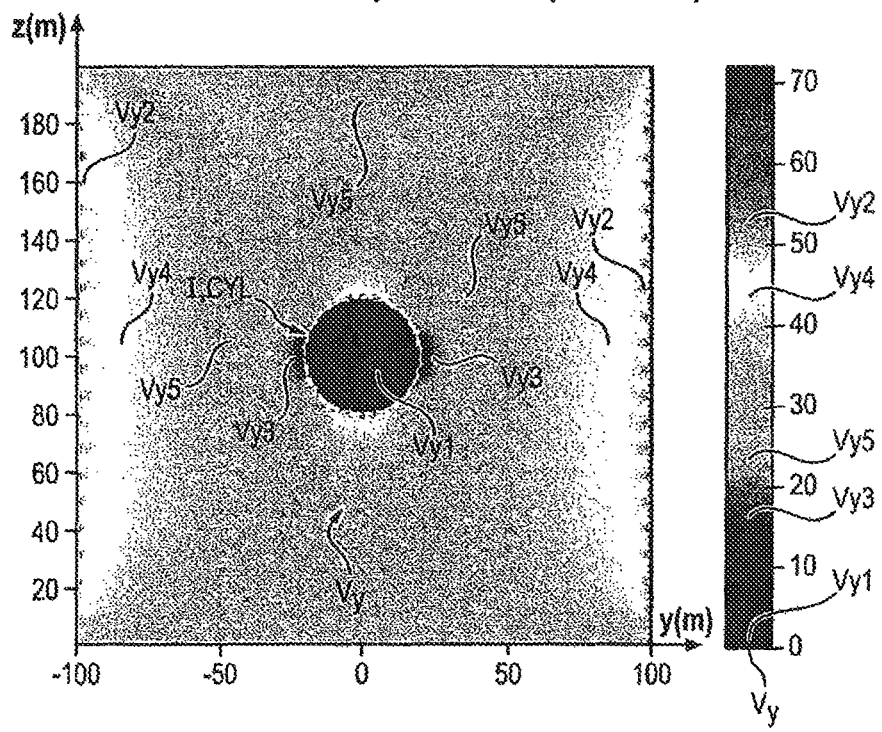
Figure 7B:
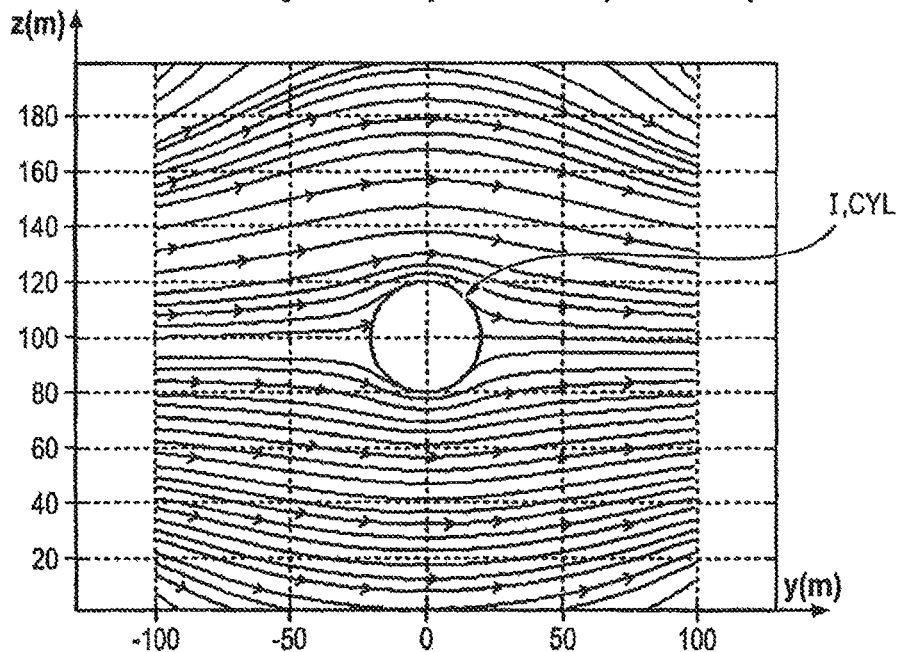
Figure 11A:
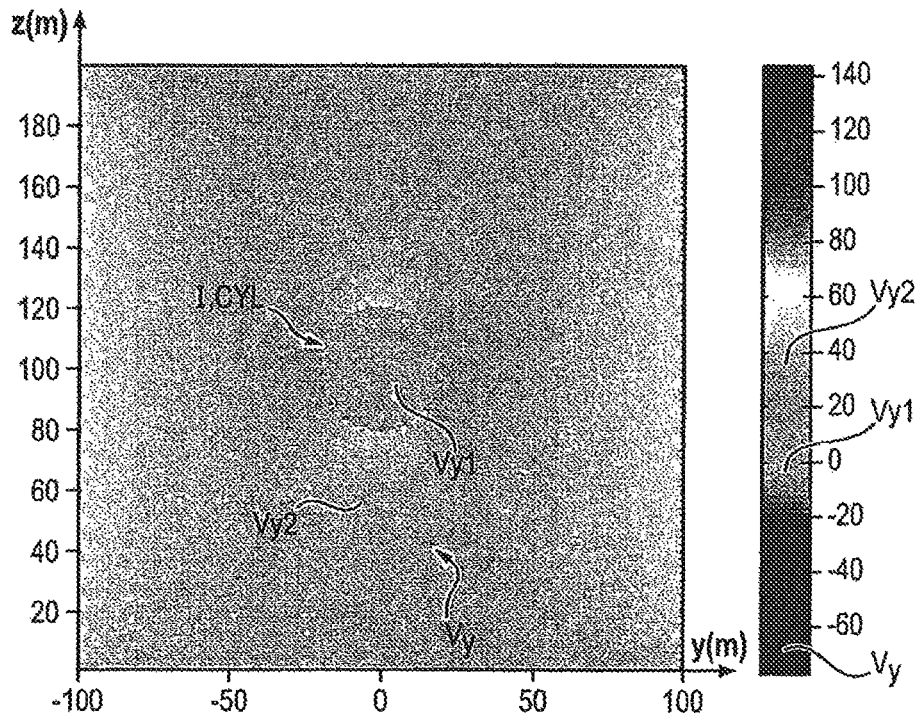
Figure 11B:
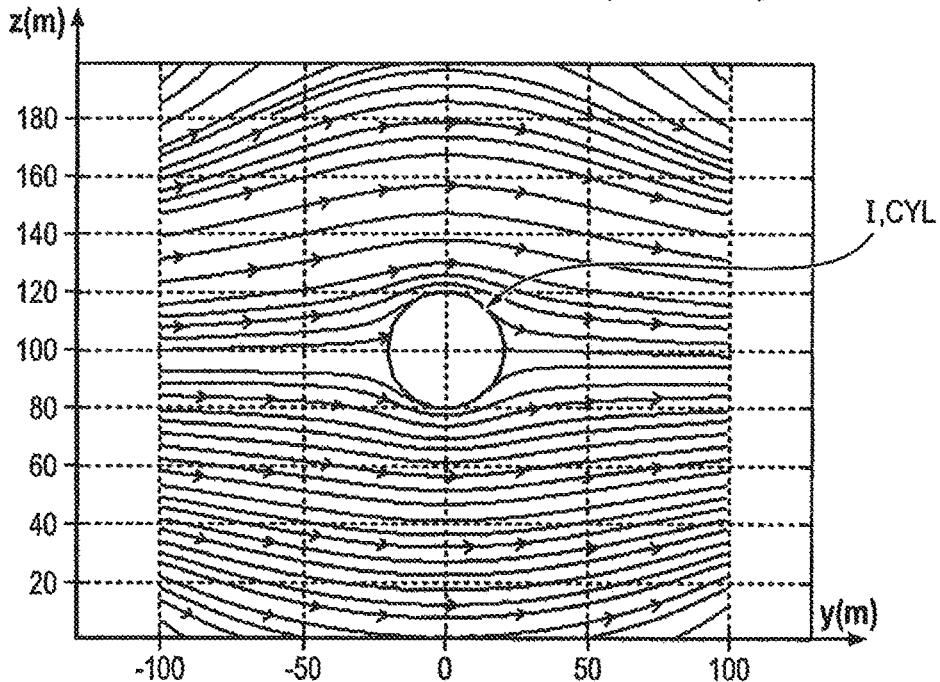
Figure 12A:
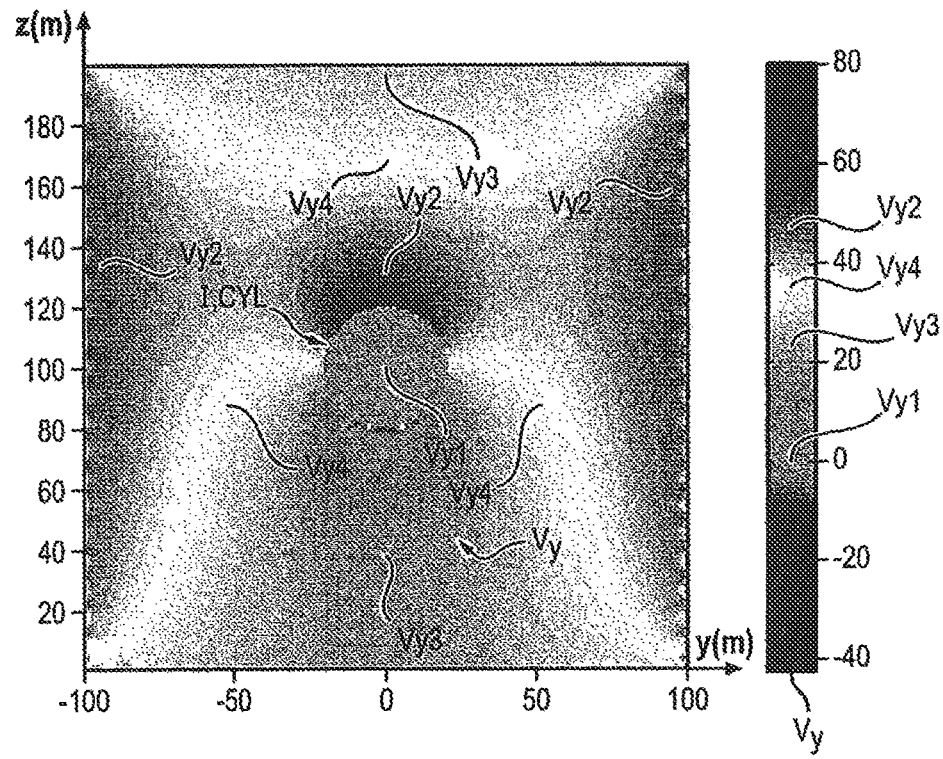
Figure 12B:
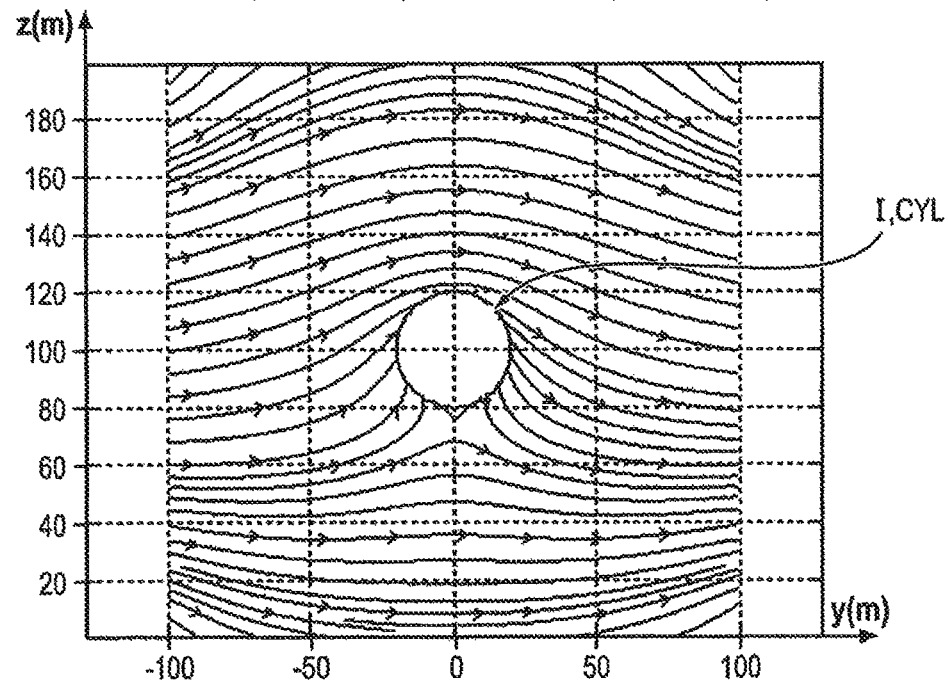
Figure 12C:
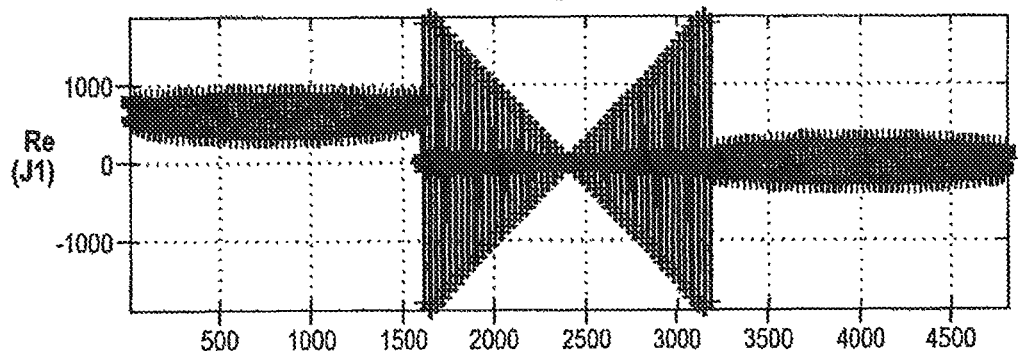
Figure 12D:
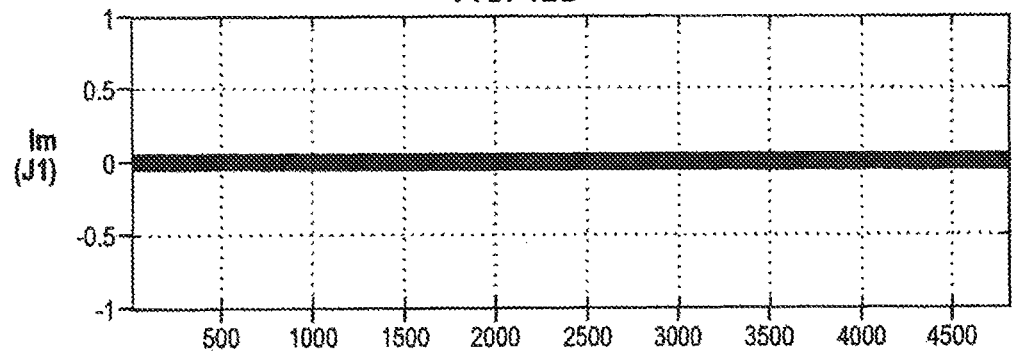
Figure 12E:
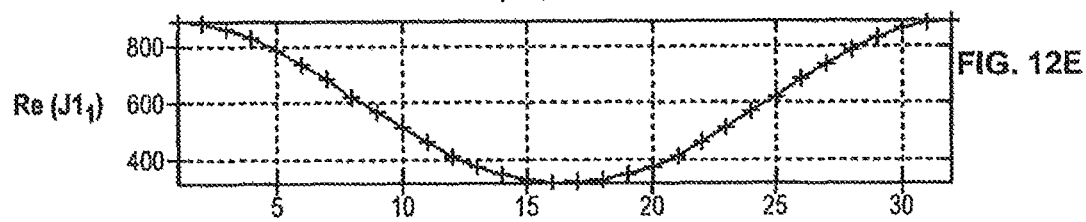
Figure 12F:
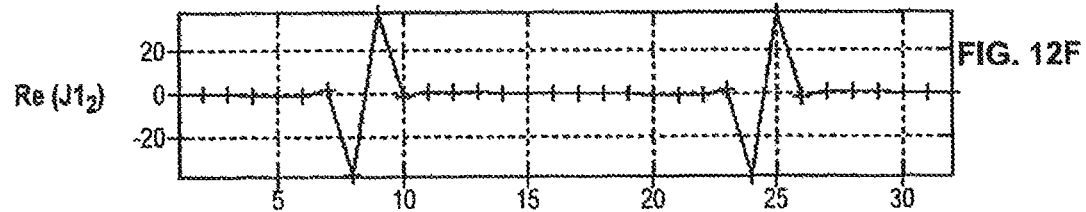
Figure 12G:
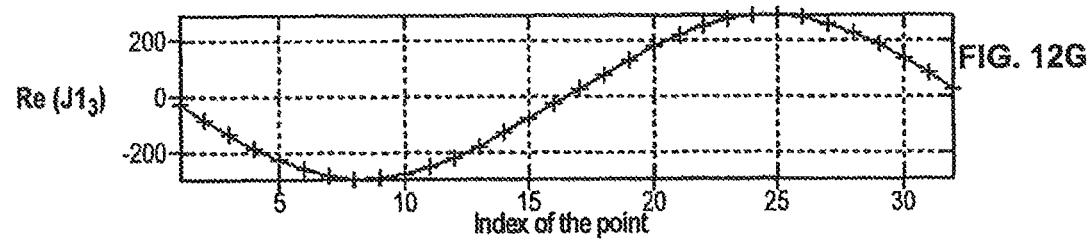

In this embodiment, FIG. 12A represents the absolute value of the component $V_y$ of the velocity of the fluid flow having been calculated according to the axis y and FIG. 12B represents current lines of this fluid flow, having been calculated, and does so for a solid interface I, formed by a cylinder CYL in rotation in the clockwise direction about an axis parallel to the direction x, where the boundary conditions provide for the tangential component of the velocity vector of the fluid flow to be equal to a prescribed value of the wind (for example, here, 100 m·s$^{-1}$) on the cylinder. The cylinder or cylinders are obstacles in the fluid flow of a wind tunnel. That makes it possible to model the ground effect and the effects coupled with the cylinder. FIGS. 12C to 12G represent the sources (FIGS. 12C and 12D: rotational sources represented as a line vector approximately 3×1600 according to X and Y; FIGS. 12E, 12F, 12G: scalar sources according to one slice of the cylinder beginning at the top, where the x axis is the index of the point in the point meshing on the corresponding object and the y axis is the flow from the source; the dense clouds of FIGS. 12C and 12D represent the same condensed curves of FIGS. 12E, 12F, 12G).

Figure 13A:
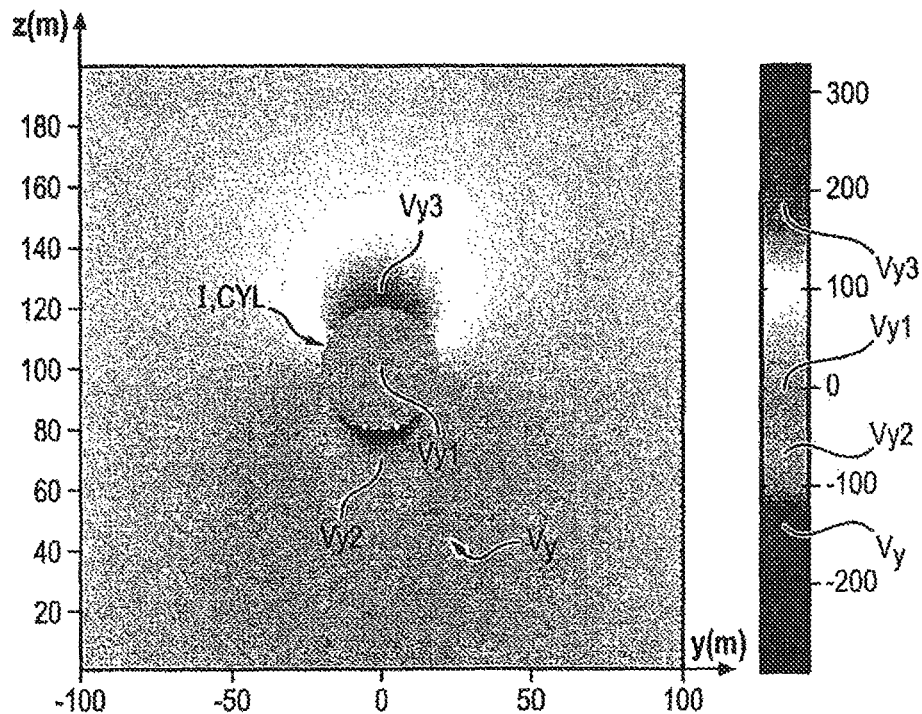
Figure 13B:
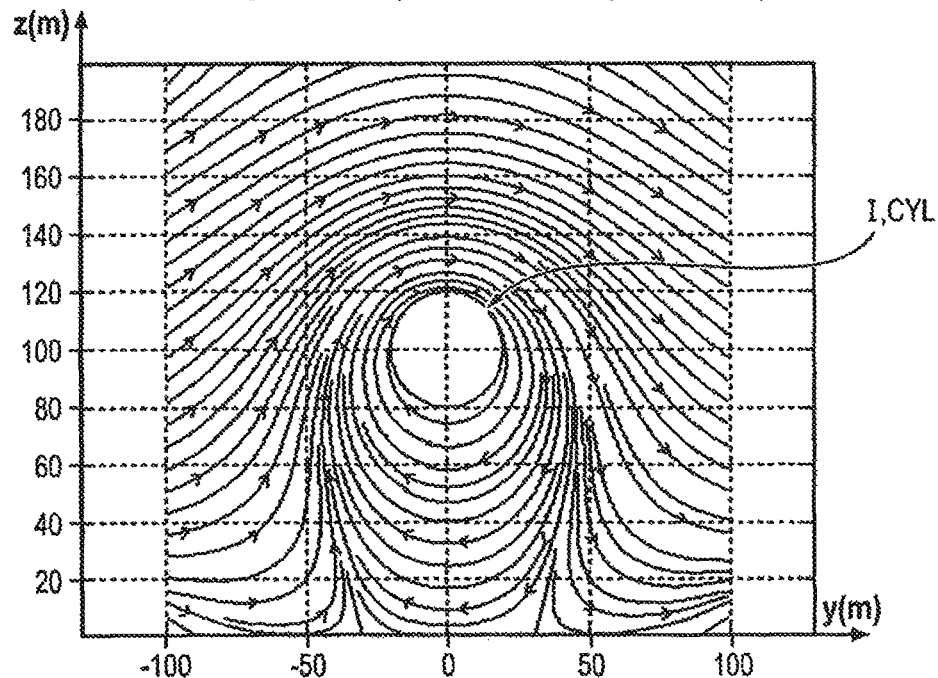

In this embodiment, FIG. 13A represents the absolute value of the component $V_y$ of the velocity of the fluid flow having been calculated according to the axis y and FIG. 13B represents current lines of this fluid flow, having been calculated, and does so for a solid interface I, formed by a cylinder CYL in rotation in the clockwise direction about an axis parallel to the direction x, where the boundary conditions provide for the tangential component of the velocity vector of the fluid flow to be equal to five times a prescribed wind value (this prescribed wind value being, for example here, 100 m·s$^{-1}$) on the cylinder.

Figure 14A:
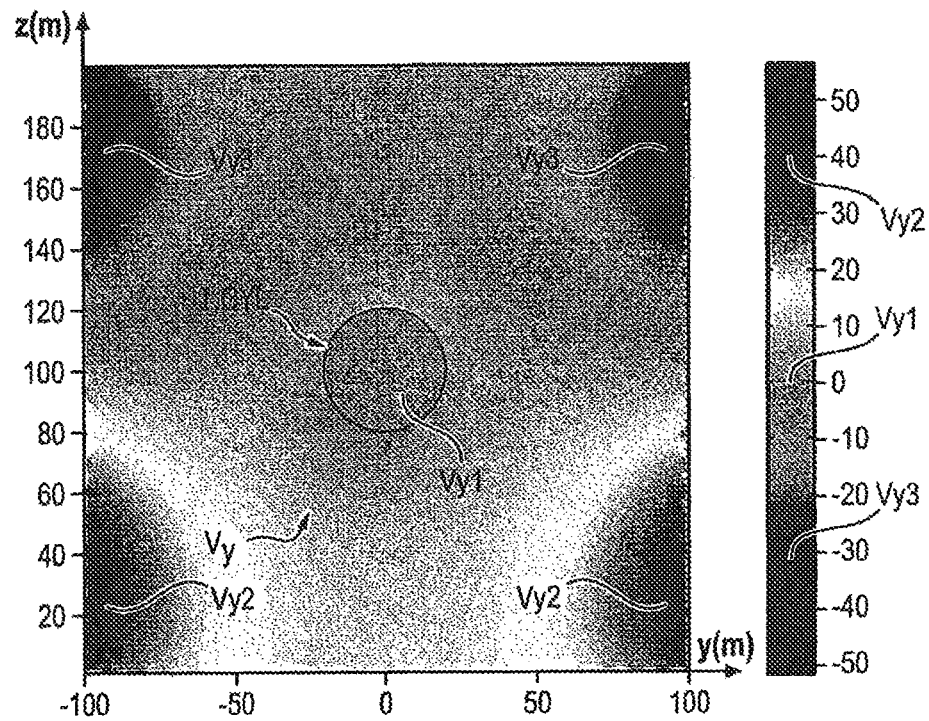
Figure 14B:
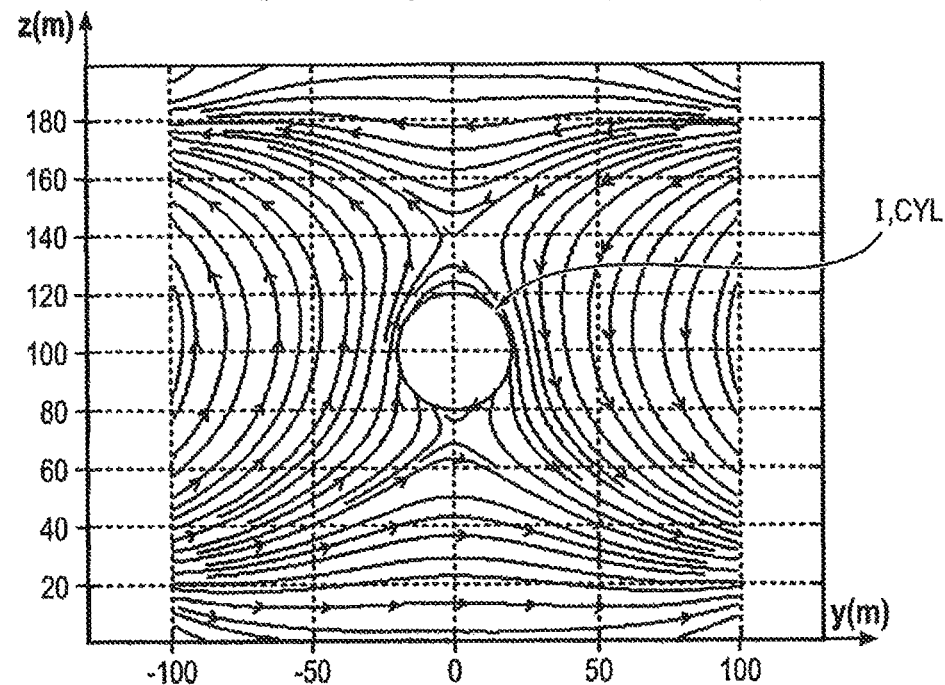

In this embodiment, FIG. 14A represents the absolute value of the component $V_y$ of the velocity of the fluid flow having been calculated according to the axis y and FIG. 14B represents current lines of this fluid flow, having been calculated, and does so for a solid interface I, formed by a cylinder CYL in rotation in the clockwise direction about an axis parallel to the direction x with a wind gradient, where the boundary conditions provide for the tangential component of the velocity vector of the fluid flow to be equal to a quarter of a prescribed wind value (this prescribed wind value being, for example here, 100 m·s$^{-1}$) on the cylinder.

Case 10

According to an embodiment, there are provided, as fluid source, a scalar source S of mass flow rate of fluid and three rotational sources SR of fluid in association with each first test point P1, for the boundary condition L having, at the first test point P1 of the interface I, a normal fluid velocity component and a tangential fluid velocity component, which are zero at the interface I, and a zero normal velocity component of another prescribed test point P5 of a surface SCL delimiting a boundary layer CL of the fluid flow relative to the interface I. This embodiment is described hereinbelow for three scalar sources S' of mass flow rate of fluid associated with each first test point P1' of a second interface I' distinct from the first interface I.

Figure 31:
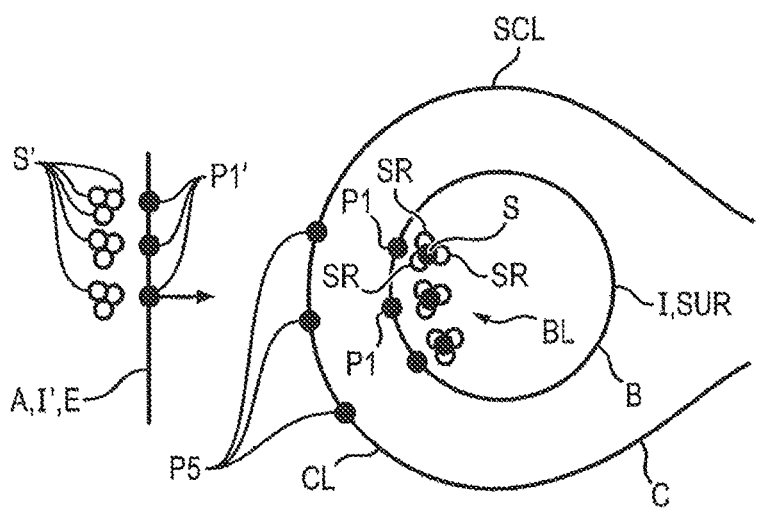

This embodiment is illustrated in FIG. 31.

For example, this embodiment has layered boundary conditions at the surface SCL.

For example, the global resolution matrix M comprises, for example, the matrix $H^4$ hereinbelow:

$$\begin{pmatrix} 0 & \frac{z_i - z_j}{4\pi\rho R_{ij}^3} & \frac{y_i - y_j}{4\pi\rho R_{ij}^3} & \frac{x_i - x_j}{4\pi\rho R_{ij}^3} \\ -\frac{z_i - z_j}{4\pi\rho R_{ij}^3} & 0 & \frac{x_i - y_j}{4\pi\rho R_{ij}^3} & \frac{y_i - y_j}{4\pi\rho R_{ij}^3} \\ \frac{y_i - y_j}{4\pi\rho R_{ij}^3} & -\frac{x_i - x_j}{4\pi\rho R_{ij}^3} & 0 & \frac{z_i - z_j}{4\pi\rho R_{ij}^3} \end{pmatrix} \cdot \begin{pmatrix} \lambda_x \\ \lambda_y \\ \lambda_z \\ \lambda \end{pmatrix} = H_{ij}^4 \cdot \lambda$$

of dimension: dim=$(3n_A \times 3n_B \; 3n_A \times n_B) = (3n_A \times 4n_B)$

The global resolution matrix M is, for example:

$$\begin{pmatrix} V_0 \\ V_C^N = 0 \\ V_B^N = 0 \end{pmatrix} = \begin{pmatrix} Q_{AA} & H_{AB}^4 \\ Q_{CA} & H_{CB}^4 \\ Q_{BA} & H_{BB}^4 \end{pmatrix} \cdot \begin{pmatrix} \lambda_A \\ \lambda_{Bh} \end{pmatrix}$$

of dimension:

$$\begin{pmatrix} 3n_A \\ n_C = n_B \\ 3n_B \end{pmatrix} = \begin{pmatrix} 3n_A \times 3n_A & 3n_A \times 4n_B \\ n_C \times 3n_A & n_C \times 4n_B \\ 3n_B \times 3n_A & 3n_B \times 4n_B \end{pmatrix} \cdot \begin{pmatrix} 3n_A \\ 4n_B \end{pmatrix}$$

that is to say of dimension dim=$(3n_A+4n_B) \times (3n_A+4n_B)$

One of the variants of the cases 9 and 10 above is illustrated hereinbelow.

This variant provides three scalar sources S of mass flow rate of fluid and one rotational source SR of mass flow rate of fluid in association with each first test point P1, for the boundary conditions L having, at the first test point P1, a normal fluid velocity component and a tangential fluid velocity component, which are zero at interface I, and a zero normal velocity component of a boundary layer CL of the fluid flow F.

Figure 15A:
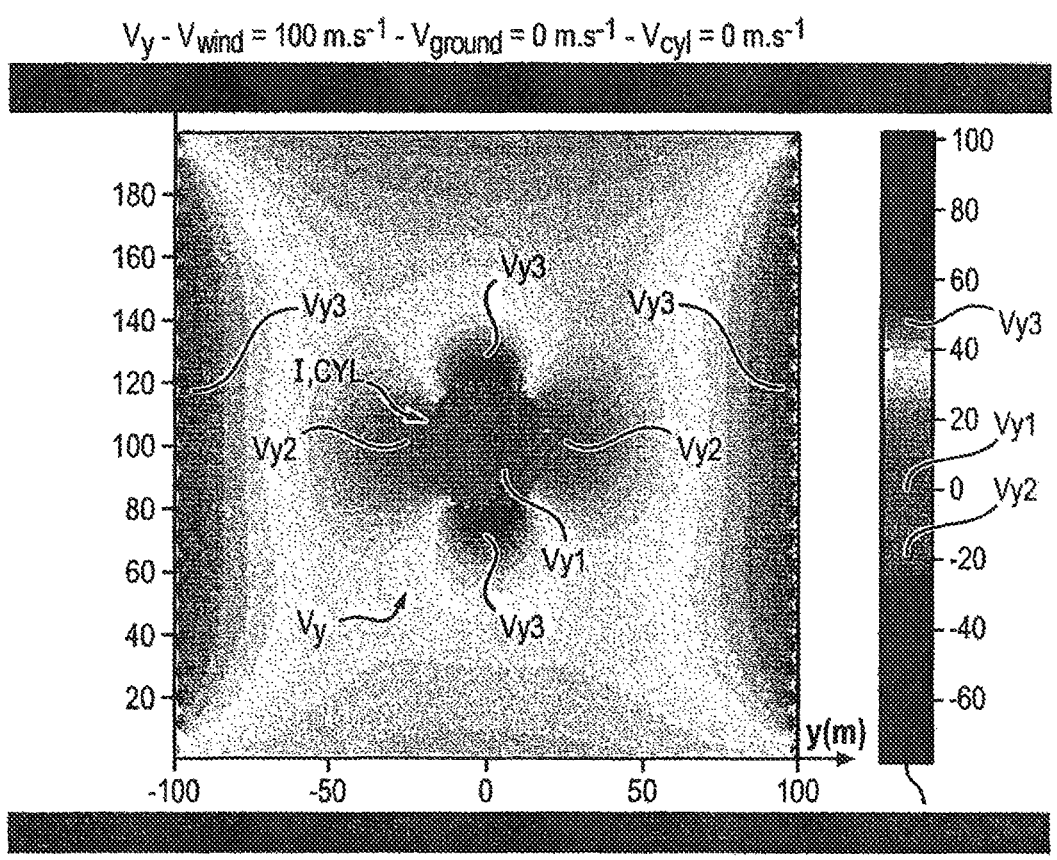
Figure 15B:
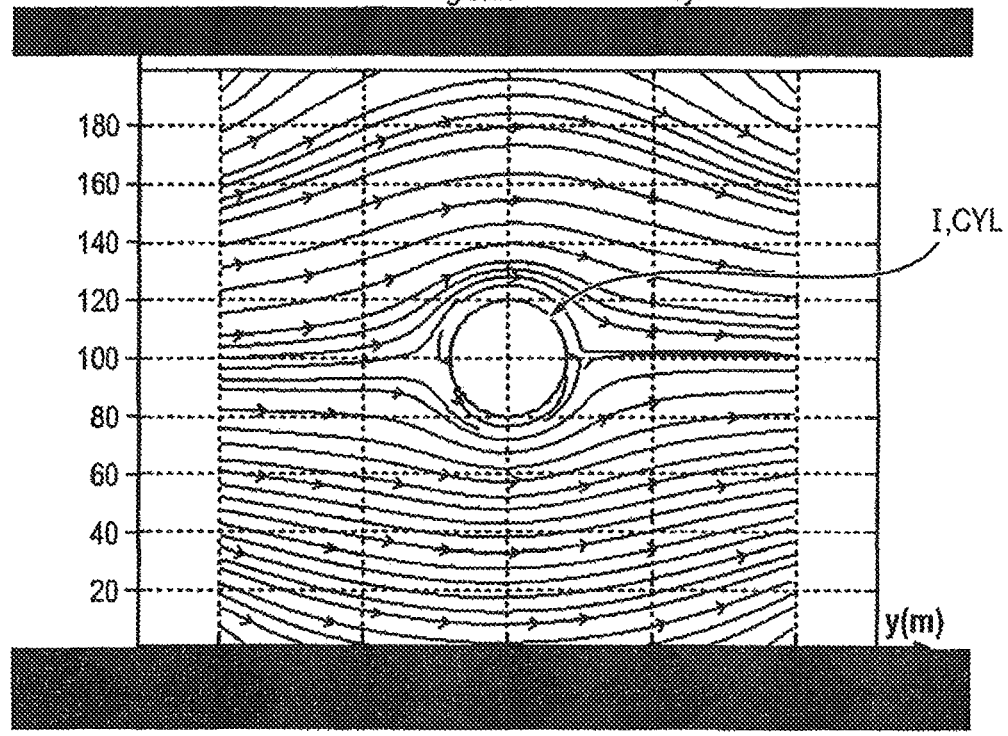
Figure 15C:
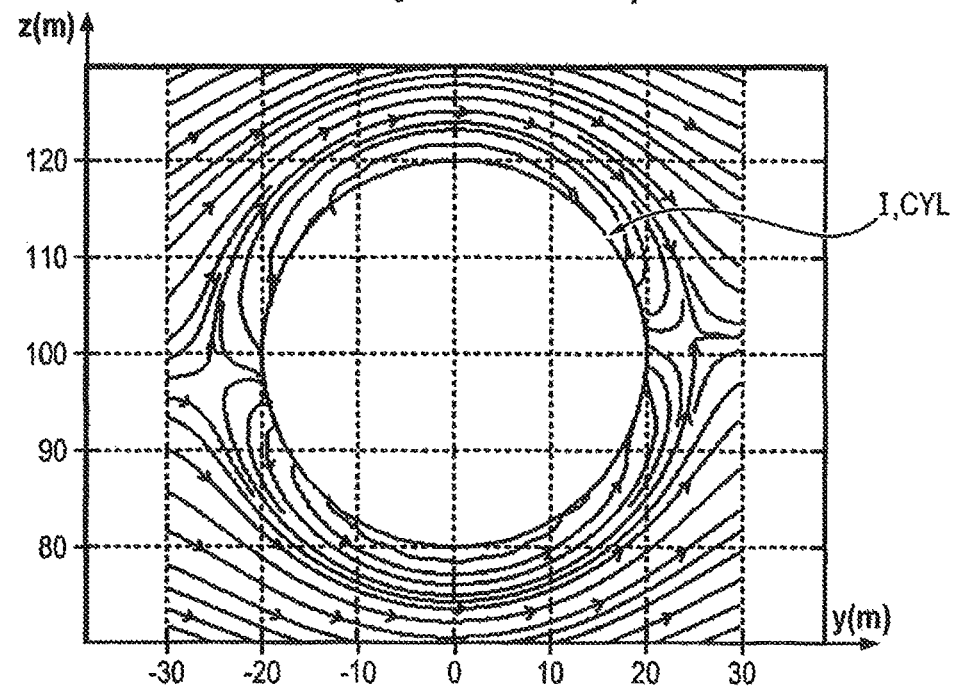
Figure 15D:
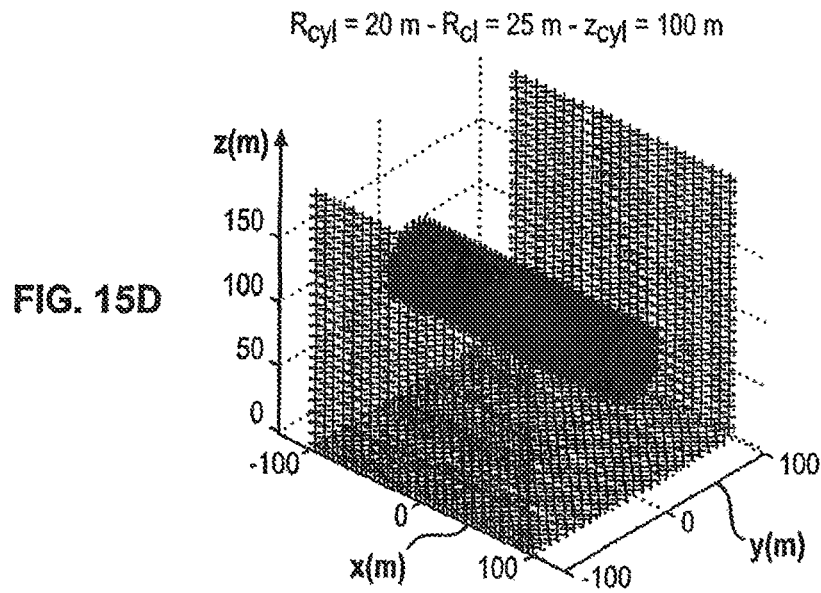
Figure 15E:
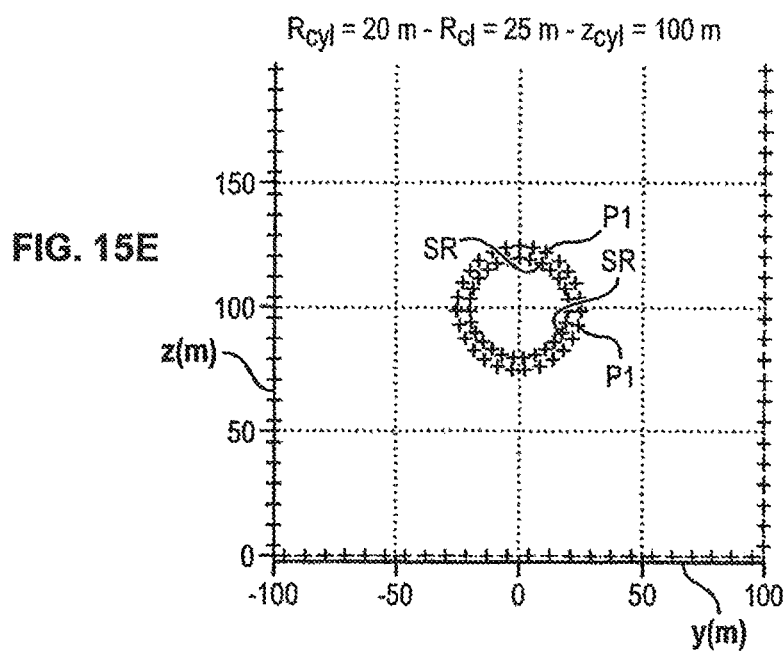
Figure 15F:
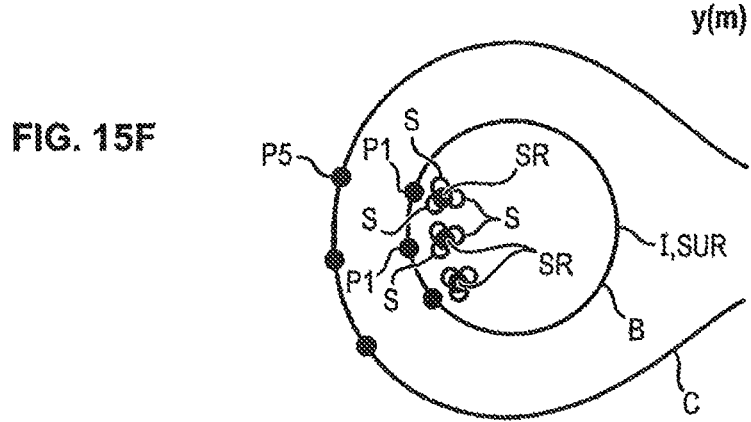

This variant is illustrated in FIG. 15F.

This variant is for example used for a fluid that is incompressible and non-viscous (high Reynolds number), rotational, with boundary conditions L imposed at a known boundary of the boundary layer CL, the topology of which will have been previously established. Examples are: cylinder in a flow with ground effect, and zoom in the vicinity of the walls, to illustrate the fact that the method makes it possible to set complex boundary conditions at each of the points of the surface of the objects and at the boundary of the boundary layer.

FIGS. 15D and 15E represent an example of rotational sources SR associated with the test points P1 of the interface I, for a solid interface I, formed by a cylinder CYL, having an axis parallel to the direction x, the scalar sources being present and not being represented.

In this example, FIG. 15A represents the absolute value of the component $V_y$ of the velocity of the fluid flow having been calculated according to the axis y, and FIGS. 15B and 15C represent current lines of this fluid flow, having been calculated, and does so for the solid interface I, formed by the cylinder CYL having an axis parallel to the direction x, for the boundary conditions L having a normal fluid velocity component and a tangential fluid velocity component, which are zero at the interface I.

In this variant, FIG. 16A illustrates curves R1, R2, R3, R4, R5 of the calculated normal velocity $V_n$ of the fluid flow F of FIGS. 15A, 15B and 15C, and FIG. 16B illustrates curves R6, R7, R8, R9, R10 of the calculated tangential velocity $V_t$ of the fluid flow F of FIGS. 15A, 15B and 15C, as a function of the angle iv about the central axis of the cylinder (parallel to x) on the x axis, on a circle centered on this axis having, respectively, the following radius, for a zero normal velocity and a zero tangential velocity at the test points of the cylinder and a zero normal velocity at the test points of the boundary layer:

R1 and R6: circle of 20 m radius, which is the radius of the cylinder CYL,
R2 and R7: circle of 21.25 m radius,
R3 and R8: circle of 22.5 m radius,
R4 and R9: circle of 23.75 m radius
R5 and R10: circle of 25 m radius.

FIGS. 16C to 16H represent the sources (FIGS. 16C and 16D: rotational sources according to X and Y; FIGS. 12E, 16F, 16G, 16H: scalar sources according to one slice of the cylinder beginning at the top, where the x axis is the index of the point in the point meshing on the corresponding object and the y axis is the flow from the source).

Figure 17A:
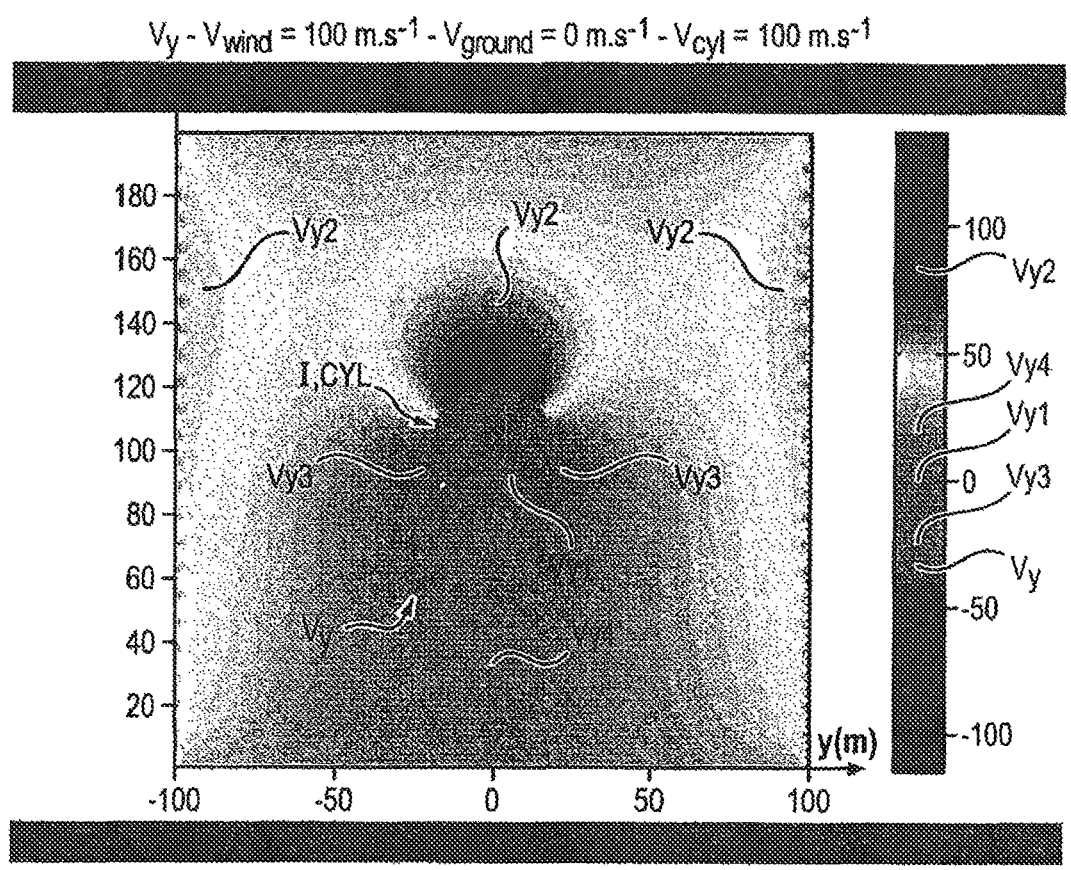
Figure 17B:
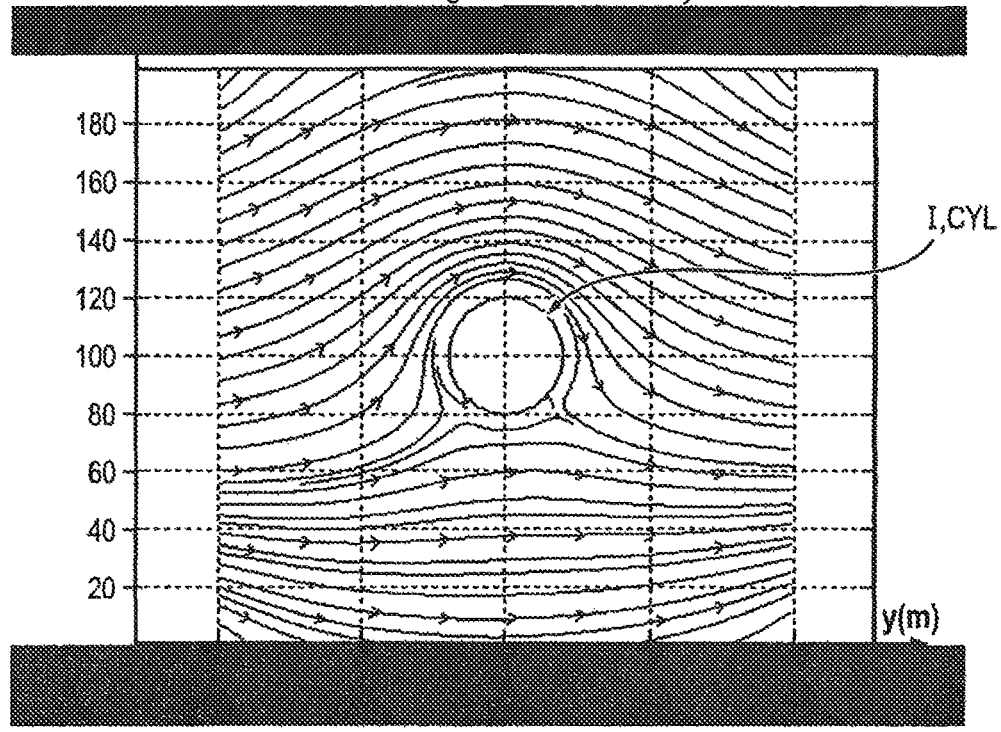
Figure 17C:
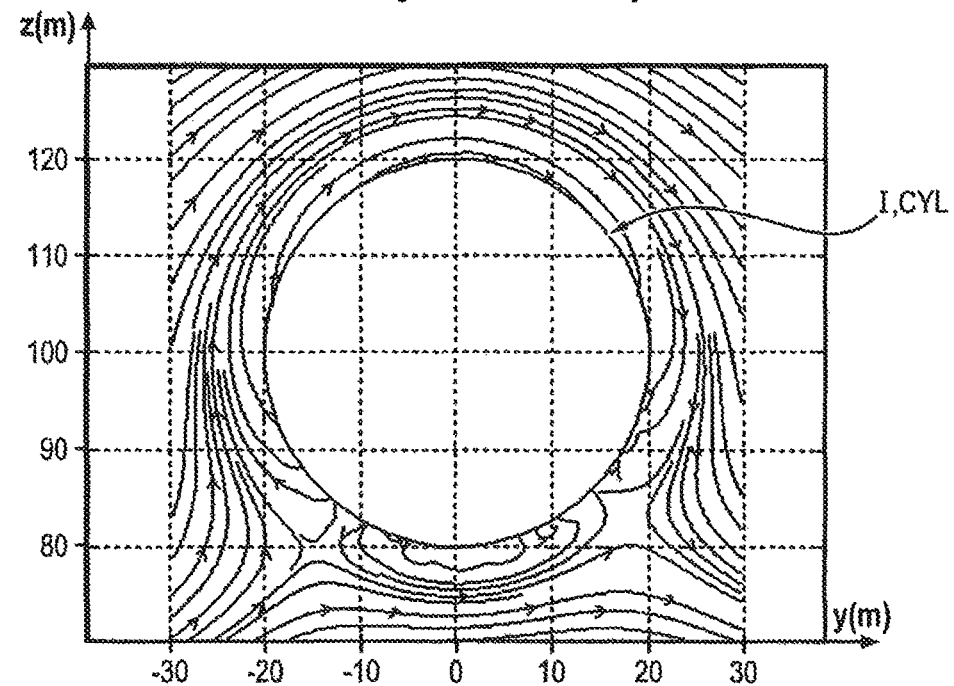

In this variant, FIG. 17A represents the absolute value of the component $V_y$ of the velocity of the fluid flow having been calculated according to the axis y and FIGS. 17B and 17C represent current lines of this fluid flow, having been calculated, and does so for a solid interface I, formed by a cylinder CYL in rotation in the clockwise direction about an axis parallel to the direction x, where the boundary conditions provide for the tangential component of the velocity vector of the fluid flow to be equal to a prescribed wind value (for example here, 100 m·s$^{-1}$) on the cylinder.

Figure 18A:
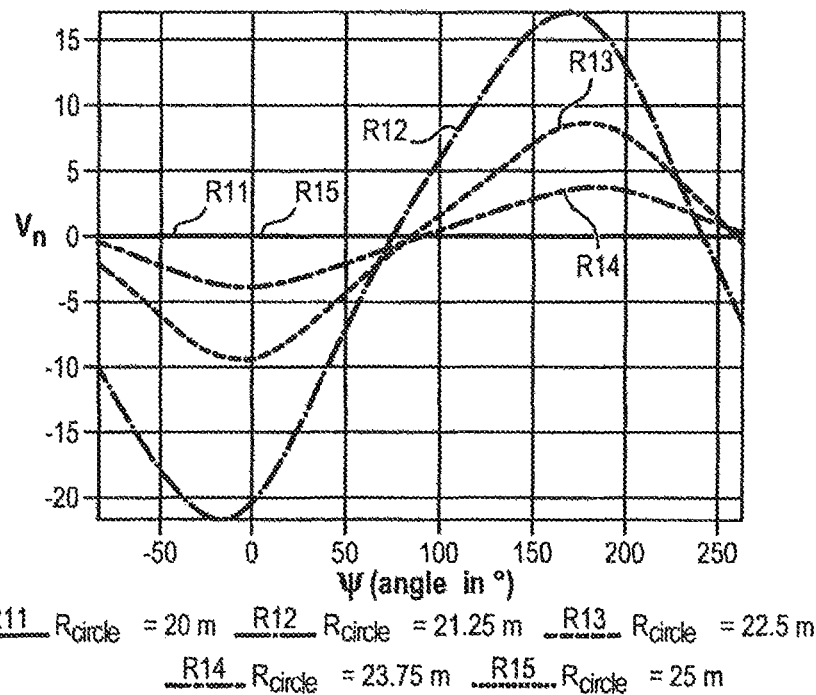
Figure 18B:
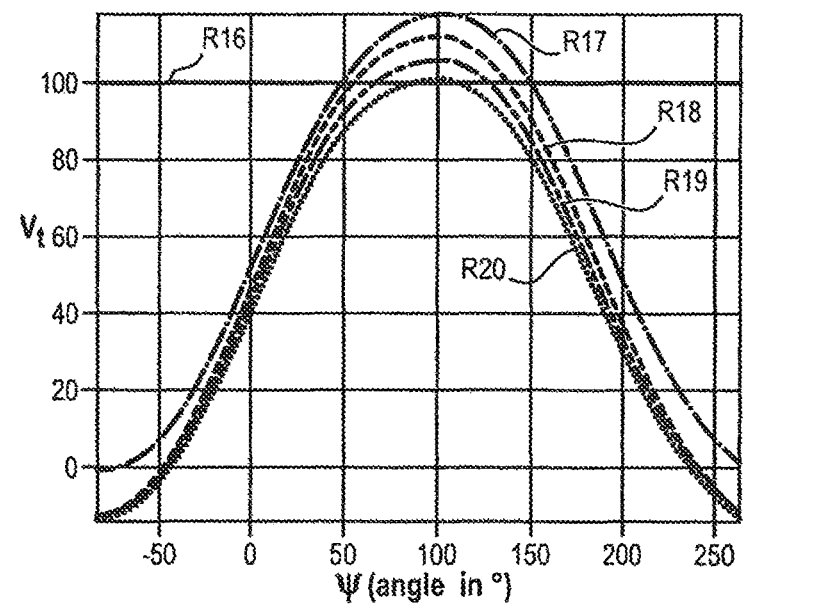

In this variant, FIGS. 18A and 18B represent curves R11, R12, R13, R14, R15, R16, R17, R18, R19, R20 similar to the curves R1, R2, R3, R4, R5, R6, R7, R8, R9, R10 of FIGS. 16A and 16B, for a zero normal velocity, and a tangential velocity equal to a prescribed wind value (for example, here, 100 m·s$^{-1}$) at the test points of the cylinder and a zero normal velocity at the test points of the boundary layer.

Figure 18C:
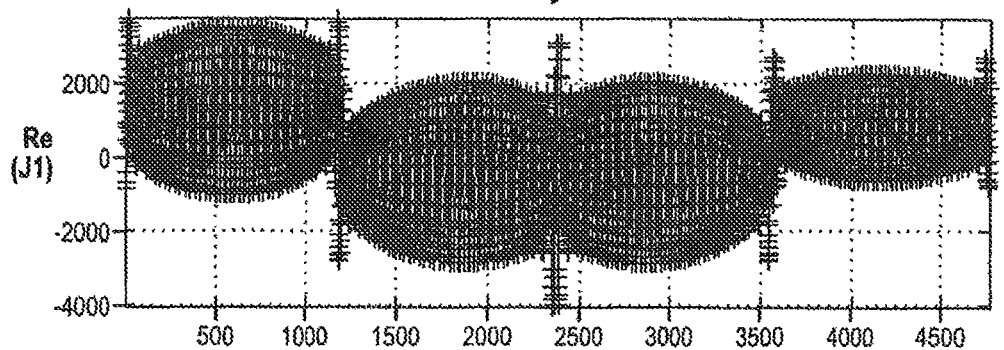
Figure 18D:
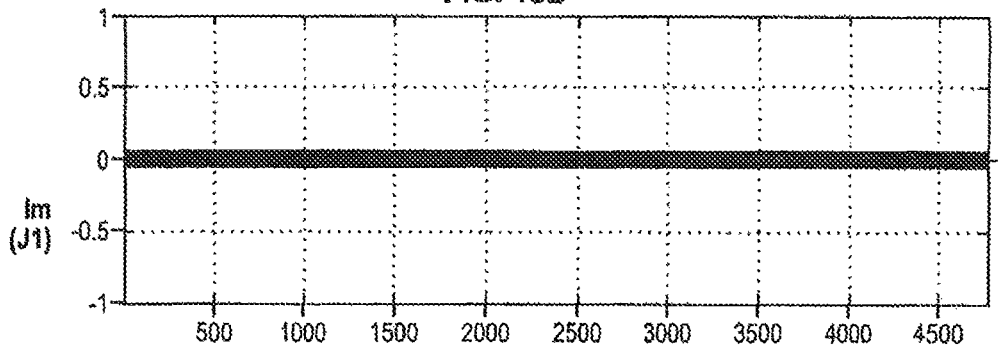
Figure 18E:
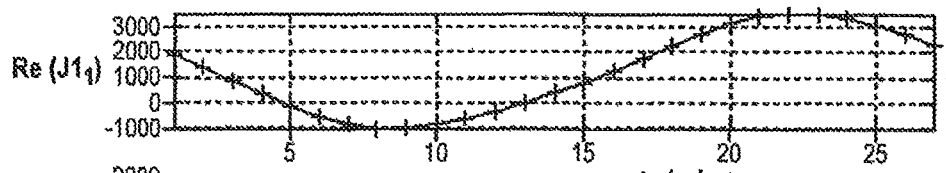
Figure 18F:
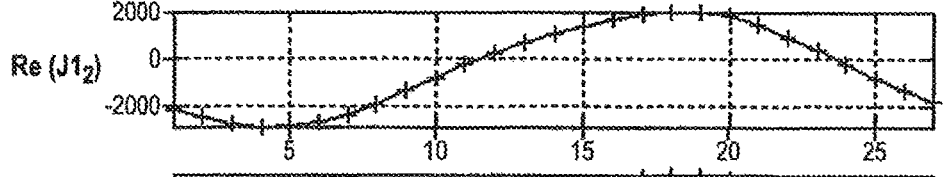
Figure 18G:
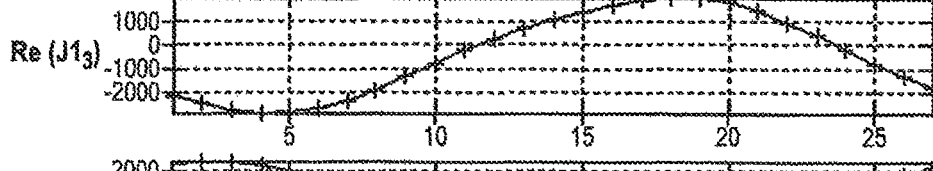
Figure 18H:
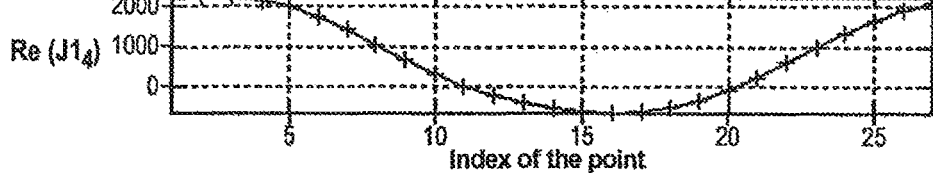
Figure 19A:
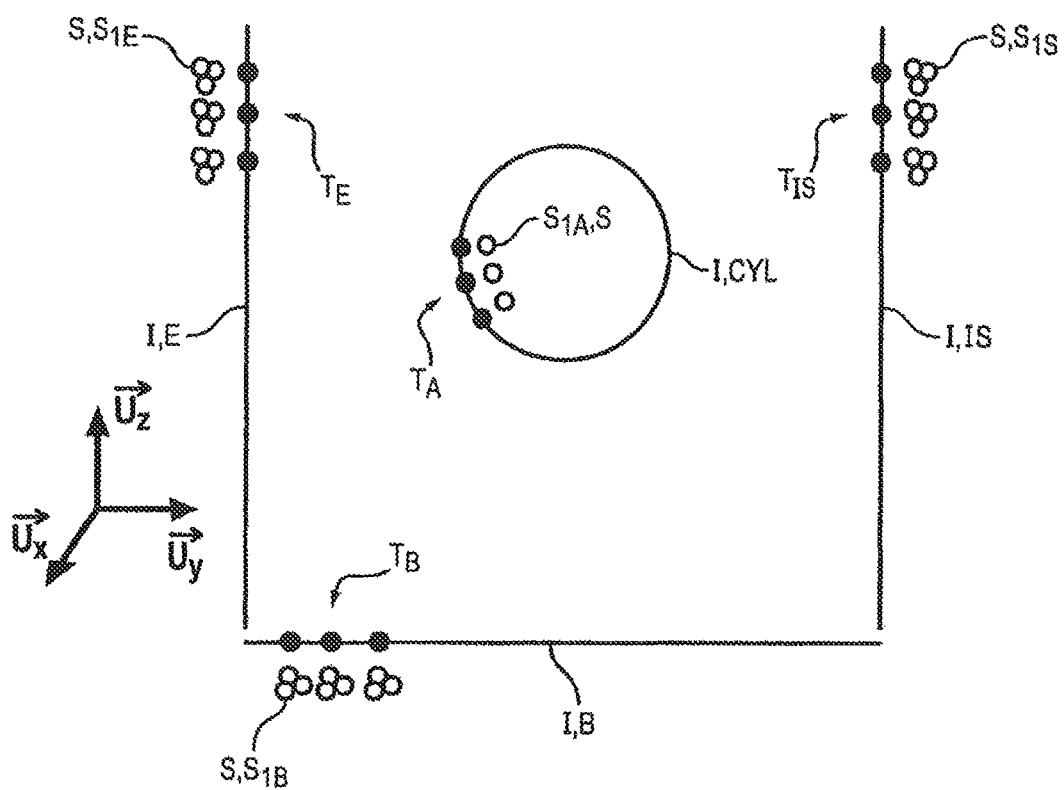
Figure 19B:
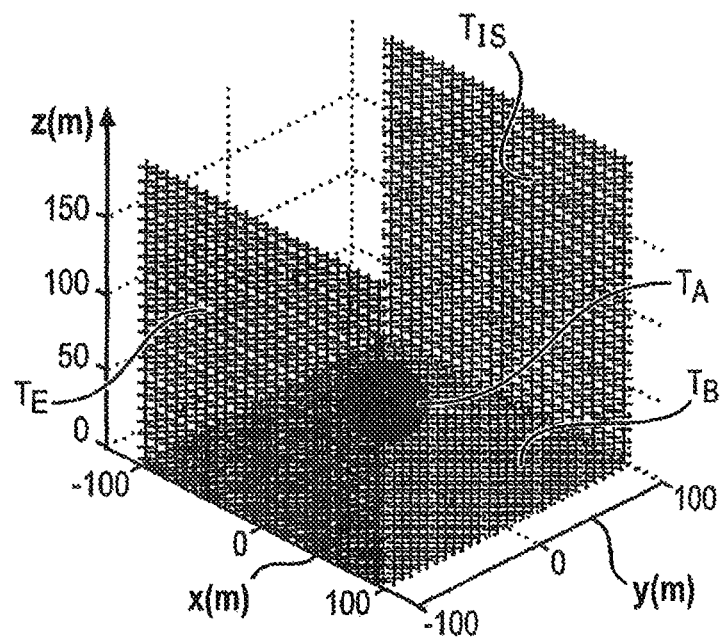
Figure 19C:
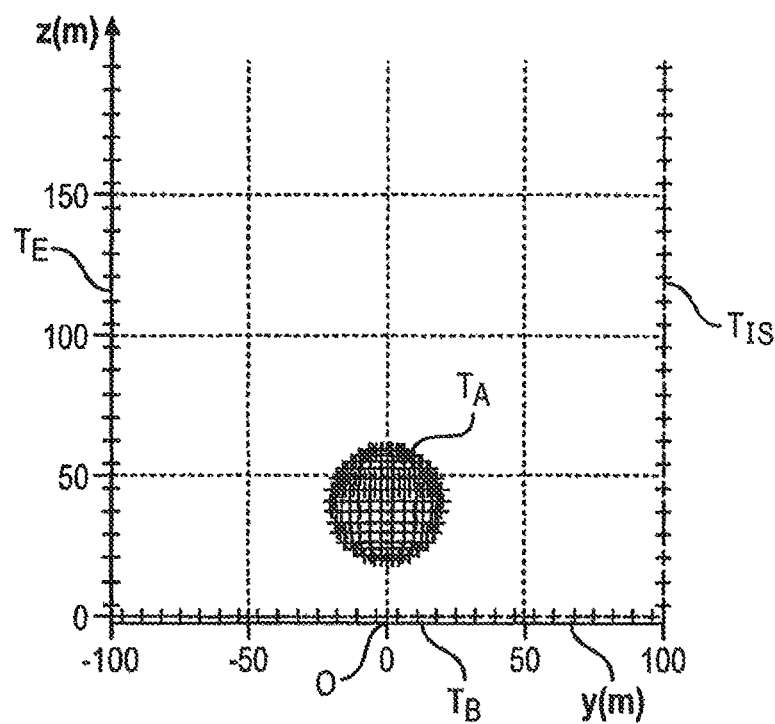
Figure 19D:
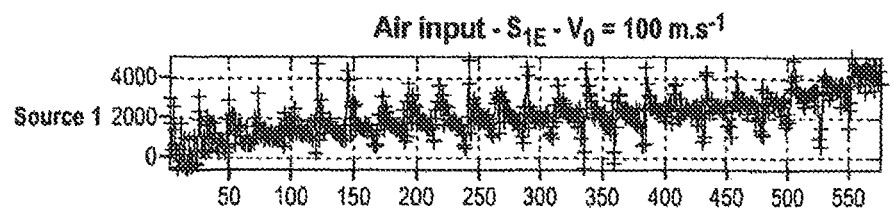
Figure 19E:
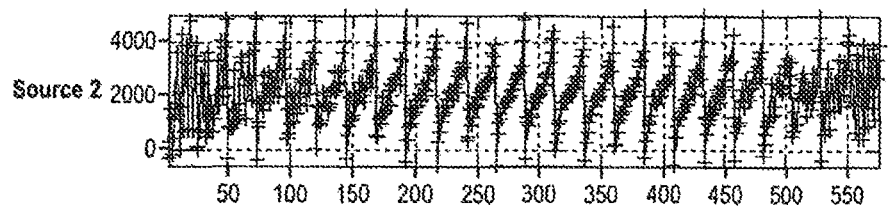
Figure 19F:
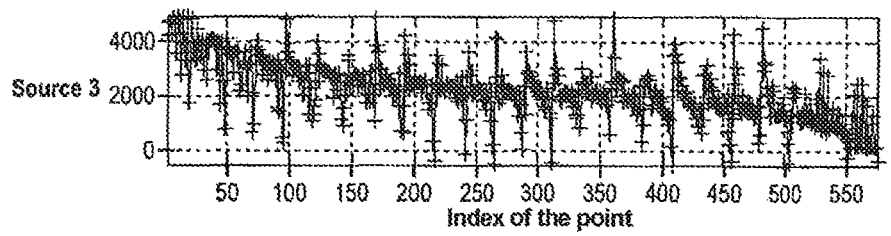
Figure 19G:
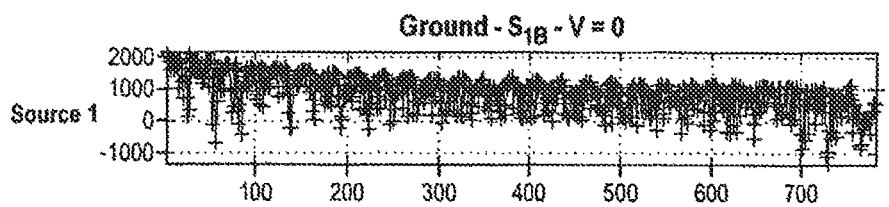
Figure 19H:
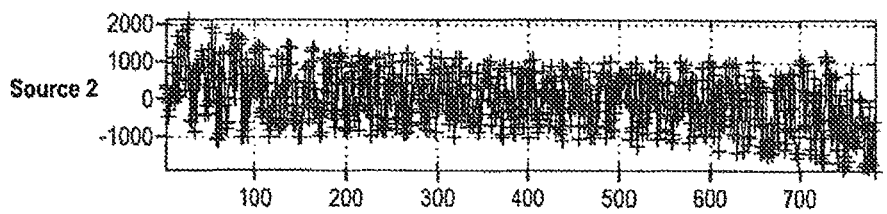
Figure 19I:
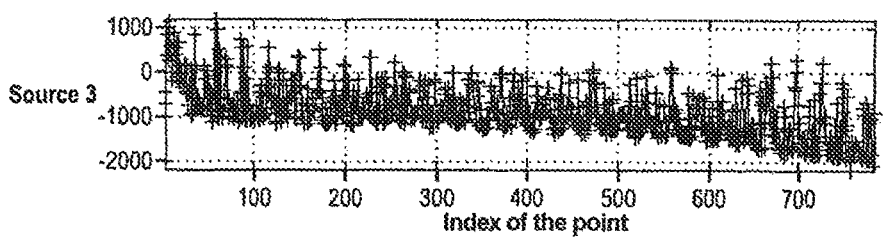
Figure 19J:
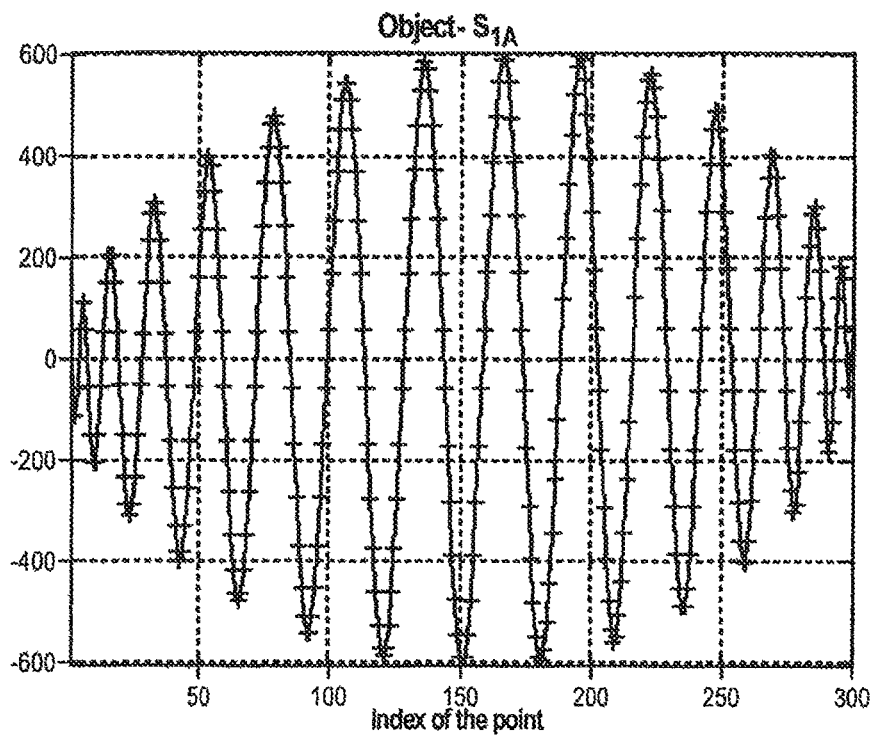
Figure 19K:
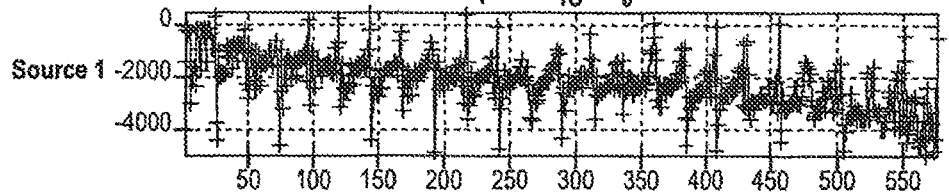
Figure 19L:
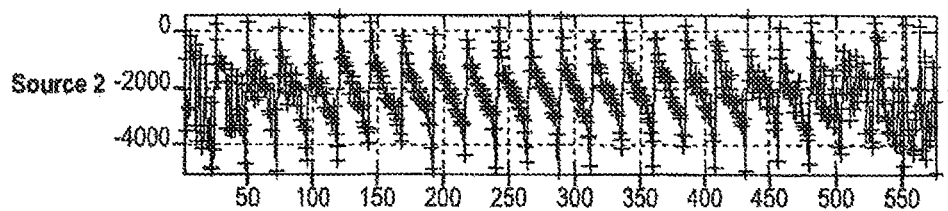
Figure 19M:
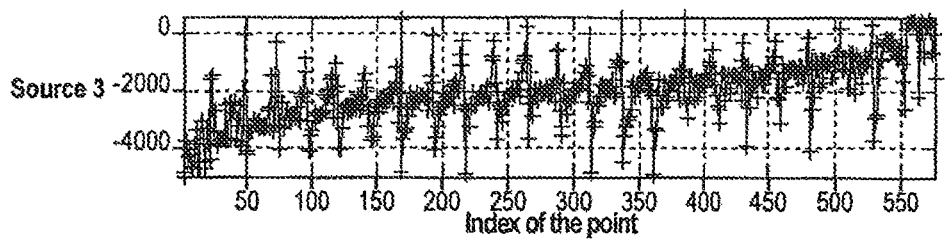
Figure 19N:
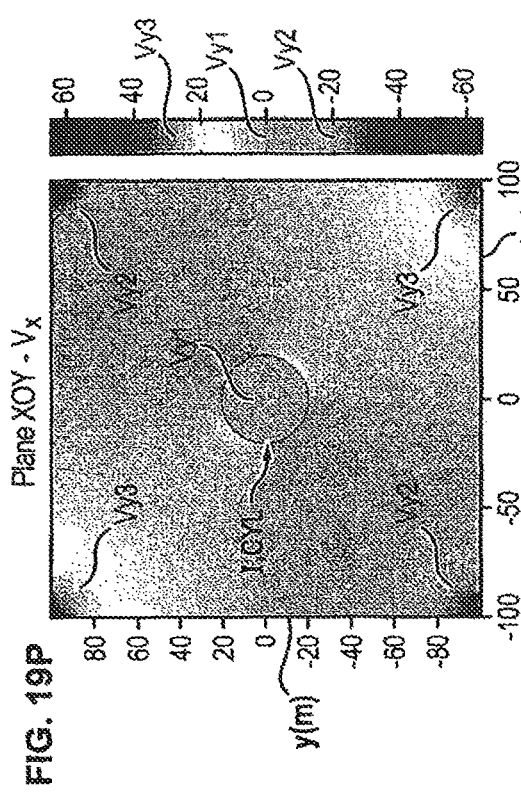
Figure 19O:
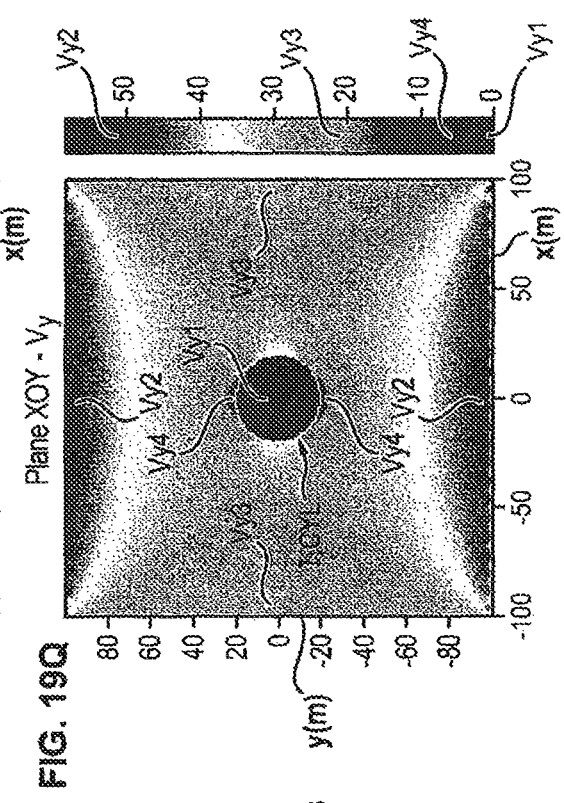
Figure 19P:
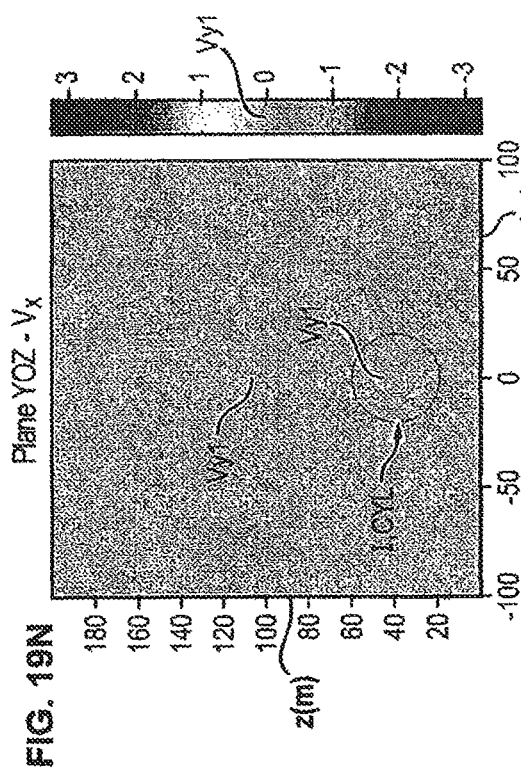
Figure 19Q:
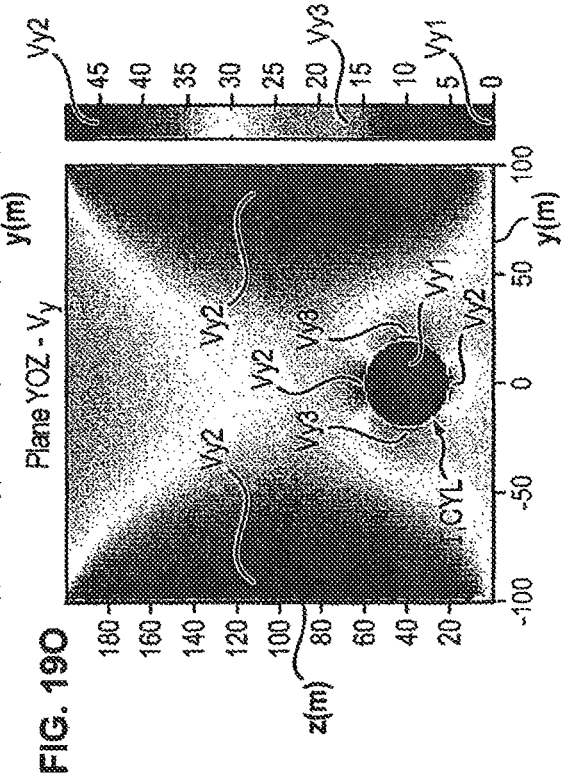
Figure 19V:
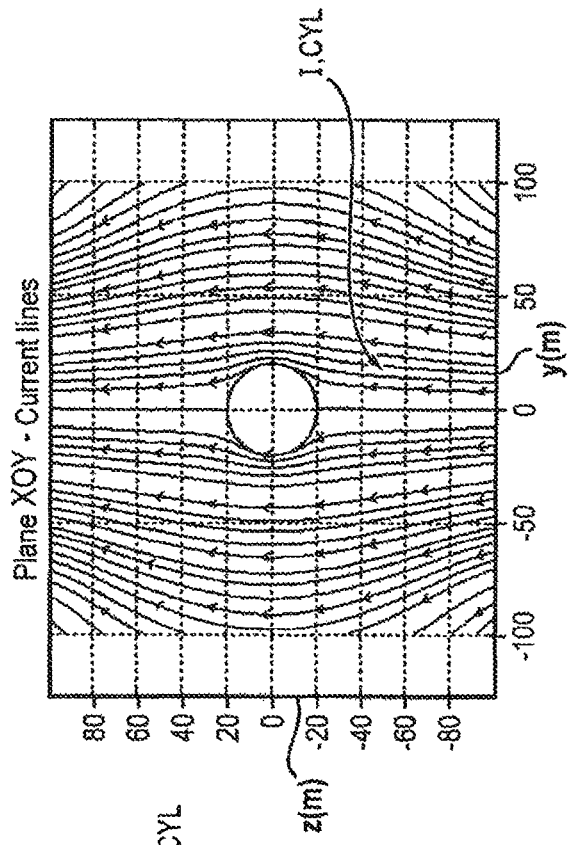
Figure 19U:
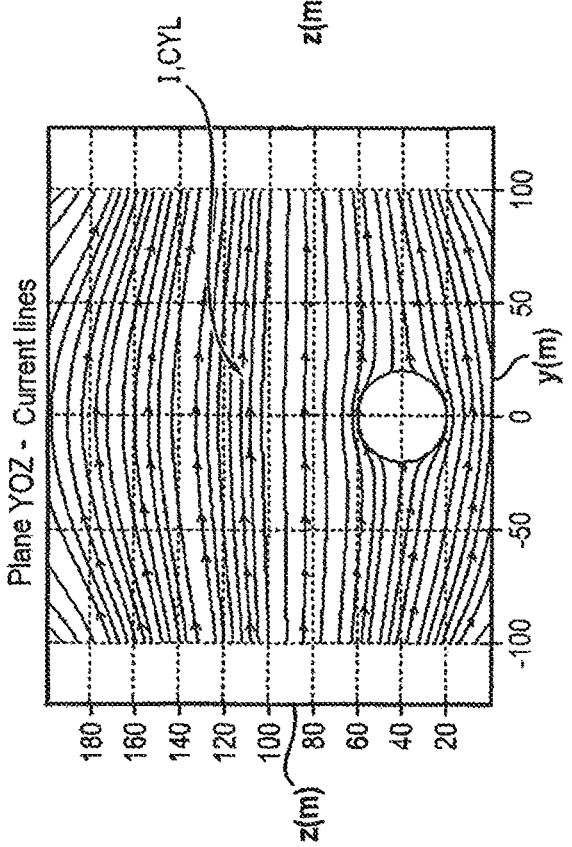
Figure 20:
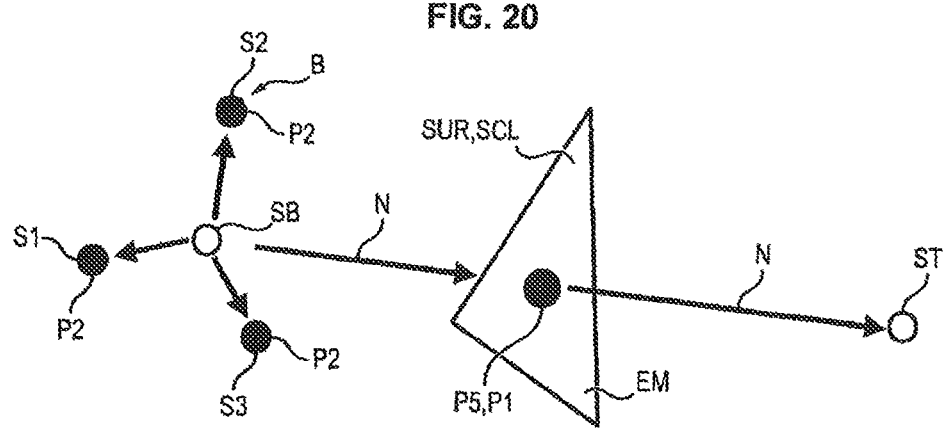
Figure 21:
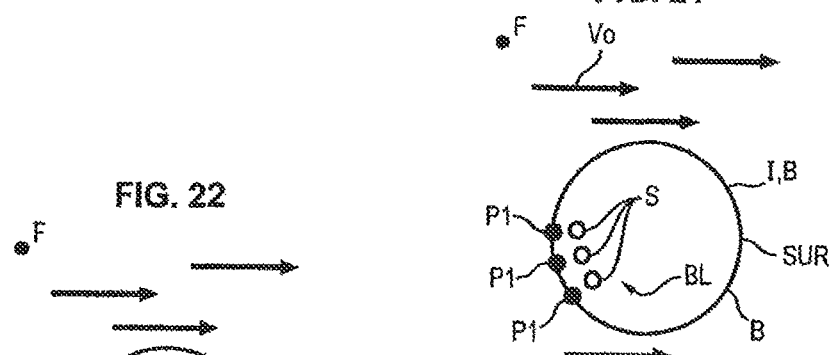
Figure 22:
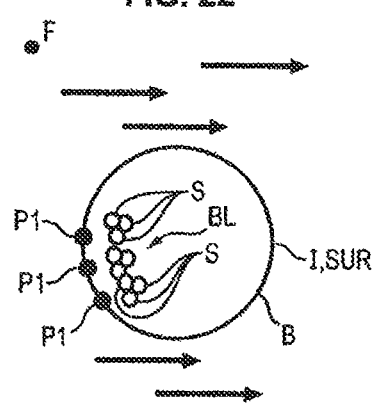
Figure 23:
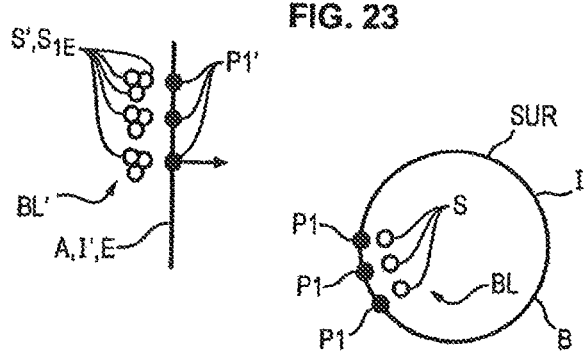
Figure 24:
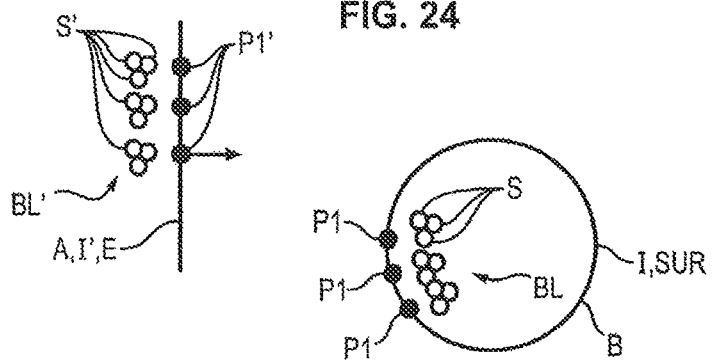
Figure 25:
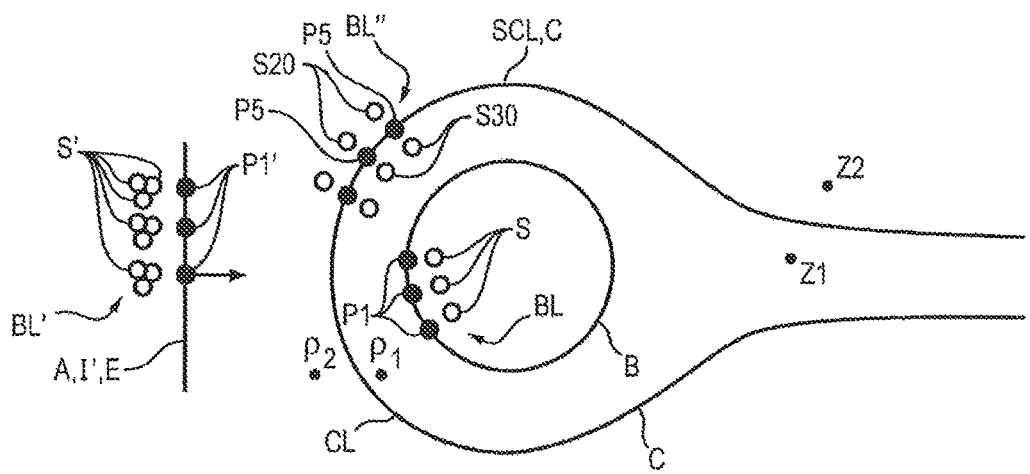
Figure 26:
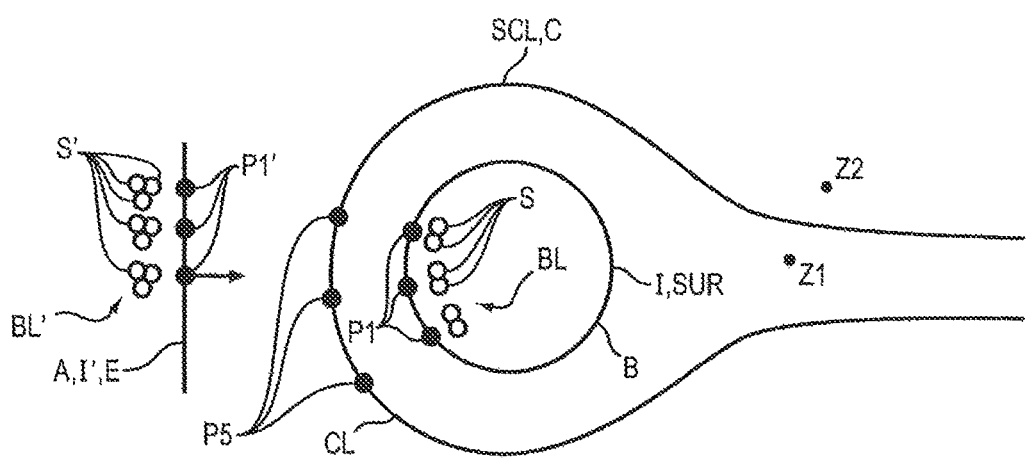
Figure 27A:
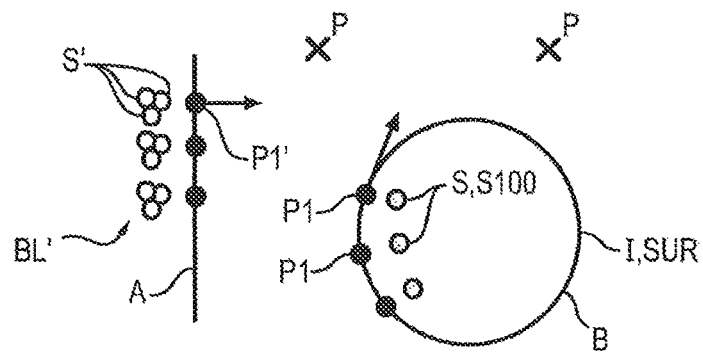
Figure 27B:
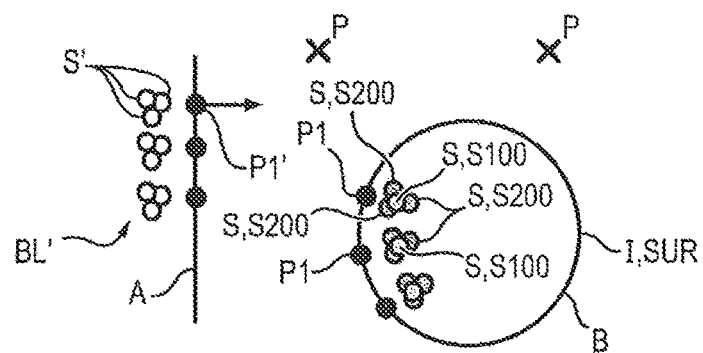
Figure 27C:
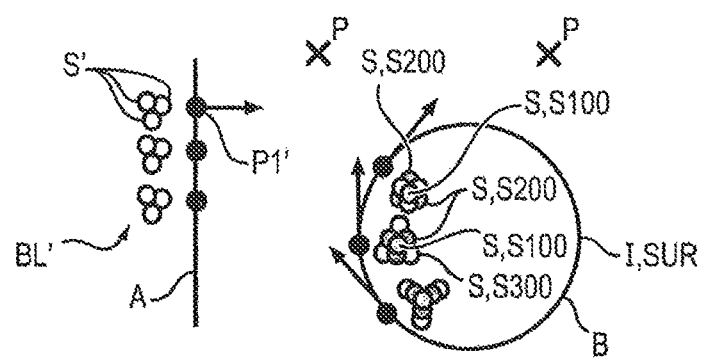
Figure 28A:
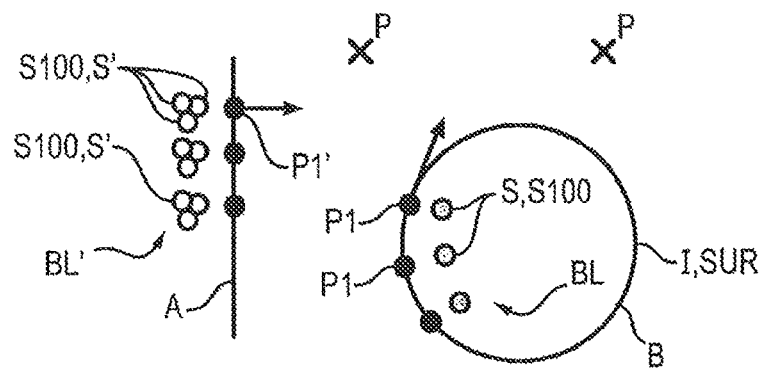
Figure 28B:
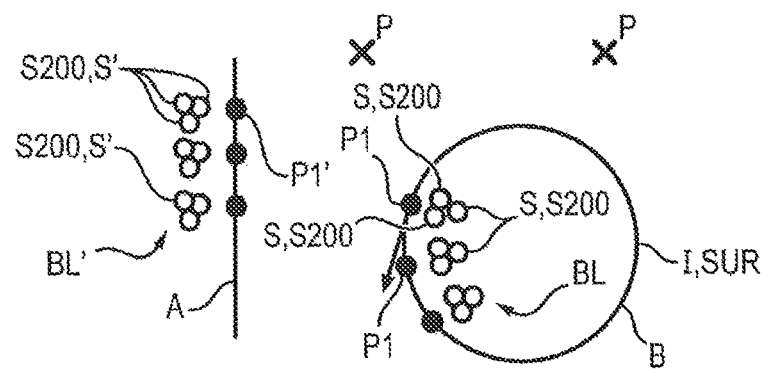
Figure 28C:
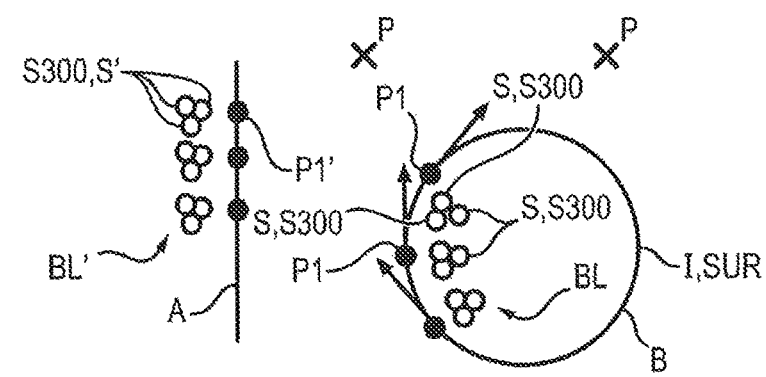

FIGS. 18C to 18H represent the sources (FIGS. 18C and 18D: rotational sources according to X and Y; FIGS. 18E, 18F, 18G, 18H: scalar sources according to one slice of the cylinder beginning at the top, where the x axis is the index of the point in the point meshing on the corresponding object and the y axis is the flow from the source).

In another variant of the cases 9 is 10, there are provided, as source S of fluid, in association with each first test point P1, three scalar sources S of fluid and one rotational source SR of fluid, for the boundary conditions L having, at the first test point P1, a normal fluid velocity component and a tangential fluid velocity component, which are zero at the interface I, and, at at least one other prescribed test point P5 of the surface SCL delimiting a boundary layer CL of the fluid flow relative to the interface I, a zero normal velocity component at the surface SCL delimiting the boundary layer CL of the fluid flow F.

Cases 11, 12, 13

Figure 32:
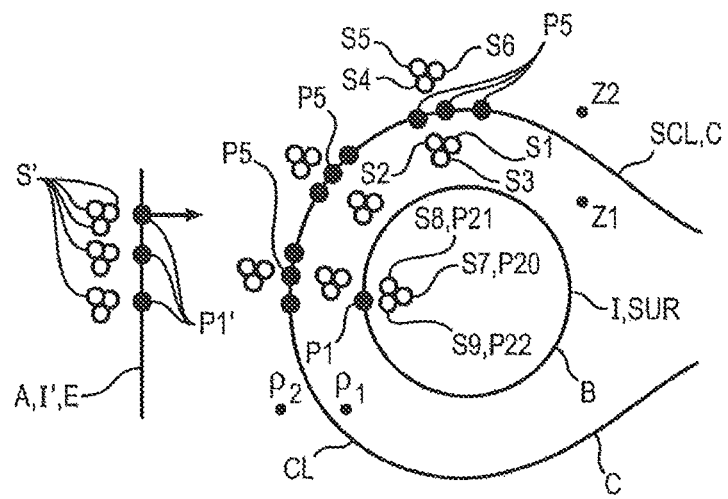
Figure 33:
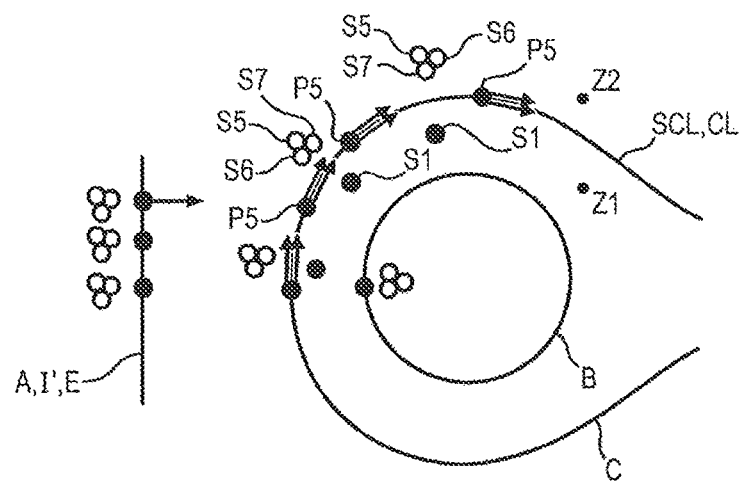
Figure 34:
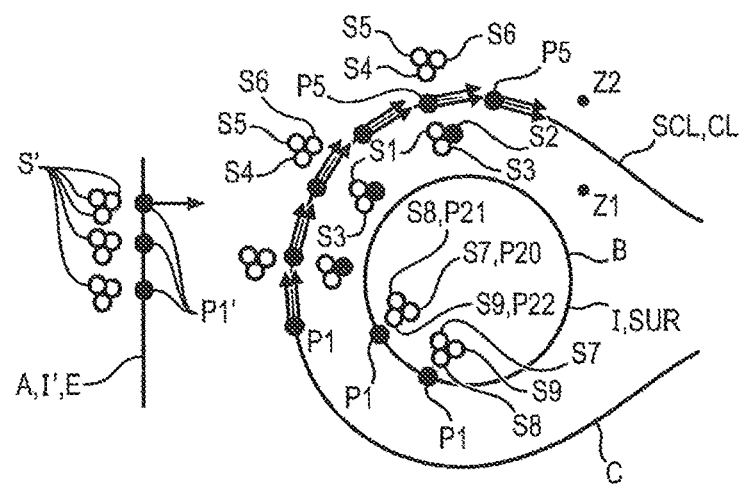

According to an embodiment, represented in FIGS. 32, 33, 34, there are provided, as source S of fluid, at least one seventh source S7 of force in association with each first test point P1, for the boundary condition L having, at each first test point P1, a normal fluid velocity component and a tangential fluid velocity component, which are zero at the interface I.

Each of the embodiments and variants of the cases 11, 12 and 13 is, for example, combined with the abovementioned first underlying embodiment (source S7 and/or S8 and/or S9 situated below the impermeable surface SUR of the solid of the interface I and on the other side of the fluid flow F and/or source S' situated below the interface I' and on the other side of the fluid flow F), which is the case hereinbelow. The interface I is, for example, an object B. The interface I' is, for example, an abovementioned object A or E. In each of the embodiments of the cases 11, 12 and 13, there can be provided just one, two or three sources of force (S7 and/or S8 and/or S9) in association with each first test point P1.

There can also be provided, in each of these embodiments, at least one (for example just one, or two or three)

scalar source S' of mass flow rate of fluid associated with each first test point P1' of a second interface I' distinct from the first interface I.

These cases 11, 12 and 13 can be used for an incompressible fluid for a low Reynolds number, that is to say less than or equal to 2000. The viscosity terms are taken into account.

Case 11

According to an embodiment, represented in FIG. 32, there are provided, as source S of fluid:

in association with each first test point P1 of the interface I, at least three seventh, eighth and ninth sources S7, S8, S9 of force, situated at second points P20, P21, P22, which are distinct from the interface I, in association with at least one other prescribed test point P5 of the surface SCL, delimiting a boundary layer CL of the fluid flow relative to the interface I, below the surface SCL delimiting the boundary layer CL on the side of the interface I, three first, second and third sources S1, S2, S3 of force, and in association with the at least one other prescribed test point of the surface SCL delimiting a boundary layer CL of the fluid flow relative to the interface I, above the surface SCL delimiting the boundary layer CL, three fourth, fifth and sixth sources S4, S5, S6 of force, for the boundary conditions L having, at the first test point P1, a normal fluid velocity component F and a tangential fluid velocity component F, which are zero at the interface I, and, at the other test point P5, a normal fluid velocity component F that is zero at the surface SCL delimiting the boundary layer CL of the fluid flow F and a continuity of the tangential component of the velocity of the fluid F at the surface delimiting the boundary layer CL.

The first source S1 of force and/or the second source S2 of force and/or the third source S3 of force is therefore situated in the first inner zone Z1. The fourth source S4 of force and/or the fifth source S5 of force and/or the sixth source S6 of force is therefore situated in the second outer zone Z2.

Examples are: cylinder in rotation or fixed in a flow, with the ground effect taken into account to illustrate the fact that the method allows for an analysis of the interactions between objects. The individual sources S7, S8, S9 are vectorial triplets, the unit of which is homogeneous with a force (in N), which is logical since the concept of friction losses, therefore drag, emerge.

For example, at low Reynolds numbers, $$v = \begin{pmatrix} v^x \\ v^y \\ v^z \end{pmatrix} = \frac{1}{8\pi\mu} \begin{pmatrix} \frac{(x_i-x_j)}{R_{ij}} & 0 & 0 \\ 0 & \frac{(y_i-y_j)}{R_{ij}} & 0 \\ 0 & 0 & \frac{(z_i-z_j)}{R_{ij}} \end{pmatrix} \cdot \begin{pmatrix} \lambda_x \\ \lambda_y \\ \lambda_z \end{pmatrix} + \frac{1}{8\pi\mu}$$

$$\begin{pmatrix} \frac{(x_i-x_j)\cdot(x_i-x_j)}{R_{ij}^3} & \frac{(x_i-x_j)\cdot(y_i-y_j)}{R_{ij}^3} & \frac{(x_i-x_j)\cdot(z_i-z_j)}{R_{ij}^3} \\ \frac{(y_i-y_j)\cdot(x_i-x_j)}{R_{ij}^3} & \frac{(y_i-y_j)\cdot(y_i-y_j)}{R_{ij}^3} & \frac{(y_i-y_j)\cdot(z_i-z_j)}{R_{ij}^3} \\ \frac{(z_i-z_j)\cdot(x_i-x_j)}{R_{ij}^3} & \frac{(z_i-z_j)\cdot(y_i-y_j)}{R_{ij}^3} & \frac{(z_i-z_j)\cdot(z_i-z_j)}{R_{ij}^3} \end{pmatrix} \cdot$$

$$\begin{pmatrix} \lambda_x \\ \lambda_y \\ \lambda_z \end{pmatrix} = k_{ij} \cdot \begin{pmatrix} \lambda_x \\ \lambda_y \\ \lambda_z \end{pmatrix}$$

$$p = \frac{1}{4\pi} \left( \frac{(x_i-x_j)}{R_{ij}} \quad \frac{(y_i-y_j)}{R_{ij}} \quad \frac{(z_i-z_j)}{R_{ij}} \right) \cdot \begin{pmatrix} \lambda_x \\ \lambda_y \\ \lambda_z \end{pmatrix} = p_{ij} \begin{pmatrix} \lambda_x \\ \lambda_y \\ \lambda_z \end{pmatrix}$$

For example, on each test point P5 of the surface SCL, two conditions are posited (equality of the pressure and of the normal).

There are for example three test points P5 for each block of six sources S1, S2, S3, S4, S5, S6 of the surface SCL of the boundary layer. The global resolution matrix M expressing the pressure is P in stokeslets and M in scalar form is:

$$\begin{pmatrix} V_0 \\ \rho_2 V_{Cext}^N - \rho_1 V_{Cint}^N = 0 \\ p_2 - p_1 = 0 \\ V_B = 0 \end{pmatrix} =$$

$$\begin{pmatrix} Q_{AA} & 0 & K_{ACsi} & 0 \\ \rho_2 Q_{CA}^N & -\rho_1 K_{CCse} & \rho_2 K_{CCsi} & -\rho_1 K_{CB} \\ M_{CA} & P_{CCse} & P_{CCsi} & P_{CB} \\ 0 & K_{BCse} & 0 & K_{BB} \end{pmatrix} \cdot \begin{pmatrix} \lambda_A \\ \lambda_{cse} \\ \lambda_{csi} \\ \lambda_A \end{pmatrix}$$

Case 12

According to an embodiment represented in FIG. 33, there are provided, as source S of fluid:

in association with each first test point P1 of the interface I, at least one seventh source S7 of force, in association with at least one other prescribed test point P5 of the surface SCL delimiting a boundary layer CL of the fluid flow relative to the interface I, below the surface SCL delimiting the boundary layer CL on the side of the interface I, a first scalar source S1 of the fluid, and in association with the at least one other prescribed test point P5 of the surface SCL delimiting a boundary layer CL of the fluid flow relative to the interface I, above the surface SCL delimiting the boundary layer CL, at least one fourth source S4 of force, for the boundary conditions L having, at the first test point P1, a normal fluid velocity component F and a tangential fluid velocity component F, which are zero at the interface I, and, at the other test point P5, a normal fluid velocity component F that is zero at the surface SCL delimiting the boundary layer CL of the fluid flow F and a continuity of the tangential component of the velocity of the fluid F at the surface delimiting the boundary layer CL.

According to an embodiment, represented in FIG. 33, there are provided, as source S of fluid:

in association with each first test point P1 of the interface I, at least three seventh, eighth and ninth sources S7, S8, S9 of force, situated at second points P20, P21, P22 which are distinct from the interface I, in association with at least one other prescribed test point P5 of the surface SCL delimiting a boundary layer CL of the fluid flow relative to the interface I, below the surface SCL delimiting the boundary layer CL on the side of the interface I, a first scalar source S1 of fluid, and in association with the at least one other prescribed test point P5 of the surface SCL delimiting a boundary layer CL of the fluid flow relative to the interface I, above the surface SCL delimiting the boundary layer CL, fourth, fifth and sixth sources S4, S5, S6 of force, for the boundary conditions L having, at the first test point P1, a normal fluid velocity component F and a tangential fluid velocity component F, which are zero at the interface I, and, at the other test point P5, a normal fluid velocity component F that is zero at the surface SCL delimiting the boundary layer CL of the fluid flow F and a continuity of the tangential component of the velocity of the fluid F at the surface delimiting the boundary layer CL.

The first scalar source S1 of fluid is therefore situated in the first inner zone Z1. The fourth source S4 of force and/or the fifth source S5 of force and/or the sixth source S6 of force are therefore situated in the second outer zone Z2.

The cases 12 and 13 can be used for a low Reynolds number in the boundary layer, that is to say in the first zone Z1 situated between the surface SCL and the interface I, where the Reynolds number is less than or equal to 2000, and a high Reynolds number beyond, that is to say in the second zone Z2 situated above the surface SCL and situated on the other side relative to the interface I, where the Reynolds number is greater than or equal to 3000. In the zone Z1, the viscosity terms can be disregarded and the harmonic functions at 1/R and their derivatives are taken. In the zone Z2, the viscosity terms are taken into account and the stokeslets are used as Green functions. An incompressible fluid is for example considered. The coupling conditions at the boundary SCL of the boundary layer are treated as conventional interfaces in DPSM, with series of point sources on either side of this surface SCL or else, as is done in the preceding cases, all the sources are inside the interface I or profile I.

The global resolution matrix M is:

$$\begin{pmatrix} V_0 \\ V_{Cext}^{4/3} - V_{Cint}^{4/3} = 0 \\ V_B = 0 \end{pmatrix} = \begin{pmatrix} Q_{AA} & 0 & Q_{AC_1} & 0 \\ Q_{CA} & K_{CC} & -Q_{CC_1} & -K_{CB} \\ 0 & K_{BC} & 0 & K_{BB} \end{pmatrix} \cdot \begin{pmatrix} \lambda_A \\ \lambda_{Cs} \\ \lambda_{C1} \\ \lambda_B \end{pmatrix}$$

of dimension:

$$dim = \begin{pmatrix} 3n_A \times 3n_A & 3n_A \times 3n_C & 3n_A \times n_C & 3n_B \times 3n_B \\ 4n_C \times 3n_A & 4n_C \times 3n_C & 4n_C \times n_C & 4n_C \times 3n_B \\ 3n_B \times 3n_A & 3n_B \times 3n_C & 3n_B \times n_C & 3n_B \times 3n_B \end{pmatrix} =$$

$$(3n_A + 4n_C + 3n_B) \times (3n_A + 3n_C + n_C + 3n_B)$$

Case 13

According to an embodiment, represented in FIG. 34, there are provided, as source S of fluid:

in association with each first test point P1 of the interface I, at least one seventh source S7 of force, in association with at least one other prescribed test point P5 of the surface SCL delimiting a boundary layer CL of the fluid flow relative to the interface I, below the surface SCL delimiting the boundary layer CL on the side of the interface I, at least one first scalar source S1 of fluid and at least one second rotational source S2 of fluid, in association with the at least one other prescribed test point P5 of the surface SCL delimiting a boundary layer CL of the fluid flow relative to the interface I, above the surface SCL delimiting the boundary layer CL, fourth, fifth and sixth sources S4, S5, S6 of force, for the boundary conditions L having, at the first test point P1, a normal fluid F velocity component and a tangential fluid F velocity component, which are zero at the interface I, and, at the other test point P5, a normal fluid F velocity component that is zero at the surface SCL delimiting the boundary layer CL of the fluid flow F and a continuity of the tangential component of the velocity of the fluid F at the surface SCL delimiting the boundary layer CL.

According to an embodiment, there are provided, as source S of fluid:

in association with each first test point P1 of the interface I, at least three seventh, eighth and ninth sources S7, S8, S9 of force, situated at second points P20, P21, P22 which are distinct from the interface I, in association with at least one other prescribed test point P5 of the surface SCL delimiting a boundary layer CL of the fluid flow relative to the interface I, below the surface SCL delimiting the boundary layer CL on the side of the interface I, a first scalar source S1 of fluid, a second rotational source S2 of fluid and a third source S3 of fluid, scalar or rotational, in association with the at least one other prescribed test point P5 of the surface SCL delimiting a boundary layer CL of the fluid flow relative to the interface I, above the surface SCL delimiting the boundary layer CL, three fourth, fifth and sixth sources S4, S5, S6 of force, for the boundary conditions L having, at the first test point P1, a normal fluid F velocity component and a tangential fluid F velocity component, which are zero at the interface I, and, at the other test point P5, a normal fluid F velocity component that is zero at the surface SCL delimiting the boundary layer CL of the fluid flow F and a continuity of the tangential component of the velocity of the fluid F at the surface SCL delimiting the boundary layer CL.

For example, FIG. 34 shows the third source S3 of fluid, the scalar.

The first scalar source S1 of fluid and/or the second rotational source S2 of fluid and/or the third source S3 of fluid, scalar or rotational, is therefore situated in the first inner zone Z1. The fourth source S4 of force and/or the fifth source S5 of force and/or the sixth source S6 of force are therefore situated in the second outer zone Z2.

Thus, there is superimposed on a set of boundary conditions L taken as a meshing of test points (first point P1) distributed on the surface SUR of the interface I, another set of boundary conditions L taken as a meshing of test points P5 distributed on the surface SCL of the boundary layer CL. This superimposition is called "layered boundary conditions". The introduction of layered boundary conditions makes it possible to take account of the problem of the boundary layer CL. For example, on contact with a wing profile, the normal velocity is zero (the wing is a surface SUR impermeable to the fluid F), but the tangential velocity of the fluid F is also canceled (because of the velocity). Beyond the boundary layer CL in which this velocity phenomenon is felt, the fluid F behaves as a perfect fluid, and, at the surface SCL delimiting the boundary layer CL, only the normal component of the velocity is zero. These boundary conditions L make it possible to take vectorial boundary conditions at the surface SUR of the interface I, with which the scalar boundary conditions at the surface SCL of the boundary layer CL are superimposed (example: normal component of the velocity zero at the surface SCL of the boundary layer CL).

As a variant to the cases 11, 12 and 13, there are provided, as source S of fluid, in association with each first test point P1, a scalar source S of fluid and three sources S7, S8, S9 of force, for the boundary conditions L having, at the first test point P1, a normal fluid velocity component and a tangential fluid velocity component, which are zero at the interface I, and, at at least one other prescribed test point P5 of the surface SCL delimiting a boundary layer CL of the fluid flow relative to the interface I, a zero normal fluid velocity component at the surface SCL delimiting the boundary layer CL of the fluid flow F and a continuity of the tangential fluid velocity component at the surface SCL delimiting the boundary layer CL.

The global resolution matrix M is:

$$\begin{pmatrix} V_0 \\ V_{Cext}^{6/3} - V_{Cint}^{6/3} = 0 \\ V_B = 0 \end{pmatrix} = \begin{pmatrix} Q_{AA} & 0 & H_{AC_h}^3 & 0 \\ Q_{CA} & K_{CC} & -H_{CC_h}^2 & -K_{CB} \\ 0 & K_{BC} & 0 & K_{BB} \end{pmatrix} \cdot \begin{pmatrix} \lambda_A \\ \lambda_{Cs} \\ \lambda_{Ch} \\ \lambda_B \end{pmatrix}$$

In the cases 11, 12 and 13, the source S5 and/or S6 and/or S7 situated in the outer zone Z2 sends fluid into the inner zone Z1 through the surface SCL, whereas the source S1 and/or S2 and/or S3 situated in the inner zone Z1 sends fluid into the outer zone Z2 through the surface SCL.

In the cases 11, 12 and 13, the boundary conditions can comprise the conservation of the fluid pressure at the other test point P5 and the conservation, at the other test point P5, of the normal component of the velocity modulo the density.

Figure 35:
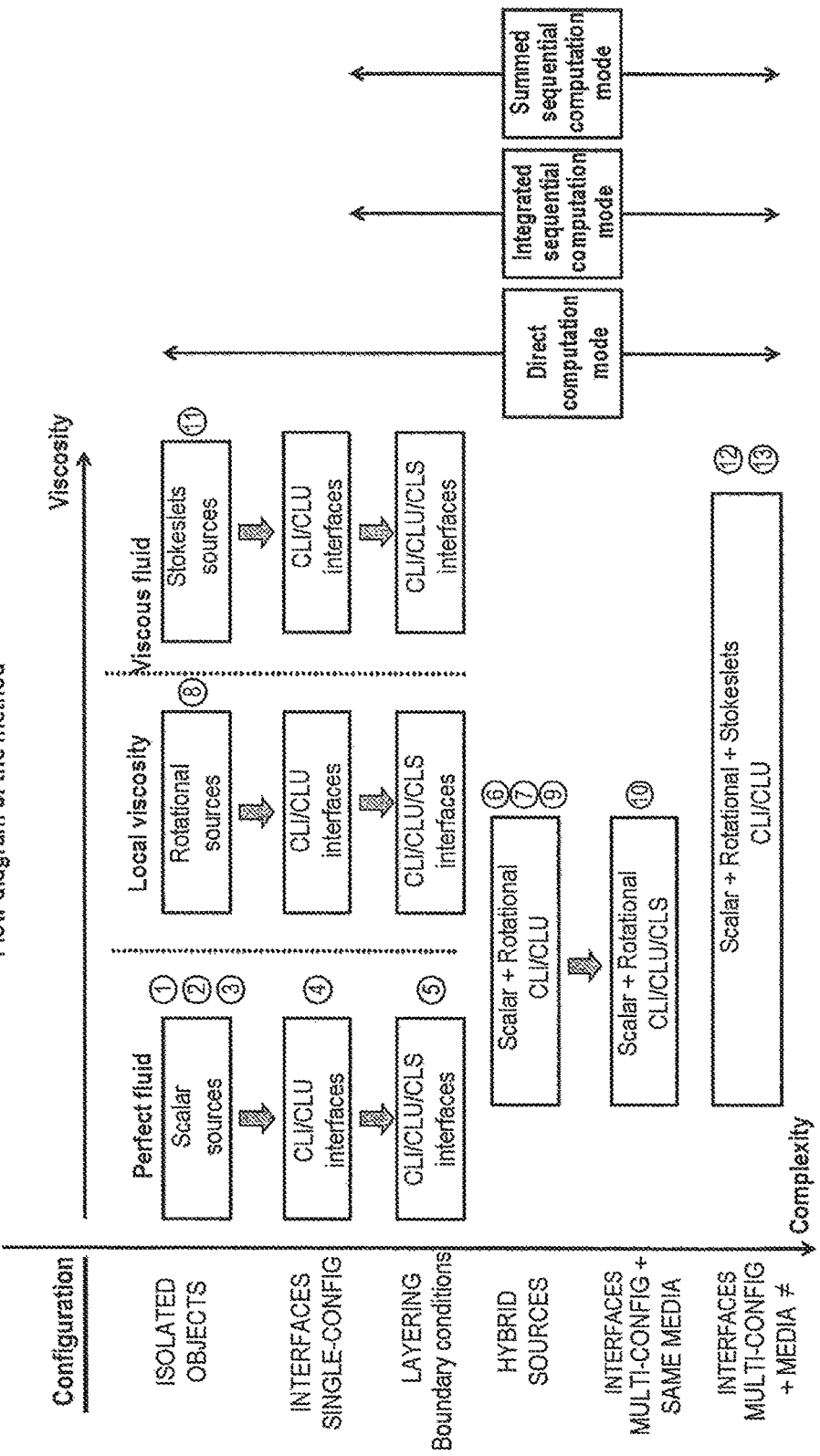
Figure 36A:
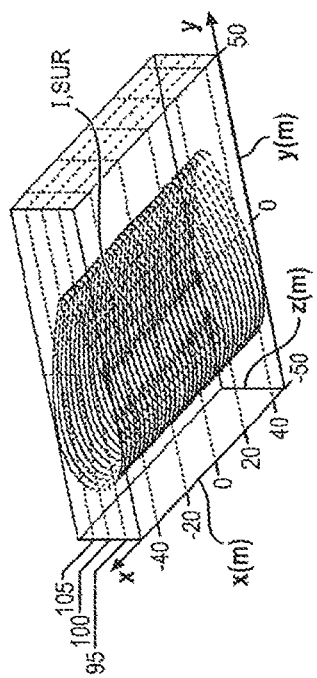
Figure 36B:
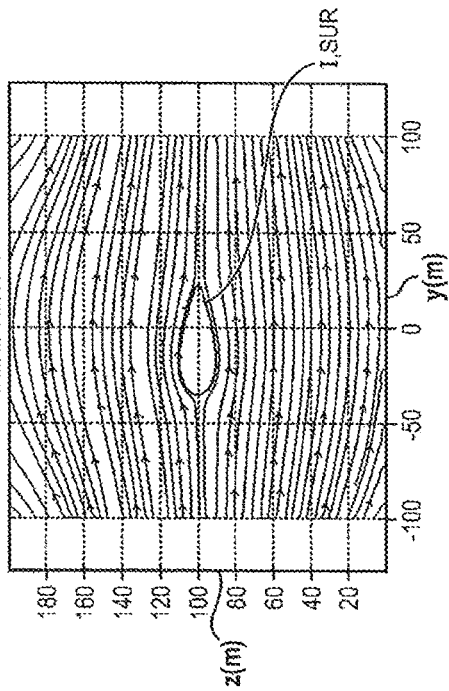
Figure 36C:
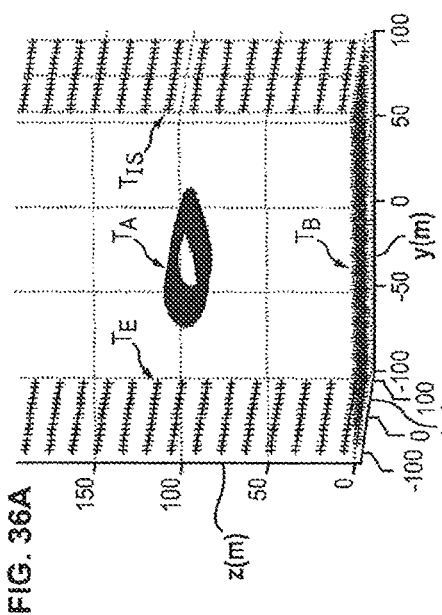
Figure 36D:
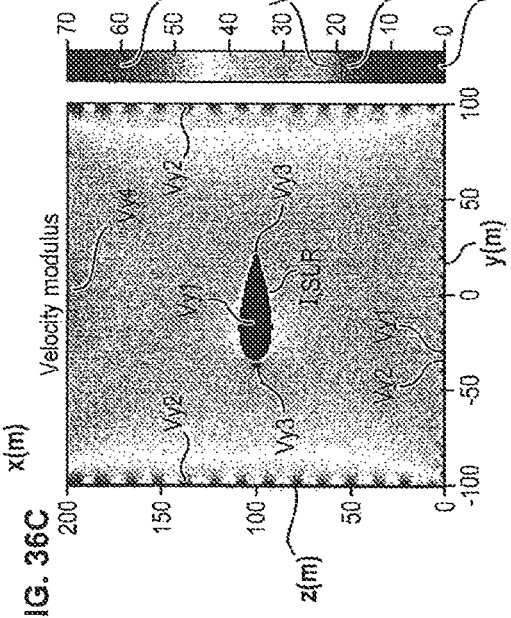
Figure 37G:
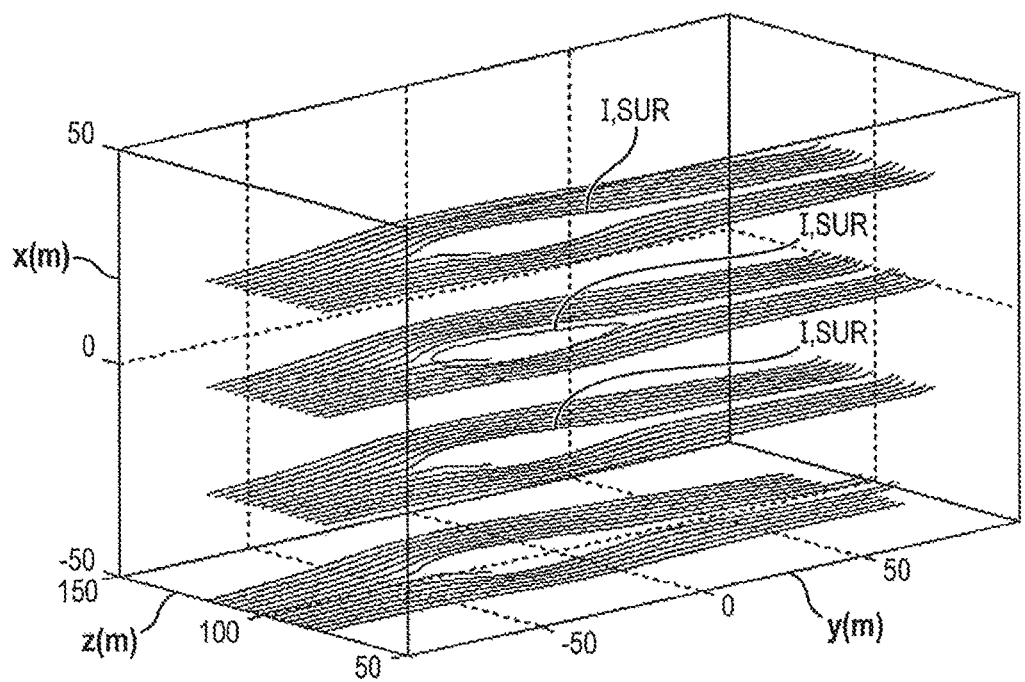

The 13 cases mentioned above are summarized in the flow diagram represented in FIG. 35.

Generally in the above, the number of test points P1 and/or P5 and/or P1' and/or the number of boundary conditions L is adapted for the global resolution matrix M to be square and for, thus, the number of equations to remain equal to the number of unknowns. For example, in FIG. 32, three test points P5 are chosen for each group of sources S1, S2, S3, S4, S5, S6. For example, in FIG. 33, there is a ratio of 4/3 between the number of test points P5 and the number of blocks of sources S5, S6, S7, S1. For example, in FIG. 32, three test points P5 are chosen for each group of sources S1, S2, S3, S4, S5, S6. For example, in FIG. 34, there is a ratio of 6/3 between the number of test points P5 and the number of blocks of sources S5, S6, S7, S1, S2, S3.

In aeronautics, a very interesting case is that in which the aerological environment in which the position of the airplane changes abruptly (variation of airplane incidence angle, lateral or vertical gust, wind gradient, etc.). According to an embodiment, this case is represented by a simple modification of the boundary conditions L (vector C), the inverse matrix of M does not change, and a new value of the sources S is obtained almost instantaneously. In the above-mentioned example of the airplane, when the latter banks, each test point P3 placed on the meshing of the airplane is displaced with a different vector: the horizontal velocity of the airplane and the velocity at each point linked to the roll movement become the new boundary conditions of the airplane.

There are many applications:

modeling of all or part of an airplane in order to better restore its behavior in a flight simulator or optimize the operation of the automatic pilots; optimization of the aeronautical profiles in order to reduce drag and improve the operating algorithms of the flight simulators and the training of the pilots;

taking into account the mutual influence of several objects I, such as, for example, the modeling of the ground effect possibly in the presence of a wind gradient (in terms of velocity and direction), the fuselage or the wing and tail plane pairing;

optimization of profiles by injection of air flows at certain precise points, which requires complex modeling;

fine analysis of the wing profiles to reduce the drag and thus reduce the fuel consumption of the airplanes, this reduction having an impact on the operating cost and on the carbon footprint of the flights, hydrodynamic, maritime field.

The quantities can then be calculated easily throughout the work space and the different objects can be placed in interaction. Moreover, by having sources of different natures (rotational and scalar) which interact mutually coexist it is possible to provide an accurate solution to the problems dealt with. Another advantage is that of associating additional boundary conditions, far from the test points P1 positioned at the surface SUR of the interface I, which makes it possible to give a good representation of the phenomena also in the zone close to the interface I (bringing about a possible restoration of the friction phenomena in the boundary layer CL).

The invention notably makes it possible to model all or part of an airplane, in order to better restore its behavior in a flight simulator or optimize the operation of the automatic pilots.

The measurement method and/or measurement device can thus be embedded on an aircraft, such as, for example, an airplane or a helicopter, or on a flight simulator, or on a ship, or, more generally, an automotive transport vehicle, to be implemented therein.

Thus, another subject of the invention can be a control method or a control device for controlling an aircraft, such as, for example, an airplane or a helicopter, or a flight simulator, or a ship, or, more generally, an automotive transport vehicle, in which there is provided a calculation step, in which there is calculated, from the physical quantity having been calculated by the measurement method and/or measurement device, at least one control quantity, by a computer embedded on the aircraft, flight simulator, ship or automotive transport vehicle. In the above, the actuator can be one of those of this aircraft, airplane, helicopter, flight simulator, ship, or, more generally, an automotive transport vehicle.

The invention makes it possible to take account of the mutual influence of several objects such as, for example, the modeling of the ground effect possibly in the presence of a wind gradient (in terms of velocity and direction), of the fuselage or of the wing/tailplane pairing.

The invention also allows for a fine analysis of the wing profiles to reduce the drag and thus reduce the fuel consumption of the airplanes. This reduction has an impact on the operating cost and on the carbon footprint of the flights.

According to an embodiment, the calculation means are able to calculate macroscopic quantities (lift, drag) and make it possible to take account of nonlinearities necessary to the calculation of polar curves beyond the breakdown of the boundary layer.

Figure 56:
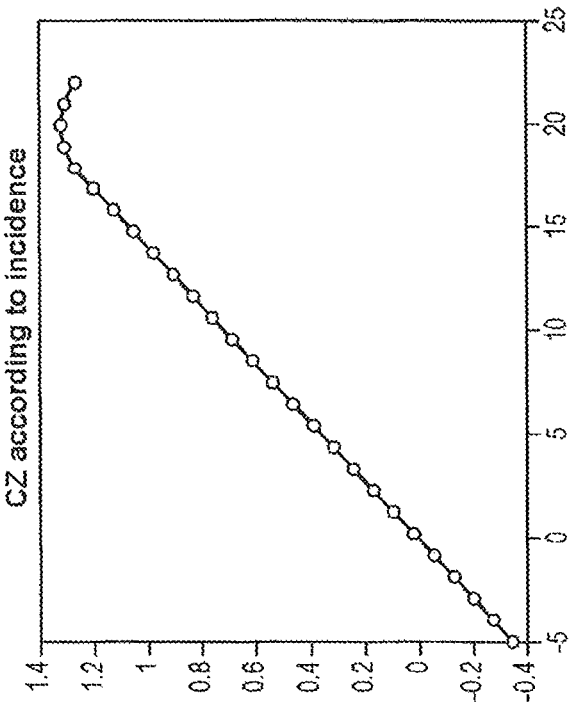
Figure 57:
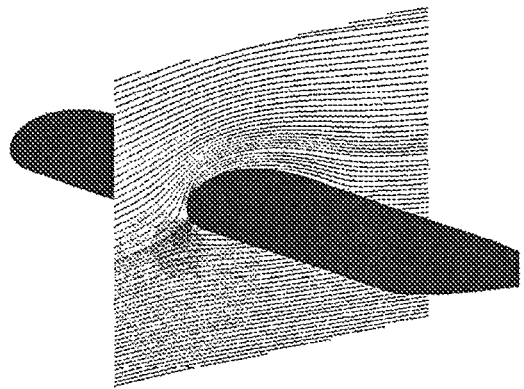
Figure 58:
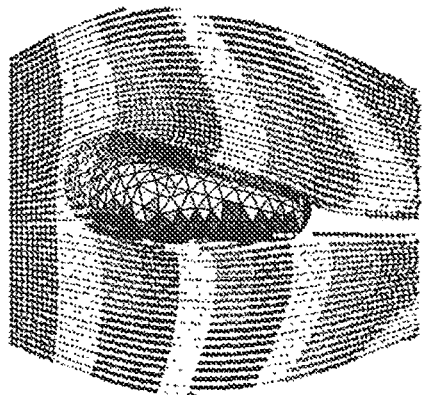
Figure 59:
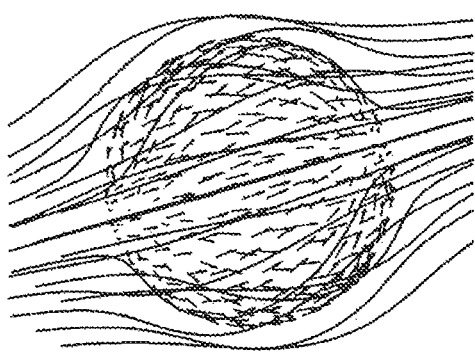
Figure 60:
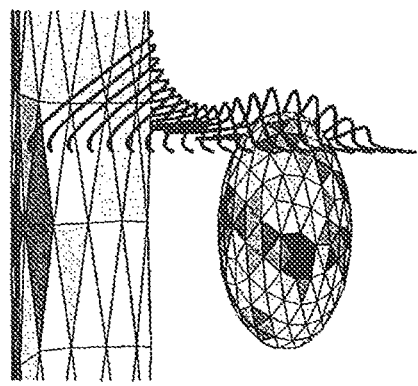

Thus, FIG. 56 shows an example of lift calculation performed by the computation device according to the invention in the example 1, and for a surface SUR formed by an airplane wing of the symmetrical Naca0012 type. Its polar is a quasi-straight line collapsing for strong incidences before reaching the point of separation. The maximum lift CZ varies as a function of the elongation of the wing and of the Reynolds number. The DPSM modeling is natively 3D and makes it possible to model any geometry by explaining the boundary conditions. It is possible to model a wing profile or a complete airplane. FIGS. 57 and 58 respectively show the pressure and the flow according to time around an airplane wing of the Naca4430 type, calculated by the device according to the invention in the example 1. FIGS. 59 and 60 respectively show the velocity of a three-dimensional flow of air around an isolated sphere and the velocity of the air along a wall (to illustrate a Venturi effect), calculated by the device according to the invention in the example 1.

Figure 51A:
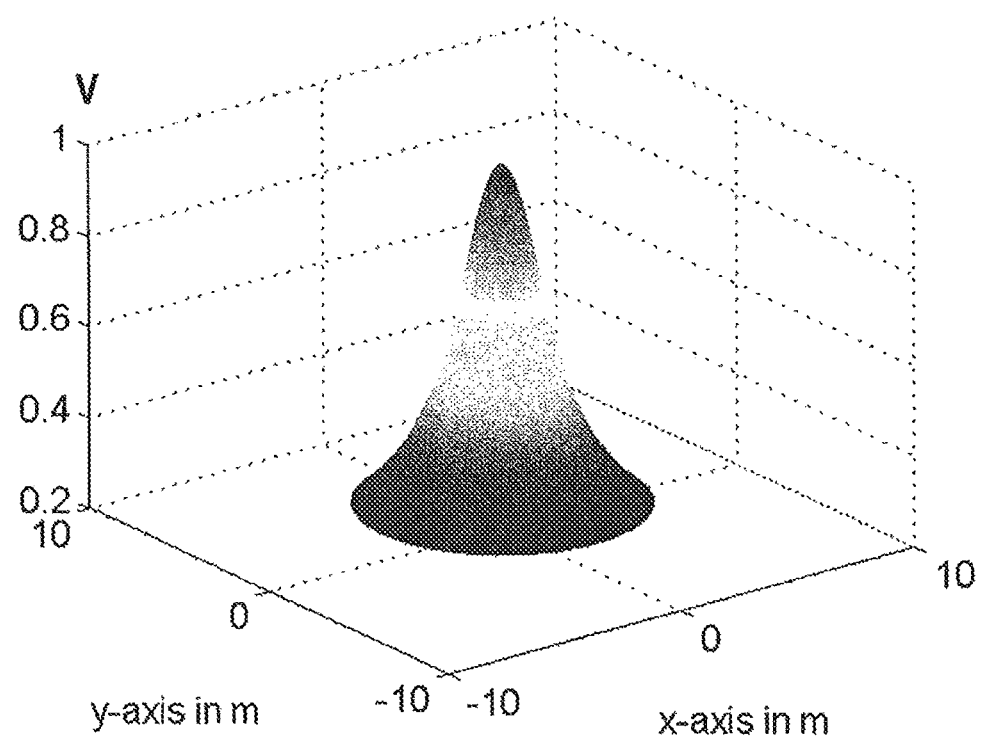
Figure 51B:
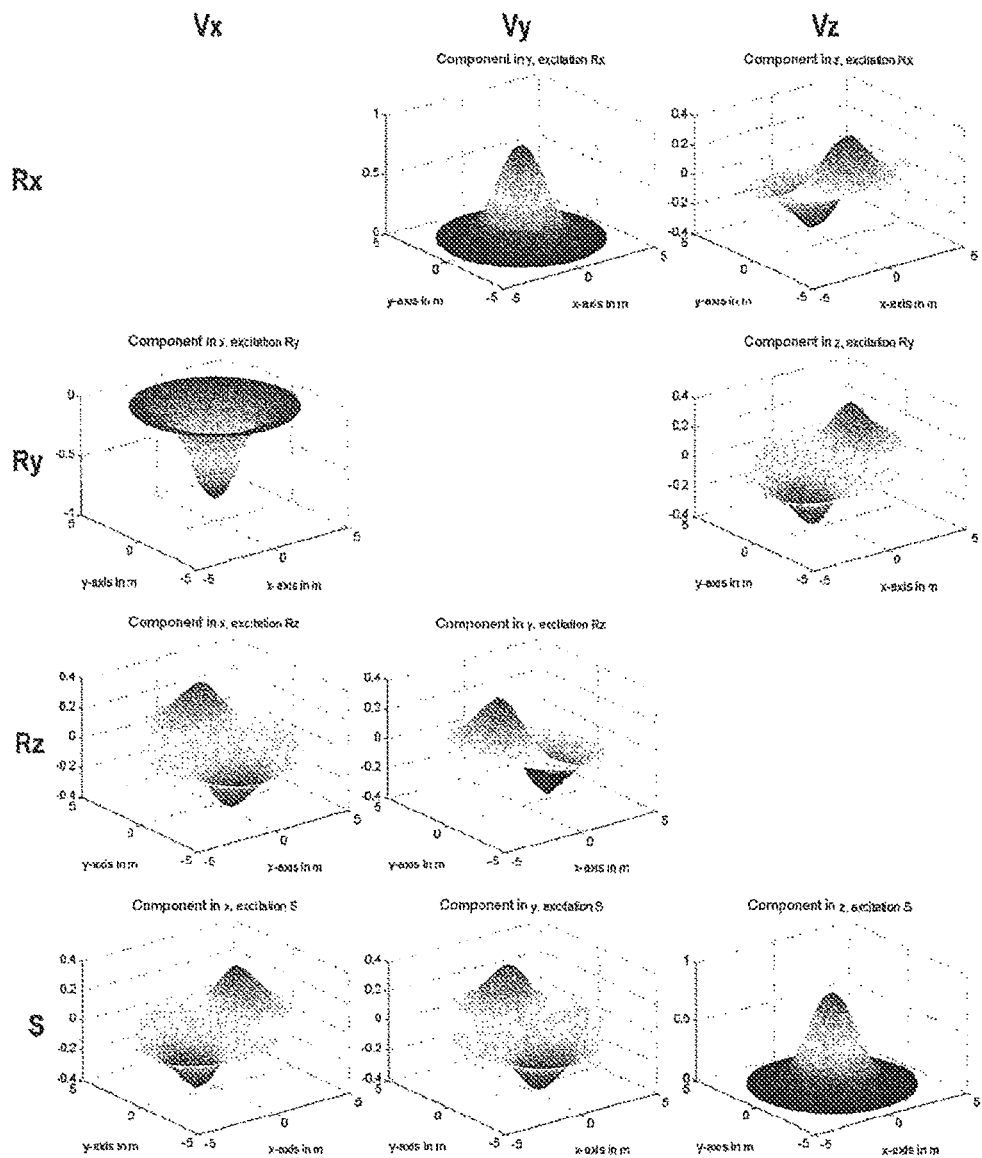

Embodiments of the invention are described herein below with reference to FIGS. 50 and 51A-51B.

According to an embodiment, there can be provided, in association with a plurality of first test points P1, a plurality of groups or blocks BL each comprising one or more sources S, situated at a distance from the first test point P1 and positioned in the block BL at mutually distinct and determined positions P2. The sources S are represented by crosses in FIG. 50. These blocks BL of sources S are for example distributed on each side of the surfaces SUR and/or SCL. Note that these blocks of sources can each contain a single scalar point source S, a triplet of scalar sources (Sa, Sb, Sc), a vectorial triplet (Rx, Ry, Rz), a hybrid (Rx, Ry, S), sources of force (Stoklets), etc.

According to an embodiment, each block BL is defined by an associated surface SBL (or an associated volume SBL) containing all the sources S of the block BL, the surfaces or volumes SBL of the blocks BL being separate from one another. Furthermore, each block BL has an associated and determined reference point REF, different between the blocks BL and contained in its surface or volume SBL. The surface SBL can correspond to an individual meshing surface.

According to an embodiment, each block BL of sources contains, in its surface or volume SBL, a family $A_j$ of sources S, $\lambda_j$ each weighted by a predetermined associated quantum $q_f$, for f being a natural integer ranging from 1 to F≥2, F being a natural integer associated with each block BL.

The quantums $q_f$ can be equal from one block to another, that is to say common to several blocks BL. It is therefore possible to have, in this case, a resultant common model (mass flow rate of fluid or force for example) of reference, which is the same for all the families of sources.

There is therefore a family of quantums $q_f$ for each block BL, that is to say for each surface or volume SBL. The vector q is composed of the F quantums $q_f$, which are calculated so as to functionalize the resultant (mass flow rate of fluid or force for example) of each family. For example, the sum of the quantums $q_f$ for f ranging from 1 to F is equal to 1.

For example, each block BL of sources contains a family $A_j$ of sources S, $\lambda_j$ such that:

$$A_j = \lambda_j q = \lambda_j [q_1 q_2 q_3 \ldots q_{(F-1)} q_F]^T.$$

According to an embodiment, each quantum $q_f$ is a function dependent on the relative coordinates P2 of each source S of the block BL relative to the determined reference point REF of this block BL.

The quality of the results, notably the regularity of the quantities calculated in near field depends on the number of sources and the calculation times increase according to the square of this number. By virtue of the family of sources, it is possible to increase the total number of sources without increasing the calculation times.

For example, a Gaussian amplitude of the physical quantity (velocity or pressure) at the surface of the object situated above the source block BL will be sought. It is therefore possible to see this family of sources as an equivalent source provided with a particular fluidic or force flow diagram. The case of a modulus V of the velocity, which is Gaussian in two dimensions is represented in FIGS. 51A and 51B. Then, the solving of the problem is dealt with conventionally in DPSM: by adding together all the contributions of these families, the equation below is obtained. Obviously, one of the components of the velocity vector could comprise a function dependent on the relative coordinates P2 of each source S of the block BL relative to the determined reference point REF of this block BL, it can for example be a Gaussian.

By inversion of the matrix of size F*F (F test points have obviously been taken to define the reference function), the value of each of the individual sources of the family is obtained. This first step is completely independent of the problem then solved. All that is wanted is to have the values of the F quantums of the family of sources. In the following equation, these are the (q1, ..., qF).

In another example, the quantum $q_f$ could be a Gaussian function or similar of the distance of each source S of the block BL relative to its reference point REF. This Gaussian is, for example, centered on the reference point REF.

The calculation is then done by calculating the coupling matrices $m^j_{if}$ which are row matrices of F elements (f varies from 1 to F), between the test point i and the F sources of a family housed at the source point j. The trick is that the value of the sources of the family is their quantum multiplied by the usual lambda. Since all the quantums are the same for each family of sources, it is possible to write the matrix thus, and there are therefore only at least M unknowns:

$$\begin{Bmatrix} v_{x1} \\ v_{x2} \\ v_{x3} \\ \vdots \\ v_{xM} \end{Bmatrix} =$$

$$\begin{bmatrix} (m^1_{11} \ldots m^1_{1F}) & (m^2_{11} \ldots m^2_{1F}) & \ldots & (m^M_{11} \ldots m^M_{1F}) \\ (m^1_{21} \ldots m^1_{2F}) & (m^2_{21} \ldots m^2_{2F}) & \ldots & (m^M_{21} \ldots m^M_{2F}) \\ (m^1_{31} \ldots m^1_{3F}) & (m^2_{31} \ldots m^2_{3F}) & \ldots & (m^M_{31} \ldots m^M_{3F}) \\ \vdots & & & \vdots \\ (m^1_{M1} \ldots m^1_{MF}) & (m^2_{M1} \ldots m^2_{MF}) & \ldots & (m^M_{M1} \ldots m^M_{MF}) \end{bmatrix}$$

$$\begin{Bmatrix} \lambda_1 \begin{pmatrix} q_1 \\ \vdots \\ q_F \end{pmatrix} \\ \lambda_2 \begin{pmatrix} q_1 \\ \vdots \\ q_F \end{pmatrix} \\ \vdots \\ \lambda_M \begin{pmatrix} q_1 \\ \vdots \\ q_F \end{pmatrix} \end{Bmatrix}$$

This formulation creates a matrix of dimension $(M \times F)^2$. However, since the factors $q_f$ have been predefined in the functionalization of the family, they can be distributed in the resolution matrix before inverting it. The following matrix is then obtained:

$$\begin{bmatrix} (m_{11}^1 \ldots m_{1F}^1) \begin{pmatrix} q_1 \\ \vdots \\ q_F \end{pmatrix} & (m_{11}^2 \ldots m_{1F}^2) \begin{pmatrix} q_1 \\ \vdots \\ q_F \end{pmatrix} & \ldots & (m_{11}^M \ldots m_{1F}^M) \begin{pmatrix} q_1 \\ \vdots \\ q_F \end{pmatrix} \\ (m_{21}^1 \ldots m_{2F}^1) \begin{pmatrix} q_1 \\ \vdots \\ q_F \end{pmatrix} & (m_{21}^2 \ldots m_{2F}^2) \begin{pmatrix} q_1 \\ \vdots \\ q_F \end{pmatrix} & \ldots & (m_{21}^M \ldots m_{2F}^M) \begin{pmatrix} q_1 \\ \vdots \\ q_F \end{pmatrix} \\ (m_{31}^1 \ldots m_{3F}^1) \begin{pmatrix} q_1 \\ \vdots \\ q_F \end{pmatrix} & (m_{31}^2 \ldots m_{3F}^2) \begin{pmatrix} q_1 \\ \vdots \\ q_F \end{pmatrix} & \ldots & (m_{31}^M \ldots m_{3F}^M) \begin{pmatrix} q_1 \\ \vdots \\ q_F \end{pmatrix} \\ \vdots & & & \vdots \\ (m_{M1}^1 \ldots m_{MF}^1) \begin{pmatrix} q_1 \\ \vdots \\ q_F \end{pmatrix} & (m_{M1}^2 \ldots m_{MF}^2) \begin{pmatrix} q_1 \\ \vdots \\ q_F \end{pmatrix} & \ldots & (m_{M1}^M \ldots m_{MF}^M) \begin{pmatrix} q_1 \\ \vdots \\ q_F \end{pmatrix} \end{bmatrix}$$

$$\begin{Bmatrix} \lambda_1 \\ \lambda_2 \\ \vdots \\ \vdots \\ \lambda_M \end{Bmatrix}$$

The internal products of the matrix are calculated beforehand and a matrix is restored that is of the same dimension as in the case of the standard DPSM:

$$\begin{Bmatrix} v_{z1} \\ v_{z2} \\ v_{z3} \\ \vdots \\ v_{zM} \end{Bmatrix} = \begin{bmatrix} M_{11} & M_{12} & \ldots & M_{1M} \\ M_{21} & M_{22} & \ldots & M_{2M} \\ M_{31} & M_{32} & \ldots & M_{3M} \\ \vdots & & & \vdots \\ M_{M1} & M_{M2} & \ldots & M_{MM} \end{bmatrix} \begin{Bmatrix} \lambda_1 \\ \lambda_2 \\ \vdots \\ \vdots \\ \lambda_M \end{Bmatrix}$$

The advantage is that the near field calculation is much more accurate and this method considerably reduces the fluctuations of the parameters observed between the test points of the surface. The far field calculation remains unchanged in relation to the conventional DPSM, the family of sources being normalized (sum of the $q_f$=1).

Families of vectorial sources: it should be noted that, instead of each of the quantums, it is possible to position any type of more complex sources as recalled above. Each quantum $q_f$ of the family is then made up of several individual sources, each of which remains weighted by the same $q_f$. The resolution principle remains unchanged and the benefit of the smoothing of the quantities in the vicinity of the surfaces is still obtained, which is very advantageous for the calculation in the boundary layers. FIG. 51B gives an example of the velocity components Vx, Vy, Vz obtained with families of sources Rx, Ry, Rz and S, functionalized for the modulus of their velocity to be Gaussian like FIG. 51A.

Once the problem is solved and the $\lambda_j$ have been calculated, it is possible to calculate the fields everywhere. Here are examples of modulus calculation of the velocity V. In near field: the method is applied and all the sources are taken into account: the N*F sources radiate over the M points of visualization according to FIG. 52. The result is interesting, above all compared to FIGS. 53 and 54.

Figure 53:
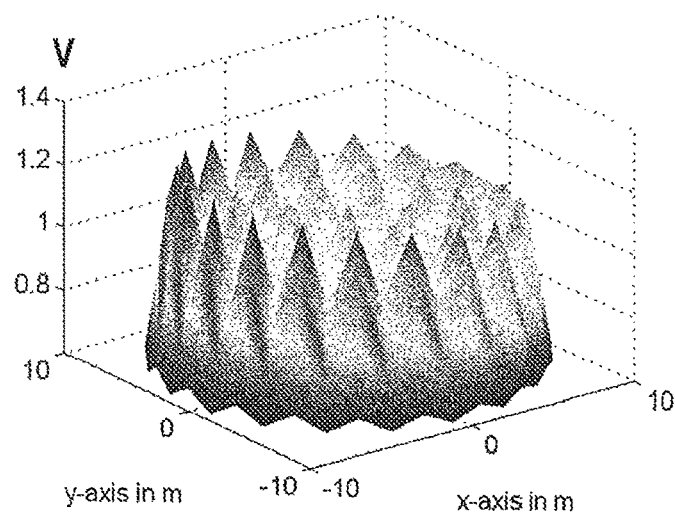

In far field, in FIG. 53, an equivalent source is taken for each family N° j, of value $\lambda_j$ times the sum of the quantums. This should be compared with FIG. 54, in conventional DPSM.

Figure 52:
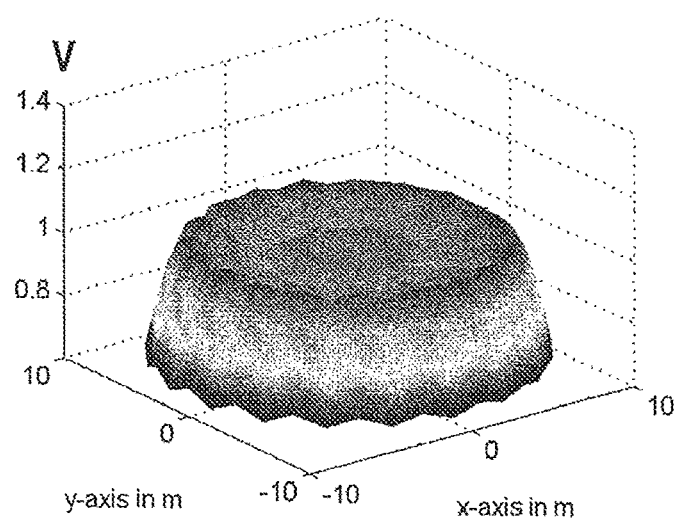
Figure 54:
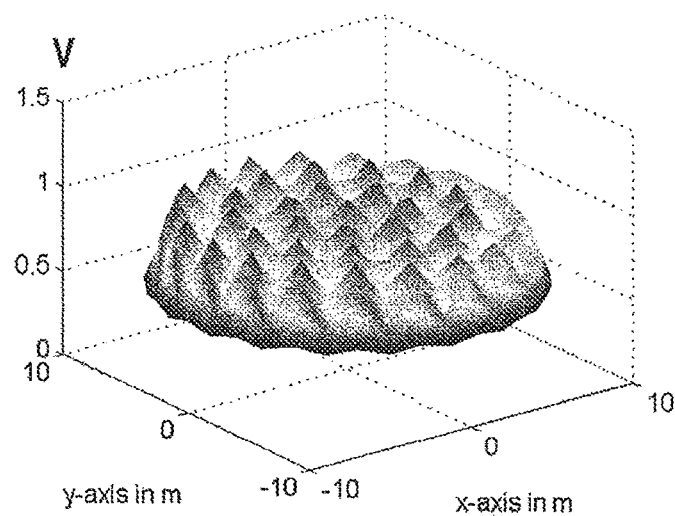

FIG. 52 therefore shows that there are far fewer discontinuities of the quantity V calculated than in FIGS. 53 and 54.

In another embodiment, the first source and the second source are not different from one another.

In another embodiment, the source or sources and/or one of the sources or some sources, and/or the first source or several first sources or the first sources, and/or the second source or several second sources or the second sources, are not distinct from the interface. In another embodiment, in the second step E2, the position of at least one third point P2 mot distinct from the interface I, at which there is at least one source S of fluid, is prescribed.

Obviously, the embodiments described above can be provided in combination with one another or can be selected independently of one another.

The invention claimed is:

1. A device for measuring at least a first physical quantity from a pressure and a velocity, of at least one fluid flow in a three-dimensional space having at least one predetermined interface, situated between at least two media, one of the two media being a fluid and another of the two media being a solid, the device comprising:
   at least one computer configured to prescribe at least two first and second boundary conditions concerning the first physical quantity of the fluid flow taken at least at a first predetermined test point of the predetermined interface that is situated between the at least two media that includes the fluid and the solid, associated respectively with at least one first modeled source and with at least one second modeled source, different from one another and distributed respectively at prescribed positions, distinct from the predetermined interface,
   the first modeled source and the second modeled source being selected from modeled point sources of mass flow of fluid and/or force,
   the computer being configured to calculate, by a distributed point source calculation method (DPSM), a first value of the first physical quantity from the first boundary condition and from at least the first modeled source and at least one second value of the first physical quantity from at least the second boundary condition and from at least the second modeled source, at at least one second point of the space, different from the first test point, and configured to combine the values obtained respectively from the boundary conditions and the modeled sources in order to calculate the first physical quantity, and the first modeled source and the second modeled source being a hybrid source that is a scalar source and a rotational source or comprising at least a Stokeslet source, said first and second modeled sources being selected from modeled point sources of mass flow of fluid and/or force.

2. The measurement device as claimed in claim 1, wherein the predetermined interface comprises at least one surface of at least one solid, impermeable to the fluid, at least one of the modeled sources, associated with the first test point, being situated at a distance from the first test point below the surface of the solid, on the other side of the fluid flow, the at least one modeled source being modeled to send fluid or a force through the interface.

3. The measurement device as claimed in claim 1, wherein the computer is configured to prescribe at least one other boundary condition of the fluid flow at least one other point at a prescribed distance away from the interface and a prescribed global direction of flow of the fluid flow from the distant point to the predetermined interface.

4. The measurement device as claimed in claim 1, wherein the first modeled source has a first fluid or force emission orientation, and the second modeled source has a second fluid or force emission orientation which is different from the first fluid emission orientation.

5. The measurement device as claimed in claim 1, wherein the first modeled source is at least one point source of radial mass flow of fluid or the first modeled source comprises the at least one modeled point source of radial mass flow of fluid.

6. The measurement device as claimed in claim 1, wherein the second modeled source is at least one modeled point source of rotational mass flow of fluid about a determined direction or the second modeled source comprises the at least one modeled point source of rotational mass flow of fluid about the determined direction.

7. The measurement device as claimed in claim 1, wherein the second modeled source is at least one modeled point source of force or the second modeled source comprises the at least one modeled point source of force.

8. The device as claimed in claim 1, wherein the computer stores a global resolution matrix M, comprising at least one coefficient dependent on both a prescribed value characterizing the fluid and the distance between the first and/or second modeled source and a fourth point of the space, the product of the global resolution matrix M, taken at the first test points as fourth point of the space, multiplied by a first vector J of the parameters of the first and/or second modeled source, being equal to a second vector C of the boundary conditions concerning the first physical quantity of the fluid flow taken at the first test points, according to the equation $C = M*J$, where * designates multiplication, the computer is configured to invert the global resolution matrix M, taken at the first test points as fourth point of the space, to calculate the inverse matrix $M^{-1}$, the computer is configured to calculate the first vector J of the parameters of the first and/or second modeled source by multiplying the inverse matrix $M^{-1}$ by the second vector C of the boundary conditions of the first physical quantity of the fluid flow taken at the first test points, according to the equation $J = M^{-1}*C$, the computer is configured to calculate the first physical quantity of the fluid flow at the second point of the space having a determined position, by multiplying the global resolution matrix M, calculated at said determined position of the second point as fourth point, by the first vector J of the parameters of the first and/or second modeled source, the prescribed value characterizing the fluid being the density ρ of the fluid and/or the kinematic viscosity μ of the fluid.

9. The measurement device as claimed in claim 8, wherein the global resolution matrix comprises several coefficients, of which at least one is equal to, for at least one modeled point source of mass flow of fluid as first and/or second modeled source:

$\pm(x_i-x_j)/(4\cdot\pi\cdot\rho\cdot R_{ij})$, or to $\pm(y_i-y_j)/(4\cdot\pi\cdot\rho\cdot R_{ij})$ or to $\pm(z_i-z_j)/(4\cdot\pi\cdot\rho\cdot R_{ij})$, or to $\pm(x_i-x_j)/(4\cdot\pi\cdot\rho\cdot R_{ij}^3)$, or to $\pm(y_i-y_j)/(4\cdot\pi\cdot\rho\cdot R_{ij}^3)$ or to $\pm(z_i-z_j)/(4\cdot\pi\cdot\rho\cdot R_{ij}^3)$, or to $1/(4\cdot\pi\cdot\rho\cdot R_{ij})$, or to one thereof, multiplied by a prescribed constant, by which the first vector of the parameters of the modeled point source of mass flow rate of fluid is divided, where $R_{ij}$ is the distance between the modeled point source of mass flow rate of fluid situated at the third point of prescribed position $x_j$, $y_j$, $z_j$ according to three non-coplanar directions x, y and z of the space and the fourth point of the space having coordinates $x_i$, $y_i$, $z_i$ according to the three directions x, y and z.

10. The measurement device as claimed in claim 8, wherein the global resolution matrix comprises several coefficients, of which at least one is equal to one out of, for at least one modeled point source of force as first and/or second modeled source:

$(x_i-x_j)/(8\cdot\pi\cdot\mu\cdot R_{ij}),(y_i-y_j)/(8\cdot\pi\cdot\mu\cdot R_{ij}),(z_i-z_j)/(8\cdot\pi\cdot\mu\cdot R_{ij})$, $(x_i-x_j)^2/(8\cdot\pi\cdot\mu\cdot R_{ij}),(y_i-y_j)^2/(8\cdot\pi\cdot\mu\cdot R_{ij}),(z_i-z_j)^2/(8\cdot\pi\cdot\mu\cdot R_{ij})$, $(x_i-x_j)\cdot(y_i-y_j)/(8\cdot\pi\cdot\mu\cdot R_{ij}^3), (x_i-x_j)\cdot(z_i-z_j)/(8\cdot\pi\cdot\mu\cdot R_{ij}^3), (z_i-z_j)\cdot(y_i-y_j)/(8\cdot\pi\cdot\mu\cdot R_{ij}^3)$, or to one thereof, multiplied by a prescribed constant, by which the first vector of the parameters of the modeled point source of force is divided, where $R_{ij}$ is the distance between the modeled point source of force situated at the third point of prescribed position $x_j$, $y_j$, $z_j$ according to three non-coplanar directions x, y and z of the space and the fourth point of the space having coordinates $x_i$, $y_i$, $z_i$ according to the three directions x, y and z.

11. The measurement device as claimed in claim 1, wherein the fluid flow is situated in air.

12. The measurement device as claimed in claim 1, wherein the first modeled source is at least one modeled point source of radial mass fluid flow or the first modeled source comprises the at least one modeled point source of radial mass fluid flow for the first boundary condition having, at the first test point, a normal component of fluid velocity at the first test point, which is zero at the interface and/or for another prescribed boundary condition having, at at least one other point at a prescribed distance away from the interface, a prescribed velocity component.

13. The measurement device as claimed in claim 1, wherein the second modeled source is at least one modeled point source of rotational mass fluid flow or the second modeled source comprises the at least one modeled point source of rotational mass flow of fluid about a determined direction, for the second boundary condition having, at the first test point, a fluid velocity component at the first test point, which is prescribed as being non-zero and tangential to the interface and/or for another prescribed boundary condition having, at at least one other point at a prescribed distance away from the interface, a prescribed velocity component.

14. The measurement device as claimed in claim 1, wherein the computer is configured to calculate a property of the interface in the fluid flow, different from the first physical quantity, the property being the drag induced by the interface in the fluid flow and/or the lift of the interface in the fluid flow, from the first physical quantity.

15. The measurement device as claimed in claim 1, wherein the first boundary condition is different from the second boundary condition.

16. The measurement device as claimed in claim 1, wherein the computer is configured to combine the first value and the second value by addition to supply the first physical quantity.

17. The measurement device as claimed in claim 1, wherein the computer is configured to calculate the second value from the first modeled source and from the second modeled source, and to calculate the first physical quantity as being the second value.

18. A method for measuring at least one first physical quantity among a pressure and a velocity of at least one fluid flow in a three-dimensional space having at least one predetermined interface, situated between at least two media, one of the two media being a fluid and another of the two media being a solid, the method comprising:

during a first iteration, prescribing, by at least one computer, at least one first boundary condition concerning the first physical quantity of the fluid flow taken at at least one first predetermined test point of the predetermined interface that is situated between the at least two media that includes the fluid and the solid, associated respectively with at least one first modeled source situated at an associated position, prescribed and distinct from the predetermined interface, and calculating, by the computer by a distributed point source calculation method, at at least one second point of the space, different from the first test point, a first value of the first physical quantity from the first boundary condition and from at least the first modeled source;

during a second iteration, prescribing, by the computer, at least one second boundary condition concerning the first physical quantity of the fluid flow taken at the first predetermined test point of the interface, associated respectively with at least one second modeled source situated at an associated position, prescribed and distinct from the interface, and calculating, by the computer by the distributed point source calculation method (DPSM), a second value of the first physical quantity at the second point of the space from the second boundary condition and from at least the second modeled source, the first modeled source and the second modeled source being different from one another and being chosen from modeled point sources of mass flow of fluid and/or of force, the first physical quantity being calculated by combining, by the computer, the first value and the second value, and the first modeled source and the second modeled source being a hybrid source that is a scalar source and a rotational source or comprising at least a Stokeslet source, said first and second modeled sources being selected from modeled point sources of mass flow of fluid and/or force.

19. A computer program, comprising instructions for implementing the measurement method as claimed in claim 18 when it is implemented on a computer.

* * * * *